US012621476B2

(12) United States Patent
Kuo et al.

(10) Patent No.: US 12,621,476 B2
(45) Date of Patent: May 5, 2026

(54) CODING ENHANCEMENT IN CROSS-COMPONENT SAMPLE ADAPTIVE OFFSET

(71) Applicant: BEIJING DAJIA INTERNET INFORMATION TECHNOLOGY CO., LTD., Beijing (CN)

(72) Inventors: Che-Wei Kuo, San Diego, CA (US); Xiaoyu Xiu, San Diego, CA (US); Wei Chen, San Diego, CA (US); Xianglin Wang, San Diego, CA (US); Yi-Wen Chen, San Diego, CA (US); Hong-Jheng Jhu, San Diego, CA (US); Ning Yan, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/424,153

(22) Filed: Jan. 26, 2024

(65) Prior Publication Data

US 2024/0195996 A1     Jun. 13, 2024

Related U.S. Application Data

(63) Continuation of application No. PCT/US2022/038497, filed on Jul. 27, 2022.
(Continued)

(51) Int. Cl.
*H04N 19/186* (2014.01)
*H04N 19/44* (2014.01)
*H04N 19/70* (2014.01)

(52) U.S. Cl.
CPC ........... *H04N 19/44* (2014.11); *H04N 19/186* (2014.11); *H04N 19/70* (2014.11)

(58) Field of Classification Search
CPC ....... H04N 19/44; H04N 19/186; H04N 19/70
(Continued)

(56) References Cited

U.S. PATENT DOCUMENTS

2013/0259118 A1     10/2013  Fu et al.
2013/0336382 A1     12/2013  Sole Rojals et al.
(Continued)

FOREIGN PATENT DOCUMENTS

JP     2013141094 A     7/2013
JP     2019110587 A     7/2019
(Continued)

OTHER PUBLICATIONS

First Office Action dated Feb. 4, 2025 for Japanese Patent Application No. 2024-505167.
(Continued)

*Primary Examiner* — Albert Kir
(74) *Attorney, Agent, or Firm* — Scully, Scott, Murphy & Presser, P.C.

(57) ABSTRACT

An electronic apparatus performs a method of decoding video data, including: receiving, a plurality of frames, each including a first component and a second component; determining, for a first frame, one or more classifiers for the second component respectively from one or more samples of the first component associated with a respective sample of the second component; and when a received syntax element indicates that differential pulse-code modulation (DPCM) is enabled for signalling a first group of differential sample offsets for the second component of a second frame according to the one or more classifiers: determining a second group of sample offsets for the second component of the second frame by adding the first group of differential sample
(Continued)

System 10

Source Device 12
- Video Source 18
- Video Encoder 20
- Output Interface 22

Storage Device 32

16

Destination Device 14
- Display Device 34
- Video Decoder 30
- Input Interface 28 offsets of the second frame to a first group of sample offsets for the second component of the first frame according to the one or more classifiers.

14 Claims, 59 Drawing Sheets

Related U.S. Application Data

(60) Provisional application No. 63/226,088, filed on Jul. 27, 2021.

(58) Field of Classification Search
USPC .................................................... 375/240.25
See application file for complete search history.

(56) References Cited

U.S. PATENT DOCUMENTS

| | | | |
|---|---|---|---|
| 2014/0348222 A1 | 11/2014 | Hsiang et al. | |
| 2015/0271505 A1* | 9/2015 | Ma ........................ | H04N 19/463 |
| | | | 375/240.08 |
| 2020/0344478 A1 | 10/2020 | Wang et al. | |
| 2021/0136383 A1 | 5/2021 | Lim et al. | |
| 2022/0272322 A1* | 8/2022 | Lin ......................... | H04N 19/70 |
| 2022/0286674 A1* | 9/2022 | Wang ................... | H04N 19/117 |
| 2022/0303586 A1* | 9/2022 | Du ........................ | H04N 19/186 |
| 2022/0400292 A1* | 12/2022 | Kotra ..................... | H04N 19/82 |
| 2024/0187580 A1* | 6/2024 | Yin ....................... | G06V 10/764 |
| 2025/0104601 A1* | 3/2025 | Kim ..................... | G09G 3/2096 |

FOREIGN PATENT DOCUMENTS

| | | | |
|---|---|---|---|
| JP | 6748749 | B2 | 9/2020 |
| JP | 2021005904 | A | 1/2021 |
| KR | 20200094071 | A | 8/2020 |
| WO | 2014204584 | A1 | 12/2014 |
| WO | 2021023152 | A1 | 2/2021 |
| WO | 2021104409 | A1 | 6/2021 |

OTHER PUBLICATIONS

Extended European Search Report dated Apr. 3, 2025 for European Patent Application No. 22850235.7.

Rosewarne C et al: "High Efficiency Video Coding (HEVC) Test Model 16 (HM 16) Encoder Description Update 15", 22. JVET Meeting; Apr. 20, 2021-Apr. 28, 2021; Teleconference; (The Joint Video Exploration Team of ISO/IEC JTC1/SC29/WG11 and ITU-T SG.16 ), No. JVET-V1002; m57019 Jul. 6, 2021 (Jul. 6, 2021), XP030296260, Retrieved from the Internet: URL:https://jvet-experts. org/doc_end_user/documents/22_Teleconference/wg11/JVET-V1002-v1.zip JVET-V1002-v1.docx [retrieved on Jul. 6, 2021].

C-W Kuo (Kwai) et al: "EE2-5.1: Cross-component Sample Adaptive Offset", 23. JVET Meeting; Jul. 7, 2021-Jul. 16, 2021; Teleconference; (The Joint Video Exploration Team of ISO/IEC JTC1/SC29/ WG11 and ITU-T SG. 16 ), No. JVET-W0066 ; m57178 Jul. 1, 2021 (Jul. 1, 2021), XP030295926, Retrieved from the Internet: URL:https://jvet-experts.org/doc_end_user/documents/23_ Teleconference/wg11/JVET-W0066-v1.zip JVET-W0066/JVET-W0066.docx [retrieved on Jul. 1, 2021].

International Search Report dated Nov. 7, 2022 issued in PCT/US2022/038497.

Examination Report dated Feb. 26, 2026 received in Indian Patent Application No. 202417013175.

Zhang, X. et al., "Adaptive Loop Filter with Temporal Prediction", Picture Coding Symposium, 2012, pp. 437-440.

Sullivan, G. et al., "Meeting Report of the 22nd JVET Meeting", Joint Video Experts Team (JVET) of ITU-T SG 16 WP 3 and ISO/IEC JTC 1/SC 29, Apr. 2021, pp. 1-227.

Bross, B. et al., "Developments in International Video Coding Standizardation After AVC, With an Overview of Versatile Video Coding (VVC)", in Proceedings of the IEEE, 2021, pp. 1463-1493, vol. 109, No. 9.

* cited by examiner

0: Planar
1: DC

FIG. 5B

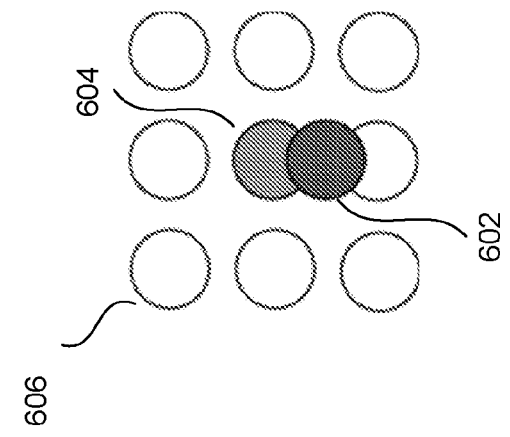
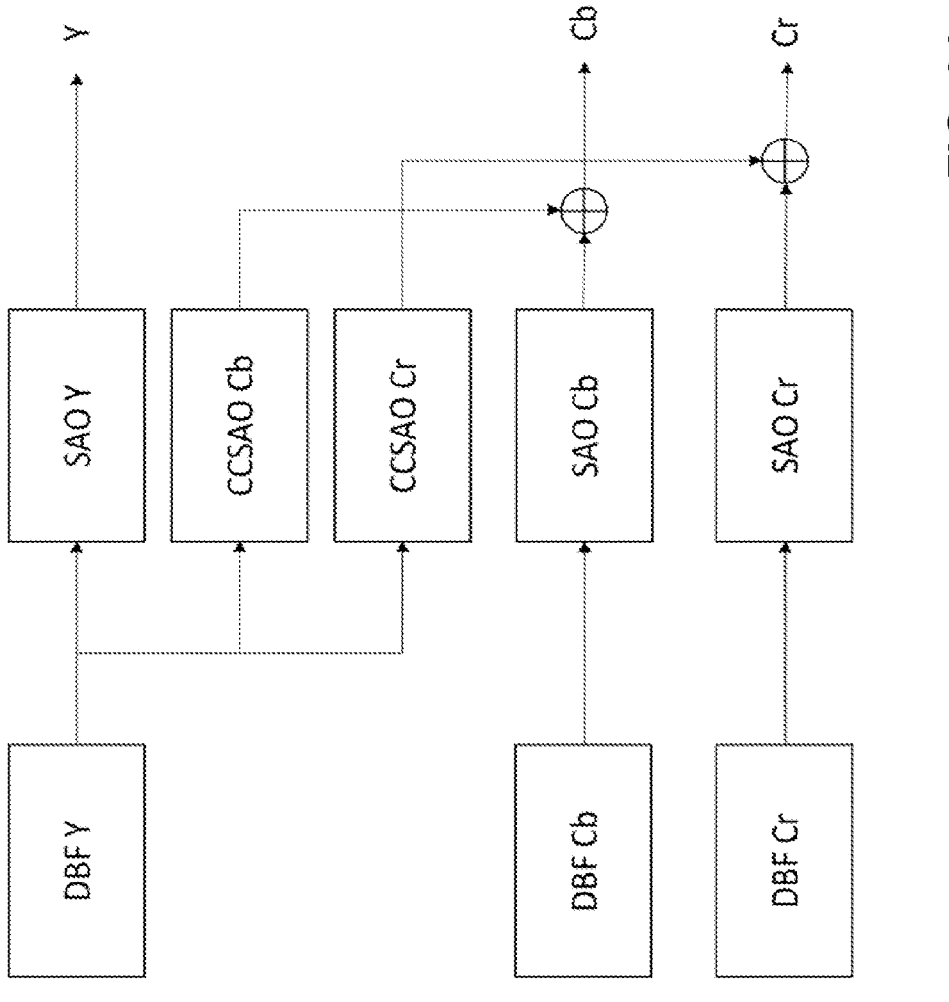
FIG. 6A

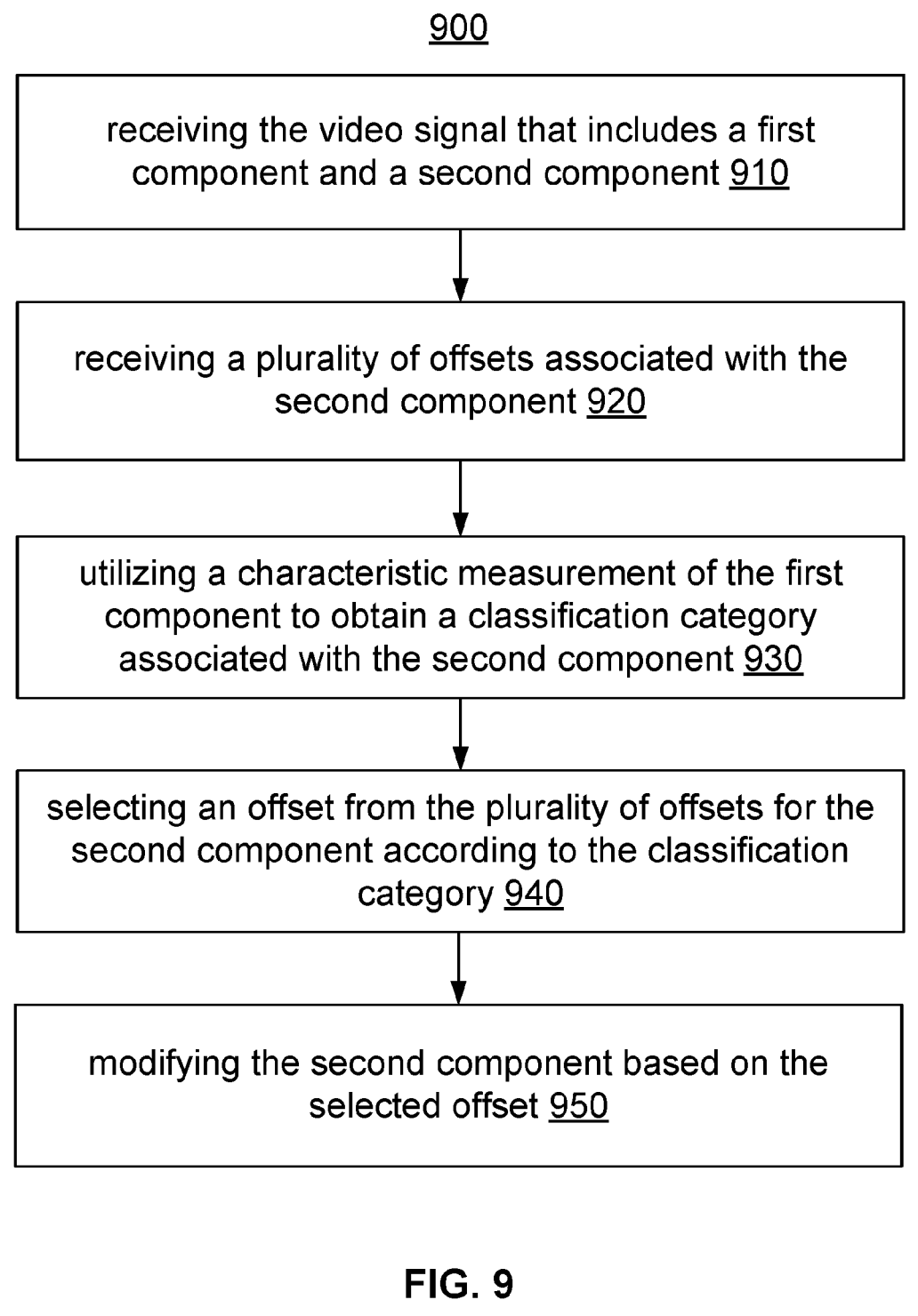

900

```
┌─────────────────────────────────────────────┐
│  receiving the video signal that includes    │
│  a first component and a second component     │
│  910                                          │
└─────────────────────────────────────────────┘
                       │
                       ▼
┌─────────────────────────────────────────────┐
│  receiving a plurality of offsets associated  │
│  with the second component 920                │
└─────────────────────────────────────────────┘
                       │
                       ▼
┌─────────────────────────────────────────────┐
│  utilizing a characteristic measurement of    │
│  the first component to obtain a              │
│  classification category associated with      │
│  the second component 930                     │
└─────────────────────────────────────────────┘
                       │
                       ▼
┌─────────────────────────────────────────────┐
│  selecting an offset from the plurality of    │
│  offsets for the second component according   │
│  to the classification category 940           │
└─────────────────────────────────────────────┘
                       │
                       ▼
┌─────────────────────────────────────────────┐
│  modifying the second component based on      │
│  the selected offset 950                      │
└─────────────────────────────────────────────┘
```

FIG. 9

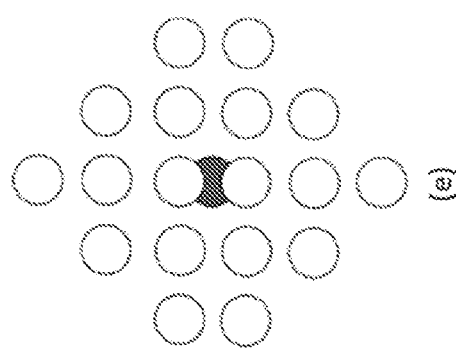
(e)
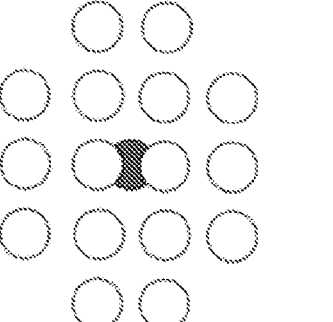
(d)
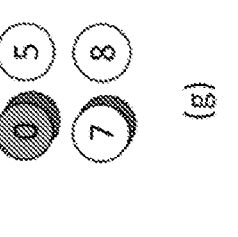
(g)
(c)    (f)

(b)
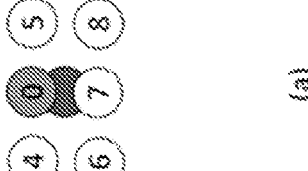
(a)
FIG. 10B

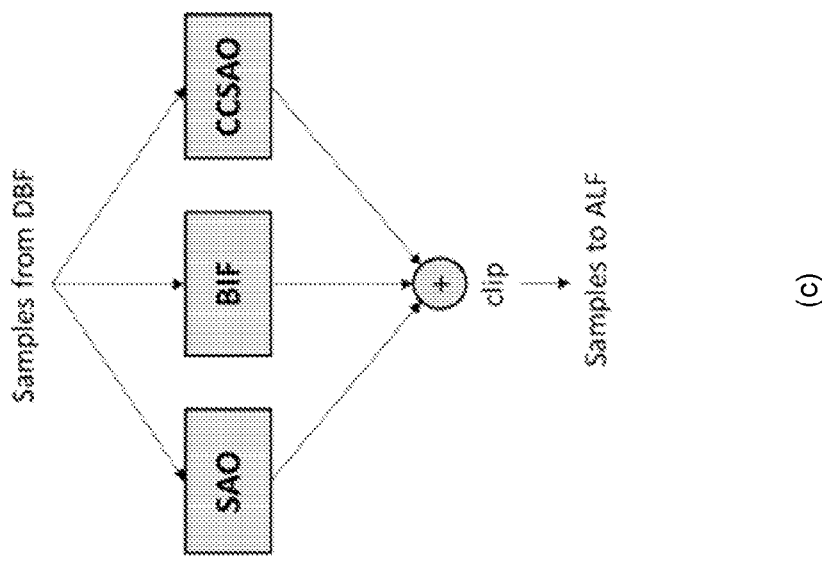
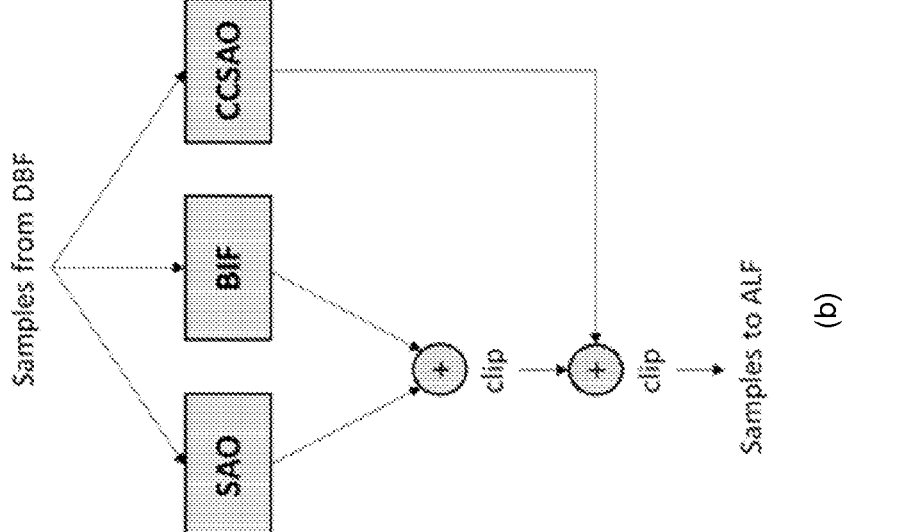
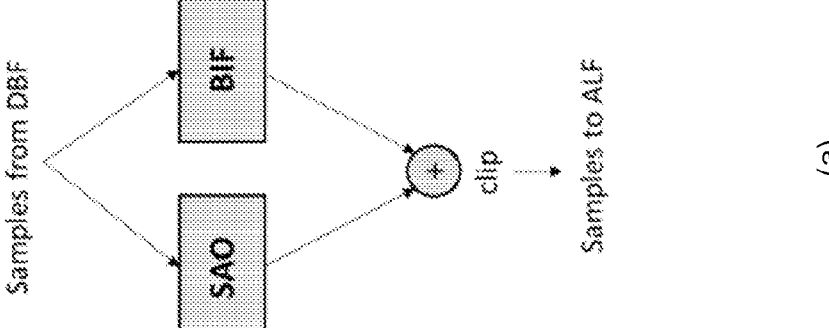
FIG. 13

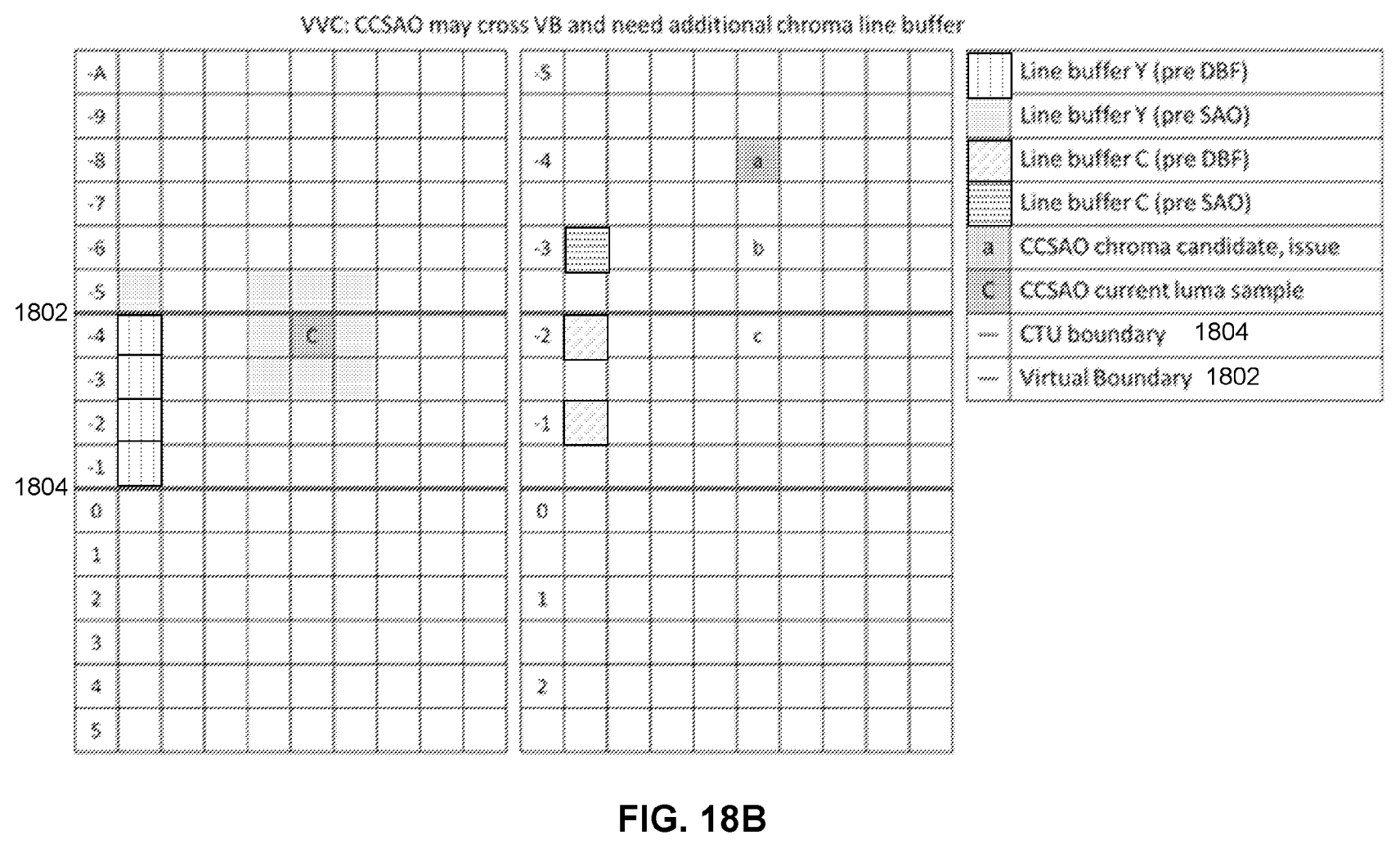

Line buffer Y (pre DBF)

Line buffer Y (pre SAO)

Line buffer C (pre DBF)

Line buffer C (pre SAO)

CCSAO chroma candidate, issue

CCSAO current luma sample

CTU boundary   1804

Virtual Boundary 1802

VVC, CCSAO may cross VB and need additional chroma line buffer

FIG. 18B

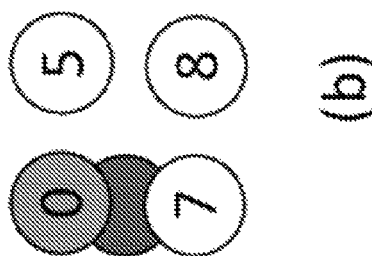
(b)
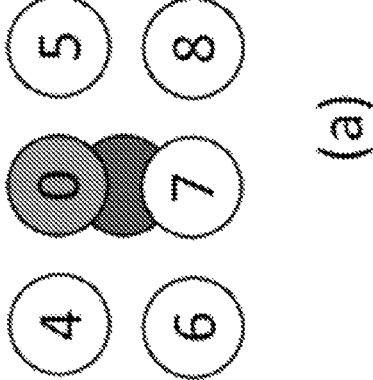
(a)
FIG. 23

| 8x8 DBF process example Y | 2402 |
| 8x8 DBF process example C | 2404 |
| CTU boundary | 2406 |
| Virtual Boundary | 2408 |
| DBF applied boundary Y | 2410 |
| DBF applied boundary C | 2412 |

FIG. 27

(a) Vertical partition N region
(depend on signaled picture set_num)

(b) Horizontal partition N region
(depend on signaled picture set_num)

(c) Raster partition 3 regions

| CTB size: 32x32 |  |
| --- | --- |
| Subblock size: 4x4 |  |
| CTU boundary samples |  |
| CU boundary |  |
| CU boundary samples (N=1) |  |
| CU centered samples (e.g., 8x8) |  |
| Skip mode coded samples |  |
| Deblock filtered samples |  |
| Transform skipped samples |  |
| (local) Dual tree enabled samples |  |

(c) V
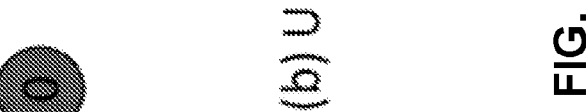
(b) U
FIG. 31
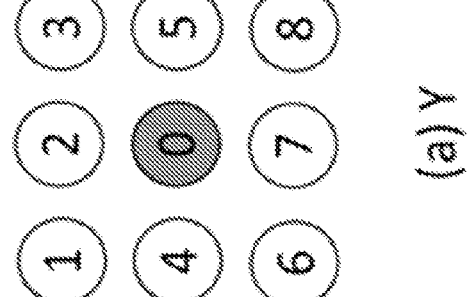
(a) Y

3300 receiving, from the video bitstream, a plurality of frames, each frame including a first component and a second component 3310

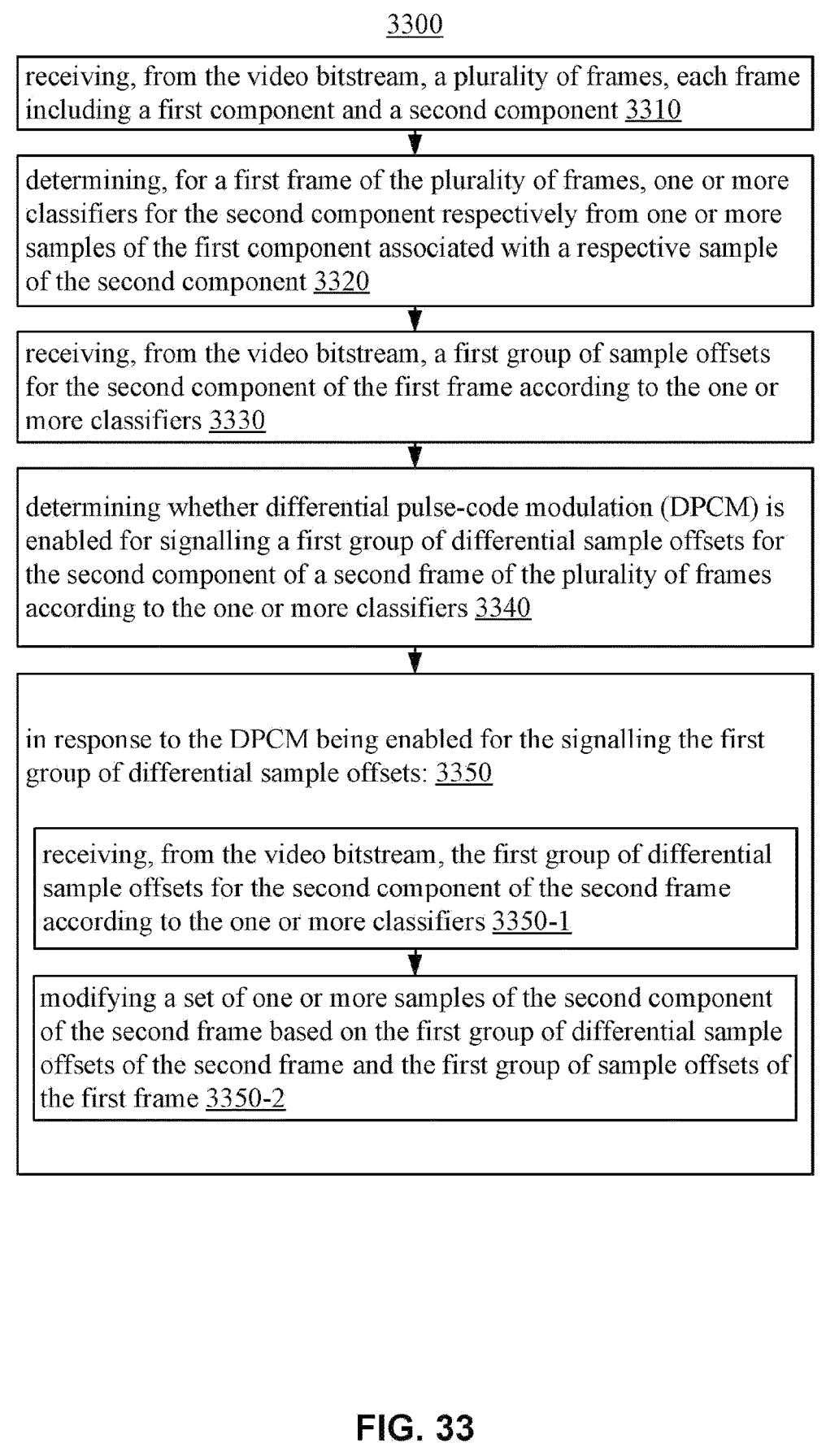

↓ determining, for a first frame of the plurality of frames, one or more classifiers for the second component respectively from one or more samples of the first component associated with a respective sample of the second component 3320

↓ receiving, from the video bitstream, a first group of sample offsets for the second component of the first frame according to the one or more classifiers 3330

↓ determining whether differential pulse-code modulation (DPCM) is enabled for signalling a first group of differential sample offsets for the second component of a second frame of the plurality of frames according to the one or more classifiers 3340

↓ in response to the DPCM being enabled for the signalling the first group of differential sample offsets: 3350 receiving, from the video bitstream, the first group of differential sample offsets for the second component of the second frame according to the one or more classifiers 3350-1

↓ modifying a set of one or more samples of the second component of the second frame based on the first group of differential sample offsets of the second frame and the first group of sample offsets of the first frame 3350-2

FIG. 33

CODING ENHANCEMENT IN CROSS-COMPONENT SAMPLE ADAPTIVE OFFSET

CROSS-REFERENCE TO THE RELATED APPLICATIONS

The present application is a continuation application of PCT International Application No. PCT/US2022/038497 filed Jul. 27, 2022, which claims priority to U.S. Provisional Patent Application No. 63/226,088, entitled "CROSS-COMPONENT SAMPLE ADAPTIVE OFFSET" filed Jul. 27, 2021, the entire contents of each of which are incorporated herein by reference.

TECHNICAL FIELD

The present application generally relates to video coding and compression, and more specifically, to methods and apparatus on improving both the luma and the chroma coding efficiency.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. AOMedia Video 1 (AV1) was developed as a successor to its preceding standard VP9. Audio Video Coding (AVS), which refers to digital audio and digital video compression standard, is another video compression standard series. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

The present application describes implementations related to video data encoding and decoding and, more particularly, to methods and apparatus on improving the coding efficiency of both luma and chroma components, including improving the coding efficiency by exploring cross-component relationship between luma component and chroma component.

According to a first aspect of the present application, a method of decoding video bitstream, includes: receiving, from the video bitstream, a plurality of frames, each frame including a first component and a second component; determining, for a first frame of the plurality of frames, one or more classifiers for the second component respectively from one or more samples of the first component associated with a respective sample of the second component; receiving, from the video bitstream, a first group of sample offsets for the second component of the first frame according to the one or more classifiers; determining whether differential pulse-code modulation (DPCM) is enabled for signalling a first group of differential sample offsets for the second component of a second frame of the plurality of frames according to the one or more classifiers; in response to the DPCM being enabled for the signalling the first group of differential sample offsets: receiving, from the video bitstream, the first group of differential sample offsets for the second component of the second frame according to the one or more classifiers; and modifying a set of one or more samples of the second component of the second frame based on the first group of differential sample offsets of the second frame and the first group of sample offsets of the first frame.

In some embodiments, the determining whether the DPCM is enabled for signalling the first group of differential sample offsets for the second component of the second frame of the plurality of frames according to the one or more classifiers comprises: receiving, from the video bitstream, a syntax element, wherein the syntax element indicates whether the DPCM is enabled for signalling the first group of differential sample offsets for the second component of the second frame of the plurality of frames according to the one or more classifiers.

In some embodiments, the modifying the set of one or more samples of the second component of the second frame based on the first group of differential sample offsets of the second frame and the first group of sample offsets of the first frame comprises: determining a second group of sample offsets for the second component of the second frame by adding the first group of differential sample offsets of the second frame to the first group of sample offsets of the first frame; and modifying the set of one or more samples of the second component of the second frame based on the second group of sample offsets.

In some embodiments, the method of decoding video bitstream further includes: in response to the DPCM being enabled for the signalling the first group of differential sample offsets, modifying a set of one or more samples of the second component of the first frame based on the first group of sample offsets.

In some embodiments, the first group of sample offsets for the second component according to the one or more classifiers is stored in adaptation parameter set (APS).

According to a second aspect of the present application, an electronic apparatus includes one or more processing units, memory and a plurality of programs stored in the memory. The programs, when executed by the one or more processing units, cause the electronic apparatus to perform the method of coding video bitstream as described above.

According to a third aspect of the present application, a non-transitory computer readable storage medium stores a plurality of programs for execution by an electronic apparatus having one or more processing units. The programs, when executed by the one or more processing units, cause the electronic apparatus to perform the method of coding video bitstream as described above.

According to a fourth aspect of the present application, a computer readable storage medium stores therein a bitstream comprising video information generated by the method for video coding as described above.

It is to be understood that both the foregoing general description and the following detailed description are examples only and are not restrictive of the present disclosure

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 5B is a block diagram depicting naming convention for samples surrounding the center sample, in accordance with some implementations of the present disclosure.

FIG. 6A is a block diagram illustrating that the system and process of CCSAO that are applied on chroma samples, and use DBF Y as the input according to some implementations of the present disclosure.

FIG. 9 is a flowchart illustrating an exemplary process of decoding video signal using cross-component correlation in accordance with some implementations of the present disclosure.

FIG. 10B illustrates some examples of different shapes for luma candidates, in accordance with some implementations of the present disclosure.

FIG. 12 illustrates exemplary classifiers by replacing the collocated luma sample value with a value obtained by weighing collocated and neighboring luma samples in accordance with some implementations of the present disclosure.

FIG. 13 is a block diagram illustrating that CCSAO is applied with other in-loop filters with different clipping combinations in accordance with some implementations of the present disclosure.

FIG. 16 shows additional 1 luma line buffer is required if all 9 collocated neighboring luma samples are used for classification in accordance with some implementations of the present disclosure.

FIG. 17 shows an illustration in AVS that 9 luma candidates CCSAO crossing VB may increase 2 additional luma line buffers in accordance with some implementations of the present disclosure.

FIG. 18A shows an illustration in VVC that 9 luma candidates CCSAO crossing VB may increase 1 additional luma line buffer in accordance with some implementations of the present disclosure.

FIG. 18B shows an illustration when collocated or neighbouring chroma samples are used to classify the current luma samples, the selected chroma candidate may be across VB and need additional chroma line buffer in accordance with some implementations of the present disclosure.

FIG. 23 shows the restrictions of using a limited number of luma candidates for classification in accordance with some implementations of the present disclosure.

FIG. 27 is a block diagram illustrating a plurality of classifiers used and switched at different levels within a picture frame in accordance with some implementations of the present disclosure.

FIG. 31 is a block diagram illustrating that for post prediction SAO filter, each component can use the current and neighboring samples for classification in accordance with some implementations of the present disclosure.

FIG. 33 is a flowchart illustrating an exemplary process of decoding video signal using cross-component correlation in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC, which provides approximately 30% bit-rate savings over the HEVC standard. In March 2019, at the 68-th AVS meeting, the AVS3-P2 baseline was finished, which provides approximately 30% bit-rate savings over the HEVC standard. Currently, one reference software, called high performance model (HPM), is maintained by the AVS group to demonstrate a reference implementation of the AVS3 standard. Like the HEVC, the AVS3 standard is built upon the block-based hybrid video coding framework.

Figure 1:
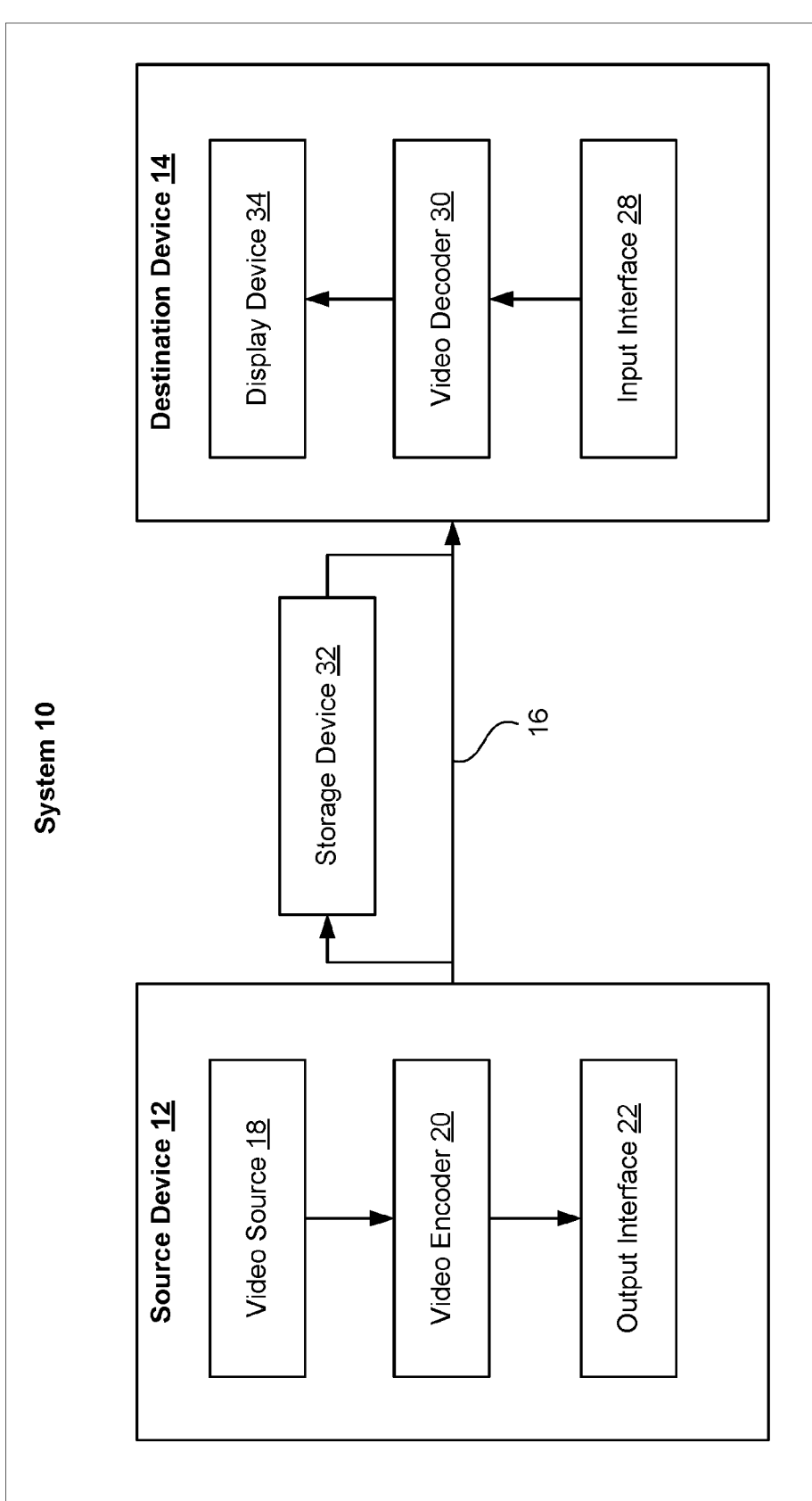
FIG. 1 is a block diagram illustrating an exemplary system for encoding and decoding video blocks in accordance with some implementations of the present disclosure.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that are suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, AVS, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
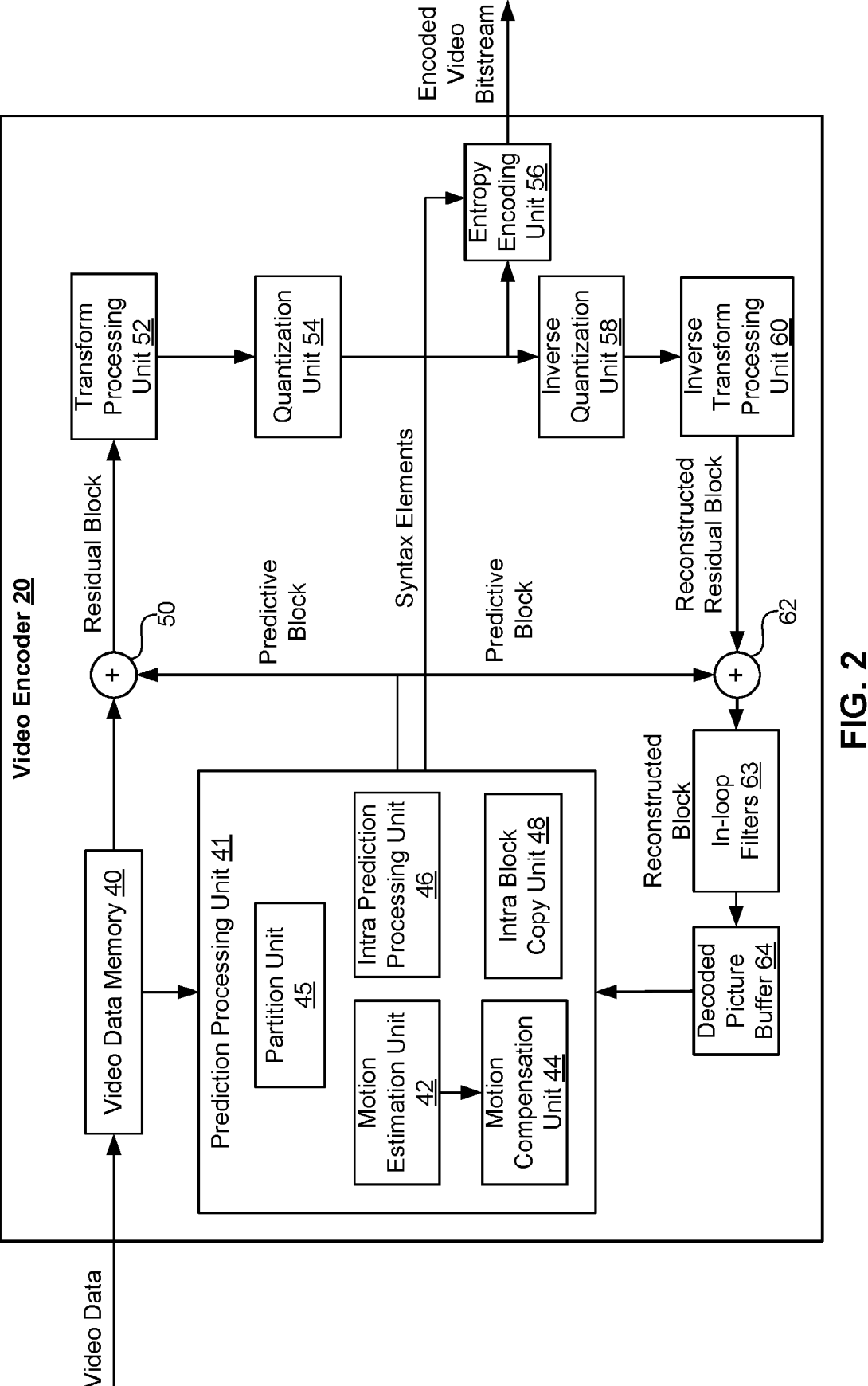
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, oneeighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
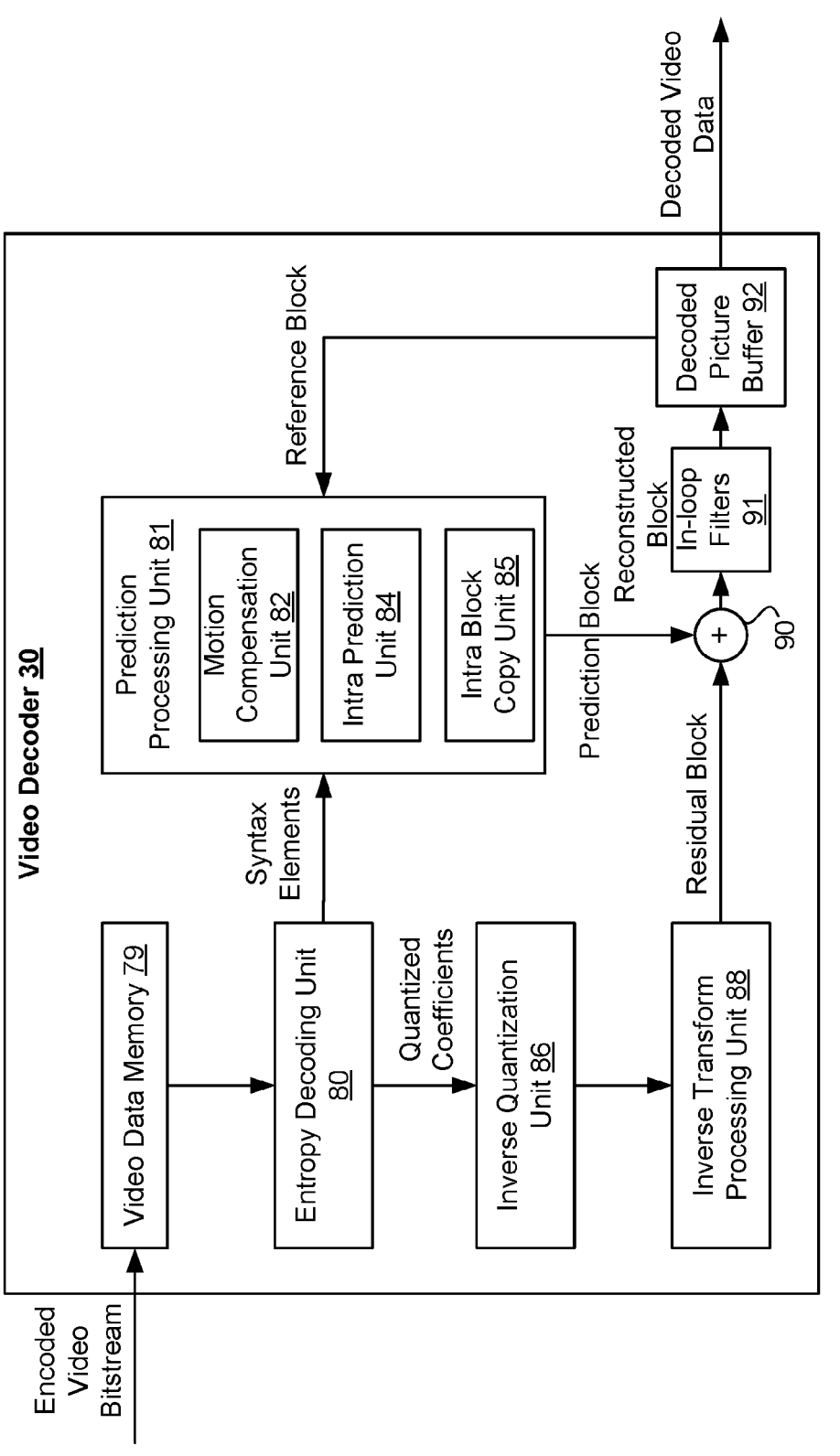
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. The in-loop filter 91 may be applied on the reconstructed CU before it is put in the reference picture store. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process, a video sequence typically includes an ordered set of frames or pictures. Each frame may include three sample arrays, denoted SL, SCb and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Like the HEVC, the AVS3 standard is built upon the block-based hybrid video coding framework. The input video signal is processed block by block (called coding units (CUs)). Different from the HEVC which partitions blocks only based on quad-trees, in the AVS3, one coding tree unit (CTU) is split into CUs to adapt to varying local characteristics based on quad/binary/extended-quad-tree. Additionally, the concept of multiple partition unit type in the HEVC is removed, i.e., the separation of CU, prediction unit (PU) and transform unit (TU) does not exist in the AVS3. Instead, each CU is always used as the basic unit for both prediction and transform without further partitions. In the tree partition structure of the AVS3, one CTU is firstly partitioned based on a quad-tree structure. Then, each quad-tree leaf node can be further partitioned based on a binary and extended-quad-tree structure.

Figure 4A:
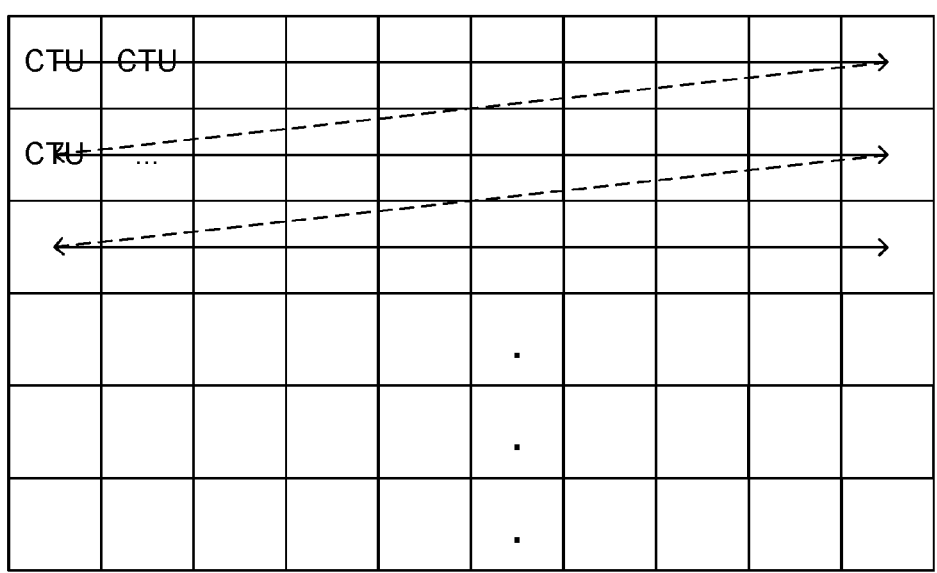
FIGS. 4A through 4E are block diagrams illustrating how a frame is recursively partitioned into multiple video blocks of different sizes and shapes in accordance with some implementations of the present disclosure.
Figure 4B:
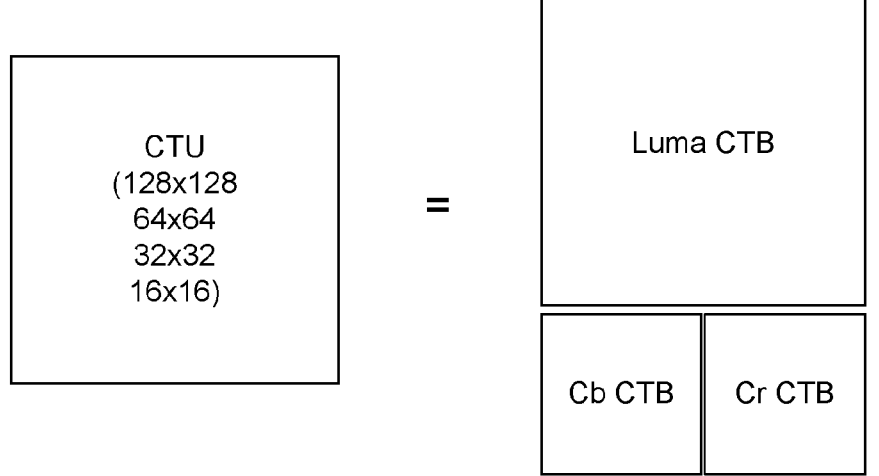

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
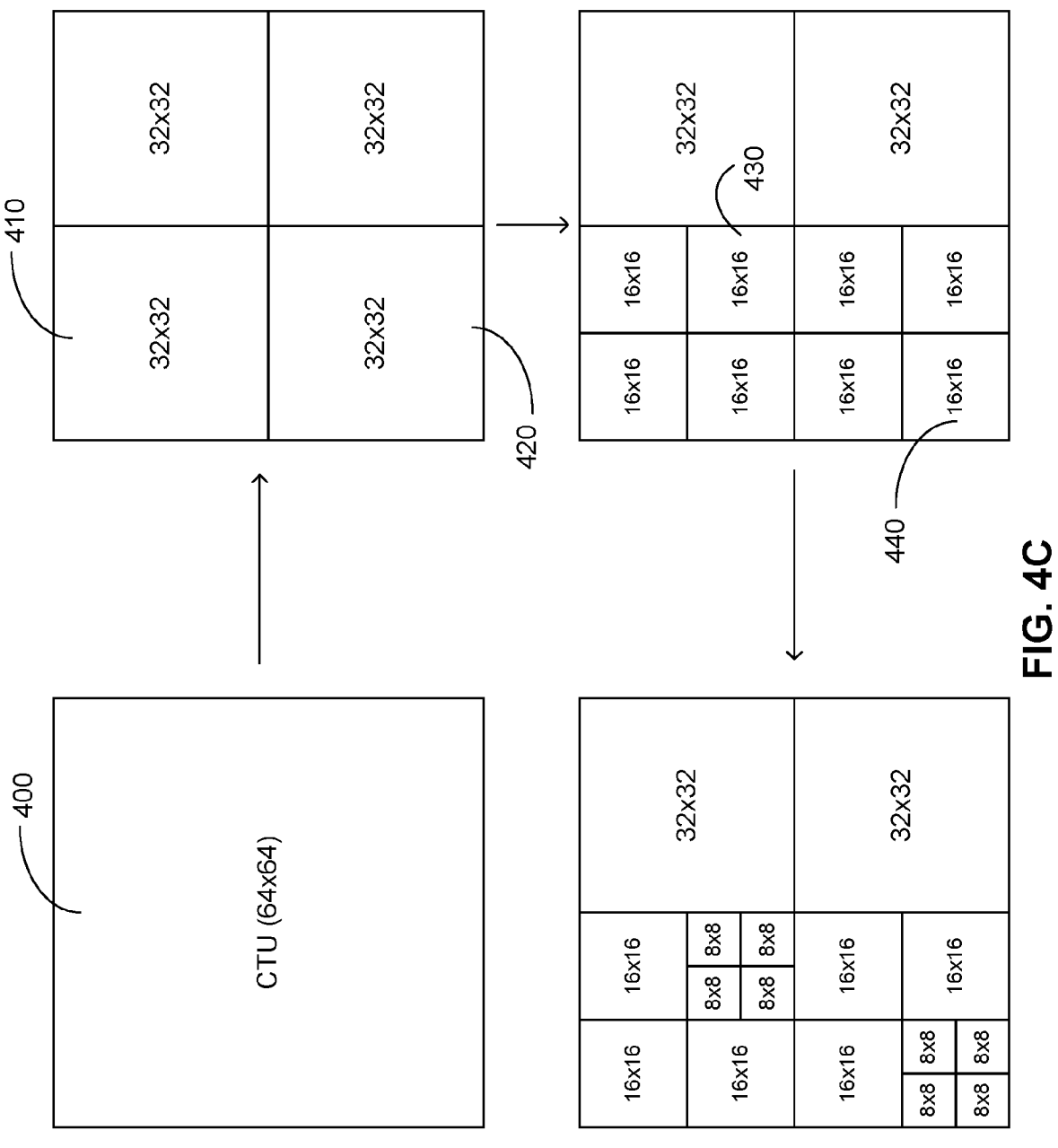
Figure 4D:
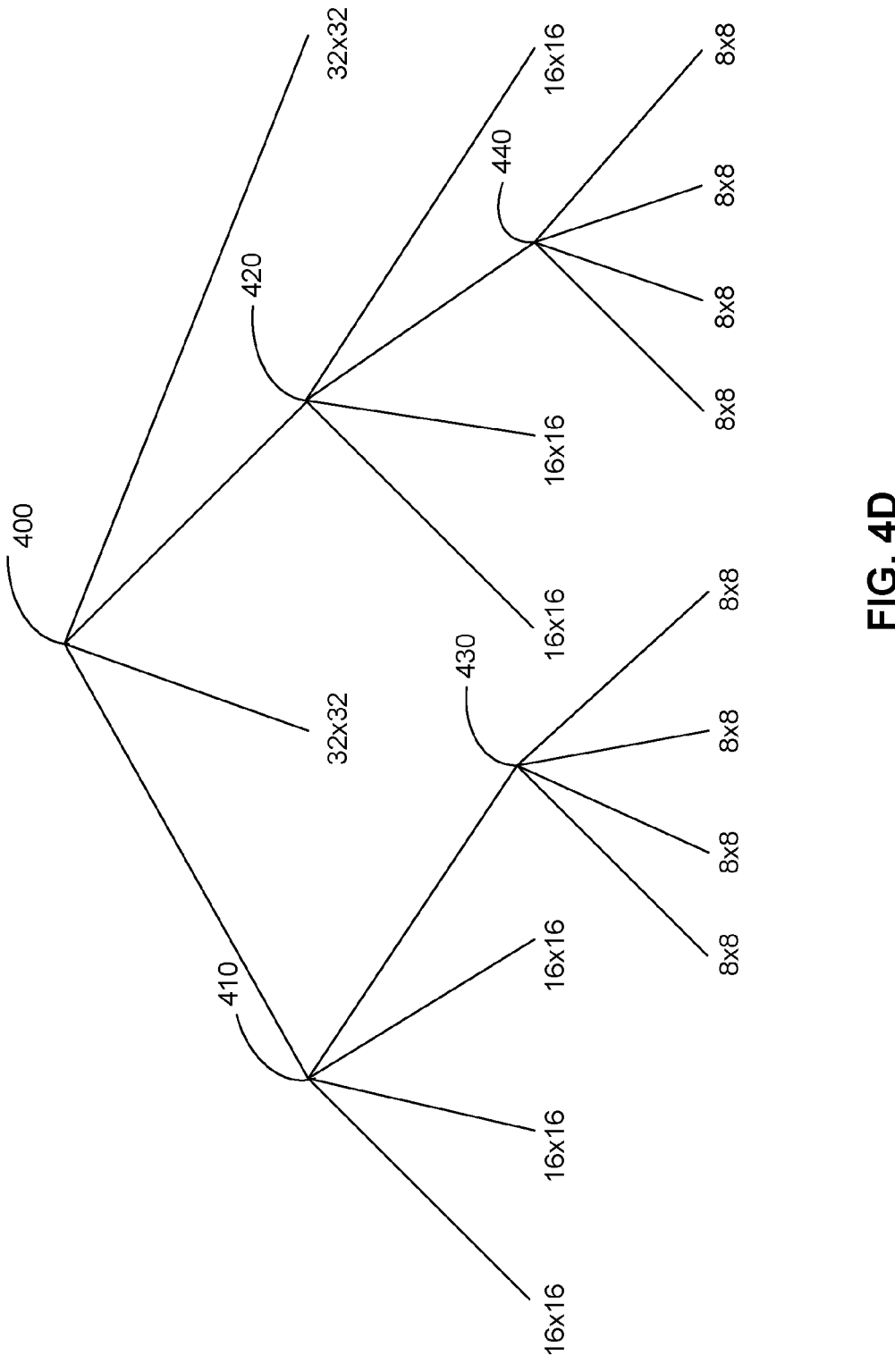
Figure 4E:
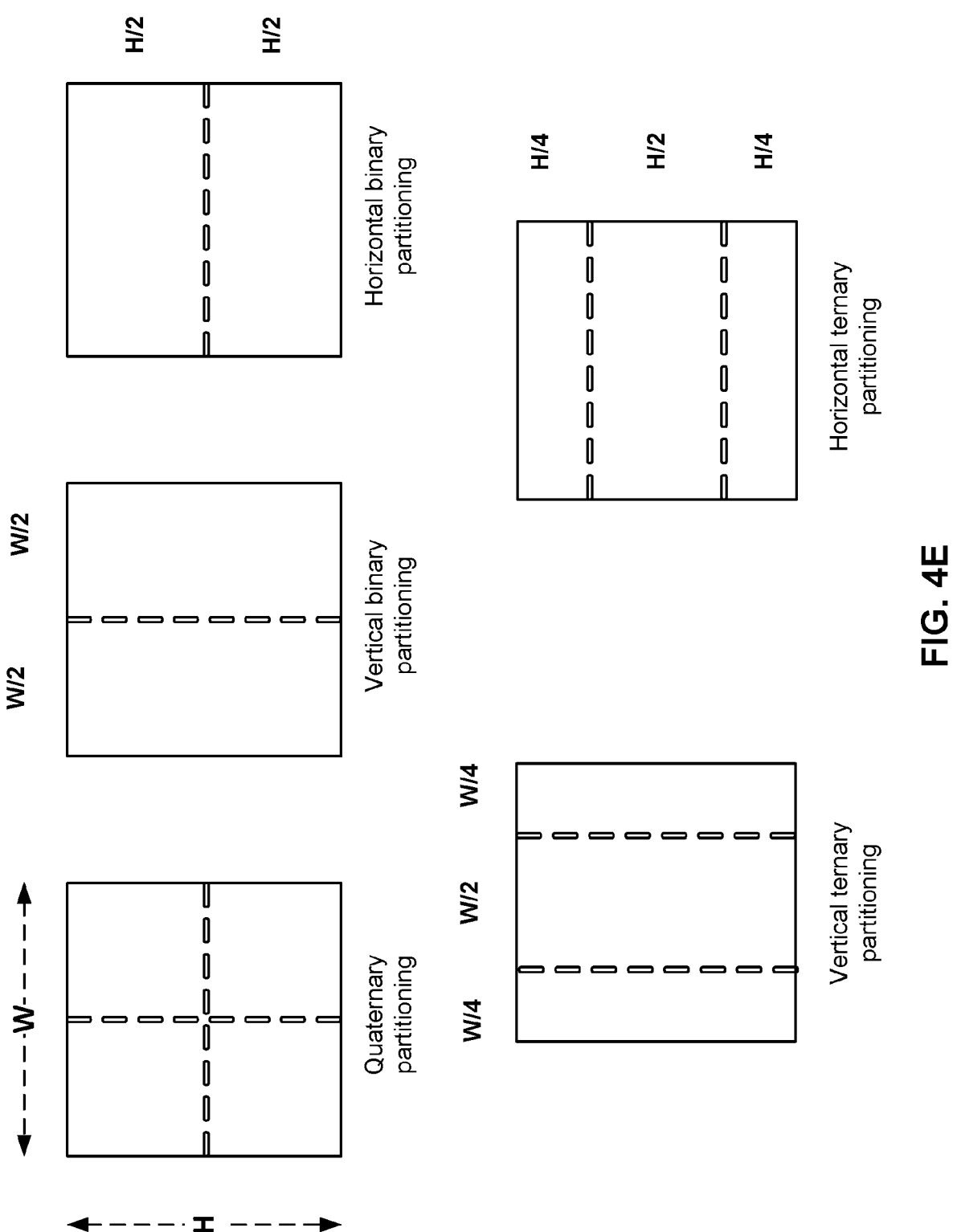

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning. In the AVS3, there are five possible partitioning types, i.e., quaternary partitioning, horizontal binary partitioning, vertical binary partitioning, horizontal extended quad-tree partitioning (not shown in FIG. 4E), and vertical extended quad-tree partitioning (not shown in FIG. 4E).

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 2, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

In general, the basic intra prediction scheme applied in VVC is almost kept the same as that of HEVC, except that several prediction tools are further extended, added and/or improved, e.g., extended intra prediction with wide-angle intra modes, Multiple Reference Line (MRL) intra prediction, Position-Dependent intra Prediction Combination (PDPC), Intra Sub-Partition (ISP) prediction, Cross-Component Linear Model (CCLM) prediction, and Matrix weighted Intra Prediction (MIP).

Like HEVC, VVC uses a set of reference samples neighboring a current CU (i.e., above the current CU or left to the current CU) to predict samples of the current CU. However, angular intra modes, and modes −1 to −14 and modes 67 to 80 are wide-angle intra modes. In addition to the angular intra modes, the planar mode (mode 0 in FIG. 1) and Direct Current (DC) mode (mode 1 in FIG. 1) of HEVC are also applied in VVC.

As shown in FIG. 4E, since a quad/binary/ternary tree partition structure is applied in VVC, besides video blocks in square shape, rectangular video blocks also exist for the intra prediction in VVC. Due to unequal width and height of one given video block, various sets of angular intra modes may be selected from the 93 angular intra modes for different block shapes. More specifically, for both square and rectangular video blocks, besides planar and DC modes, 65 angular intra modes among the 93 angular intra modes are also supported for each block shape. When a rectangular block shape of a video block satisfies a certain condition, an index of a wide-angle intra mode of the video block may be adaptively determined by the video decoder 30 according to an index of a conventional angular intra mode received from the video encoder 20 using a mapping relationship as shown in Table 1 below. That is, for non-square blocks, the wide-angle intra modes are signaled by the video encoder 20 using the indexes of the conventional angular intra modes, which are mapped to indexes of the wide-angle intra modes by the video decoder 30 after being parsed, thus ensuring that a total number (i.e., 67) of intra modes (i.e., the planar mode, the DC mode and 65 angular intra modes among the 93 angular intra modes) is unchanged, and the intra-prediction mode coding method is unchanged. As a result, a good efficiency of signaling intra-prediction modes is achieved while providing a consistent design across different block sizes.

Table 1-0 shows a mapping relationship between indexes of conventional angular intra modes and indexes of wide-angle intra modes for the intra prediction of different block shapes in VVC, wherein W represents a width of a video block, and H represents a height of the video block.

TABLE 1-0

Figure 4F:
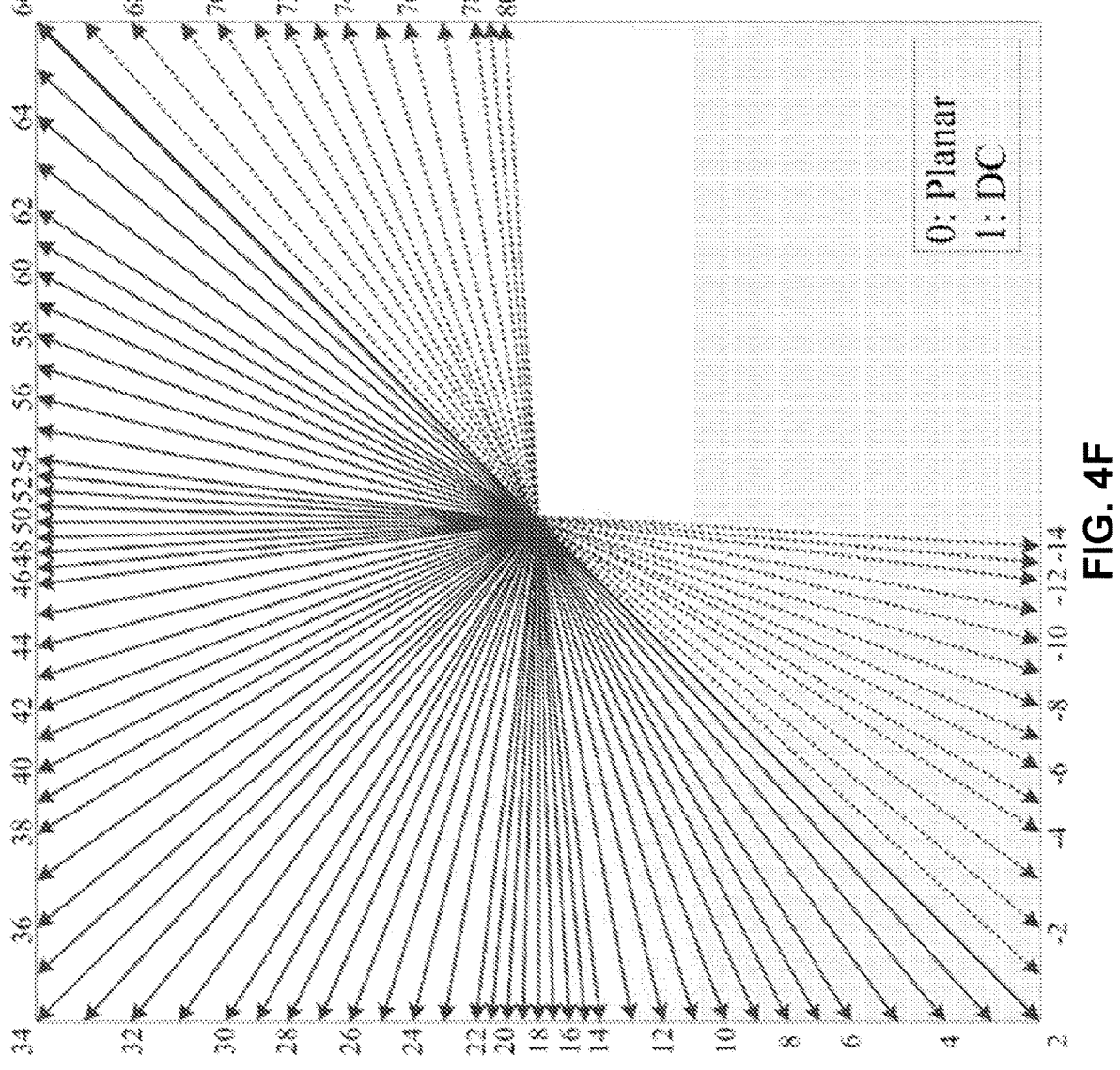
FIG. 4F is a block diagram illustrating intra modes as defined in VVC.
Figure 4G:
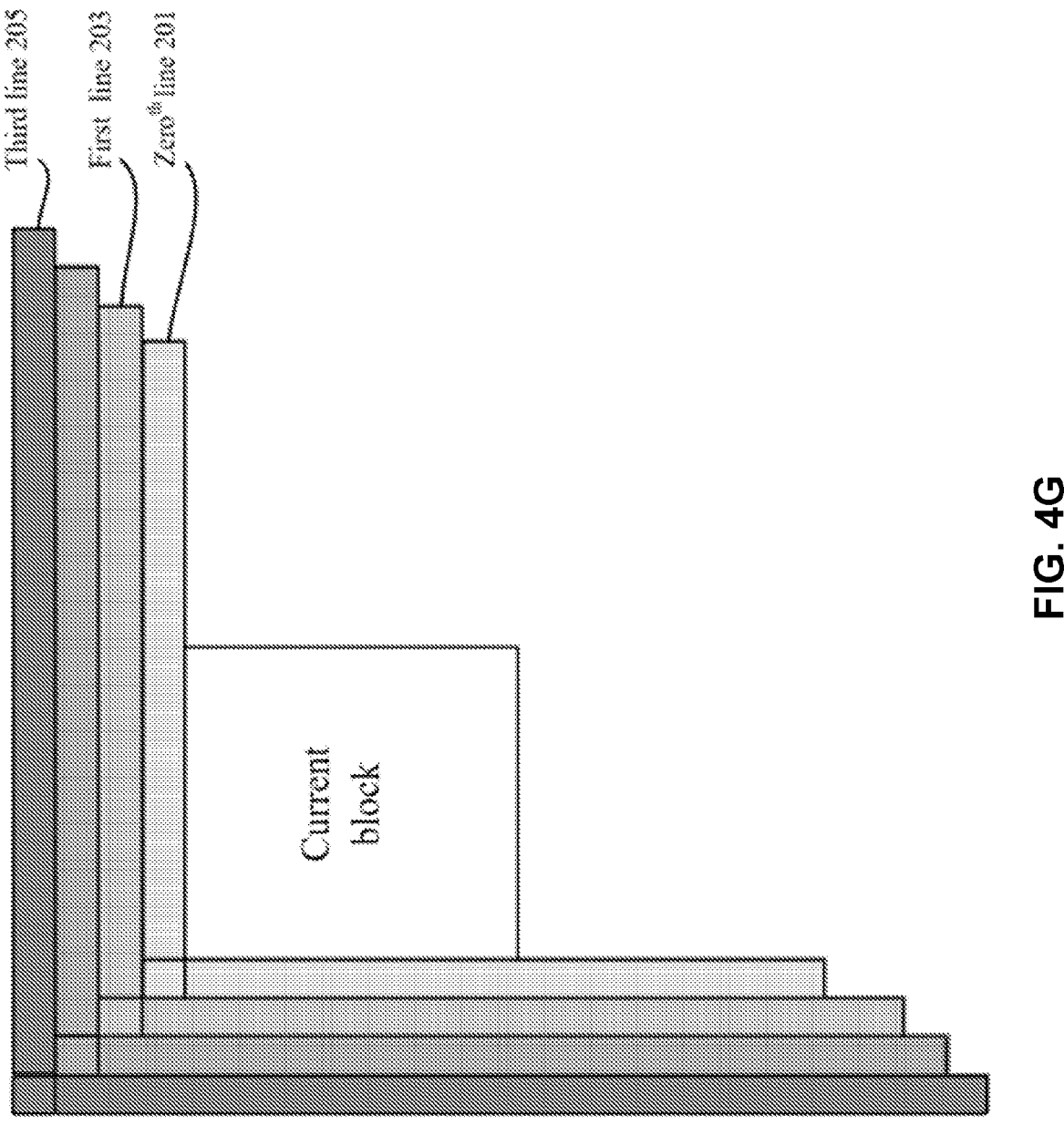
FIG. 4G is a block diagram illustrating multiple reference lines for intra prediction.

| A mapping relationship between indexes of conventional angular intra modes and indexes of wide-angle intra modes. | | | |
|---|---|---|---|
| Block shape | Aspect ratio | Indexes of conventional angular intra modes | Indexes of wide-angle intra modes |
| Square, W = H | W/H == 1 | None | None |
| Flat rectangle, W > H | W/H == 2 | 2, 3, 4, 5, 6, 7, 8, 9 | 67, 68, 69, 70, 71, 72, 73, 74 |
| | W/H == 4 | 2, 3, 4, 5, 6, 7, 8, 9, 10, 11 | 67, 68, 69, 70, 71, 72, 73, 74, 75, 76 |
| | W/H == 8 | 2, 3, 4, 5, 6, 7, 8, 9, 10, 11, 12, 13 | 67, 68, 69, 70, 71, 72, 73, 74, 75, 76, 77, 78 |
| | W/H == 16 | 2, 3, 4, 5, 6, 7, 8, 9, 10, 11, 12, 13, 14, 15 | 67, 68, 69, 70, 71, 72, 73, 74, 75, 76, 77, 78, 79, 80 |
| Tall rectangle, W < H | W/H == 1/2 | 59, 60, 61, 62, 63, 64, 65, 66 | −8, −7, −6, −5, −4, −3, −2, −1 |
| | W/H == 1/4 | 57, 58, 59, 60, 61, 62, 63, 64, 65, 66 | −10, −9, −8, −7, −6, −5, −4, −3, −2, −1 |
| | W/H == 1/8 | 55, 56, 57, 58, 59, 60, 61, 62, 63, 64, 65, 66 | −12, −11, −10, −9, −8, −7, −6, −5, −4, −3, −2, −1 |
| | W/H == 1/16 | 53, 54, 55, 56, 57, 58, 59, 60, 61, 62, 63, 64, 65, 66 | −14, −13, −12, −11, −10, −9, −8, −7, −6, −5, −4, −3, −2, −1 | to capture finer edge directions present in natural video (especially for video content in high resolutions, e.g., 4K), a number of angular intra modes is extended from 33 in HEVC to 93 in VVC. FIG. 4F is a block diagram illustrating intra modes as defined in VVC. As shown in FIG. 4F, among the 93 angular intra modes, modes 2 to 66 are conventional Similarly to the intra prediction in HEVC, all the intra modes (i.e., planar, DC and angular intra modes) in VVC utilize a set of reference samples above and left to a current video block for intra prediction. However, differently from HEVC where only the nearest row/column (i.e., a zero$^{th}$ line 201 in FIG. 4G) of reference samples are used, MRL intra prediction is introduced in VVC where in addition to the nearest row/column of reference samples, two additional rows/columns of reference samples (i.e., a first line 203 and a third line 205 in FIG. 4G) may be used for the intra prediction. An index of a selected row/column of reference samples is signaled from the video encoder 20 to the video decoder 30. When a non-nearest row/column of reference samples (i.e., the first line 203 or the third line 205 in FIG. 4G) is selected, the planar mode is excluded from a set of intra modes that may be used to predict the current video block. The MRL intra prediction is disabled for a first row/column of video blocks inside a current CTU to prevent using extended reference samples outside the current CTU.

Sample Adaptive Offset (SAO) is a process that modifies the decoded samples by conditionally adding an offset value to each sample after the application of the deblocking filter, based on values in look-up tables transmitted by the encoder. SAO filtering is performed on a region basis, based on a filtering type selected per CTB by a syntax element sao-type-idx. A value of 0 for sao-type-idx indicates that the SAO filter is not applied to the CTB, and the values 1 and 2 signal the use of the band offset and edge offset filtering types, respectively. In the band offset mode specified by sao-type-idx equal to 1, the selected offset value directly depends on the sample amplitude. In this mode, the full sample amplitude range is uniformly split into 32 segments called bands, and the sample values belonging to four of these bands (which are consecutive within the 32 bands) are modified by adding transmitted values denoted as band offsets, which can be positive or negative. The main reason for using four consecutive bands is that in the smooth areas where banding artifacts can appear, the sample amplitudes in a CTB tend to be concentrated in only few of the bands. In addition, the design choice of using four offsets is unified with the edge offset mode of operation which also uses four offset values. In the edge offset mode specified by sao-type-idx equal to 2, a syntax element sao-eo-class with values from 0 to 3 signals whether a horizontal, vertical or one of two diagonal gradient directions is used for the edge offset classification in the CTB.

Figure 5A:
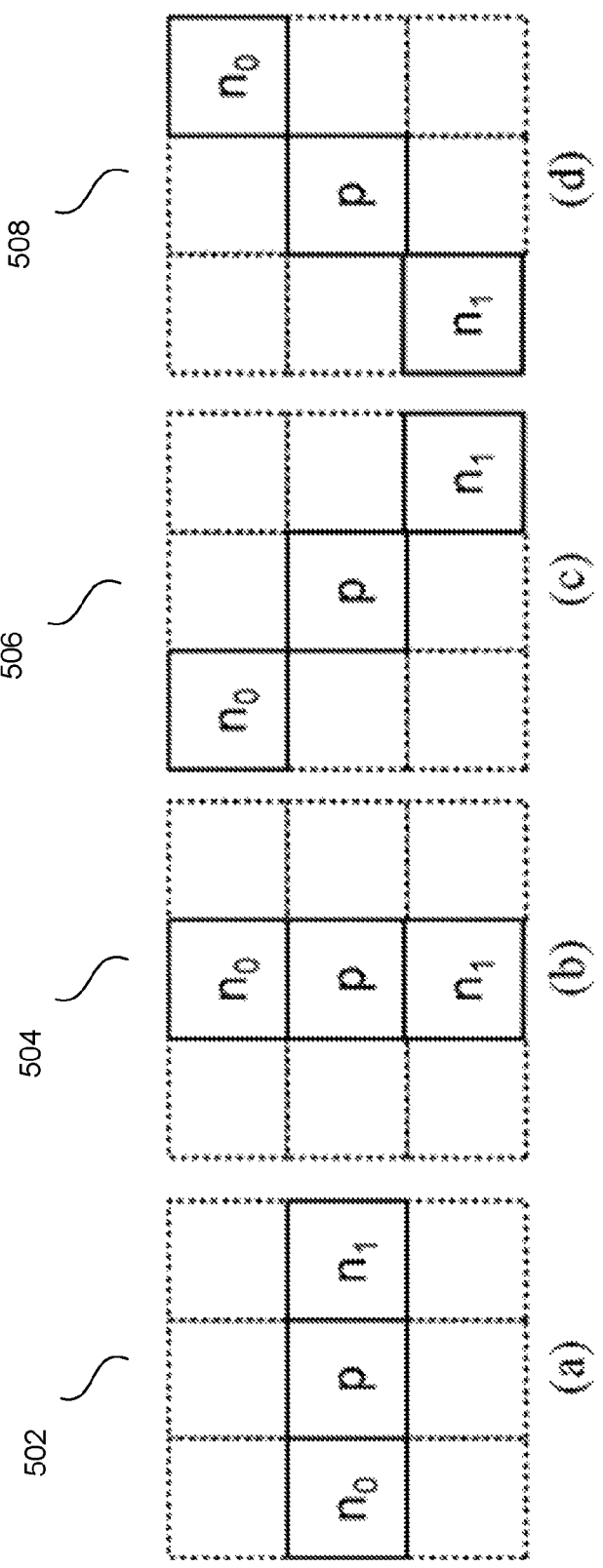
FIG. 5A is a block diagram depicting the four gradient patterns used in Sample Adaptive Offset (SAO) in accordance with some implementations of the present disclosure.

FIG. 5A is a block diagram depicting the four gradient patterns used in SAO in accordance with some implementations of the present disclosure. The four gradient patterns 502, 504, 506, and 508 are for the respective sao-eo-class in the edge offset mode. Sample labelled "p" indicates a center sample to be considered. Two samples labelled "n0" and "n1" specify two neighboring samples along the (a) horizontal (sao-eo-class=0), (b) vertical (sao-eo-class=1), (c) 135° diagonal (sao-eo-class=2), and (d) 45° (sao-eo-class=3) gradient patterns. Each sample in the CTB is classified into one of five EdgeIdx categories by comparing the sample value p located at some position with the values n0 and n1 of two samples located at neighboring positions as shown in FIG. 5A. This classification is done for each sample based on decoded sample values, so no additional signaling is required for the EdgeIdx classification. Depending on the EdgeIdx category at the sample position, for EdgeIdx categories from 1 to 4, an offset value from a transmitted look-up table is added to the sample value. The offset values are always positive for categories 1 and 2 and negative for categories 3 and 4. Thus the filter generally has a smoothing effect in the edge offset mode. Table 1-1 below illustrates a sample EdgeIdx categories in SAO edge classes.

TABLE 1-1

| EdgeIdx | Condition | Meaning |
|---|---|---|
| | A sample EdgeIdx categories in SAO edge classes. | |
| 0 | Cases not listed below | Monotonic area |
| 1 | $P < n_0$ and $P < n_1$ | Local min |
| 2 | $P < n_0$ and $P = n_1$ or $P < n_1$ and $P = n_0$ | Edge |
| 3 | $P > n_0$ and $P = n_1$ or $P > n_1$ and $P = n_0$ | Edge |
| 4 | $P > n_0$ and $P > n_1$ | Local max |

For SAO types 1 and 2, a total of four amplitude offset values are transmitted to the decoder for each CTB. For type 1, the sign is also encoded. The offset values and related syntax elements such as sao-type-idx and sao-eo-class are determined by the encoder—typically using criteria that optimize rate-distortion performance. The SAO parameters can be indicated to be inherited from the left or above CTB using a merge flag to make the signaling efficient. In summary, SAO is a nonlinear filtering operation which allows additional refinement of the reconstructed signal, and it can enhance the signal representation in both smooth areas and around edges.

In some embodiments, Pre-Sample Adaptive Offset (Pre-SAO) is implemented. The coding performance of pre-SAO with low complexity is promising in the future video coding standard development. In some examples, Pre-SAO is only applied on luma component samples using luma samples for classification. Pre-SAO operates by applying two SAO-like filtering operations called SAOV and SAOH and they are applied jointly with the deblocking filter (DBF) before applying the existing (legacy) SAO. The first SAO-like filter SAOV operates as applying SAO to the input picture $Y_2$ after the deblocking filter for the vertical edges (DBFV) is applied.

$$Y_3(i) = Clip1(Y_2'(i) + d_1 \cdot (f(i) > T?1:0) - d_2 \cdot (f(i) < -T?1:0))$$

where T is a predetermined positive constant and $d_1$ and $d_2$ are offset coefficients associated with two classes based on the sample-wise difference between $Y_1(i)$ and $Y_2(i)$ given by $$f(i) = Y_1(i) - Y_2(i).$$

The first class for $d_1$ is given as taking all sample locations i such that $f(i) > T$ while the second class for $d_2$ is given by $f(i) < -T$. The offset coefficients $d_1$ and $d_2$ are calculated at the encoder so that the mean square error between output picture $Y_3$ of SAOV and the original picture X is minimized, in the same way as in the existing SAO process. After SAOV is applied, the second SAO-like filter SAOH operates as applying SAO to $Y_4$, after SAOV has been applied, with a classification based on the sample-wise difference between $Y_3(i)$ and $Y_4(i)$, the output picture of the deblocking filter for the horizontal edges (DBFH). The same procedure as SAOV is applied for SAOH with $Y_3(i) - Y_4(i)$ instead of $Y_1(i) - Y_2(i)$ for its classification. The two offset coefficients, a predetermined threshold value T and an enabling flag for each of SAOH and SAOV are signaled at the slice level. SAOH and SAOV are applied for luma and the two chroma components independently.

In some instances, that both SAOV and SAOH operate only on the picture samples affected by the respective deblocking (DBFV or DBFH). Hence, unlike the existing SAO process, only a subset of all samples in the given spatial region (picture, or CTU in case of legacy SAO) are being processed by the Pre-SAO, which keeps the resulting increase in decoder-side mean operations per picture sample low (two or three comparisons and two additions per sample in the worst-case scenario according to preliminary estimates). Pre-SAO only needs samples used by the deblocking filter without storing additional samples at the decoder.

In some embodiments, bilateral filter (BIF) is implemented for compression efficiency exploration beyond VVC. The BIF is carried out in the sample adaptive offset (SAO) loop-filter stage. Both the bilateral filter (BIF) and SAO are using samples from deblocking as input. Each filter creates an offset per sample, and these are added to the input sample and then clipped, before proceeding to ALF.

In detail, the output sample $I_{OUT}$ is obtained as $$I_{OUT} = \text{clip3}(I_C + \Delta I_{BIF} + \Delta I_{SAO}),$$

where $I_C$ is the input sample from deblocking, $\Delta I_{BIF}$ is the offset from the bilateral filter and $\Delta I_{SAO}$ is the offset from SAO.

In some embodiments, the implementation provides the possibility for the encoder to enable or disable filtering at the CTU and slice level. The encoder takes a decision by evaluating the Rate-distortion optimization (RDO) cost.

The following syntax elements are introduced in the PPS:

TABLE 1-2

Picture parameter set RBSP syntax.

| | Descriptor |
|---|---|
| pic_parameter_set_rbsp( ) { | |
| ... | |
| pps_bilateral_filter_enabled_flag | u(1) |
| if( pps_bilateral_filter_enabled_flag) { | |
| bilateral_filter_strength | u(2) |
| bilateral_filter_qp_offset | se(v) |
| } | | pps_bilateral_filter_enabled_flag equal to 0 specifies that the bilateral loop filter is disabled for slices referring to the PPS. pps_bilateral_filter_flag equal to 1 specifies that the bilateral loop filter is enabled for slices referring to the PPS.

bilateral_filter_strength specifies a bilateral loop filter strength value used in the bilateral transform block filter process. The value of bilateral_filter_strength shall be in the range of 0 to 2, inclusive.

bilateral_filter_qp_offset specifies an offset used in the derivation of the bilateral filter look-up table, LUT(x), for slices referring to the PPS. bilateral_filter_qp_offset shall be in the range of −12 to +12, inclusive.

The following syntax elements, are introduced:

TABLE 1-3

Slice header syntax.

| | Descriptor |
|---|---|
| slice_header( ) { | |
| ... | |
| if( pps_bilateral_filter_enabled_flag ) { | |
| slice_bilateral_filter_all_ctb_enabled_flag | u(1) |
| if( !slice_bilateral_filter_all_ctb_enabled_flag ) | |
| slice_bilateral_filter_enabled_flag | u(1) |
| } | |

TABLE 1-4

Coding tree unit syntax.

| | Descriptor |
|---|---|
| coding_tree_unit( ) { | |
| ... | |
| if( !slice_bilateral_filter_all_ctb_enabled_flag && slice_bilateral_filter_enabled_flag ) | |
| bilateral_filter_ctb_flag[ xCtb >> CtbLog2SizeY ][ yCtb >> CtbLog2SizeY ] | u(1) |

The semantic is as follows: slice_bilateral_filter_all_ctb_enabled_flag equal to 1 specifies that the bilateral filter is enabled and is applied to all CTBs in the current slice. When slice_bilateral_filter_all_ctb_enabled_flag is not present, it is inferred to be equal to 0.

slice_bilateral_filter_enabled_flag equal to 1 specifies that the bilateral filter is enabled and may be applied to CTBs of the current slice. When slice_bilateral_filter_enabled_flag is not present, it is inferred to be equal to slice_bilateral_filter_all_ctb_enabled_flag.

bilateral_filter_ctb_flag [xCtb>>CtbLog 2SizeY] [yCtb>>CtbLog 2SizeY] equal to 1 specifies that the bilateral filter is applied to the luma coding tree block of the coding tree unit at luma location (xCtb, yCtb). bilateral_filter_ctb_flag [cIdx][xCtb>>CtbLog 2SizeY][yCtb>>CtbLog 2SizeY] equal to 0 specifies that the bilateral filter is not applied to the luma coding tree block of the coding tree unit at luma location (xCtb, yCtb). When bilateral_filter_ctb_flag is not present, it is inferred to be equal (slice_bilateral_filter_all_ctb_enabled_flag & slice_bilateral_filter_enabled_flag).

Figure 5B:
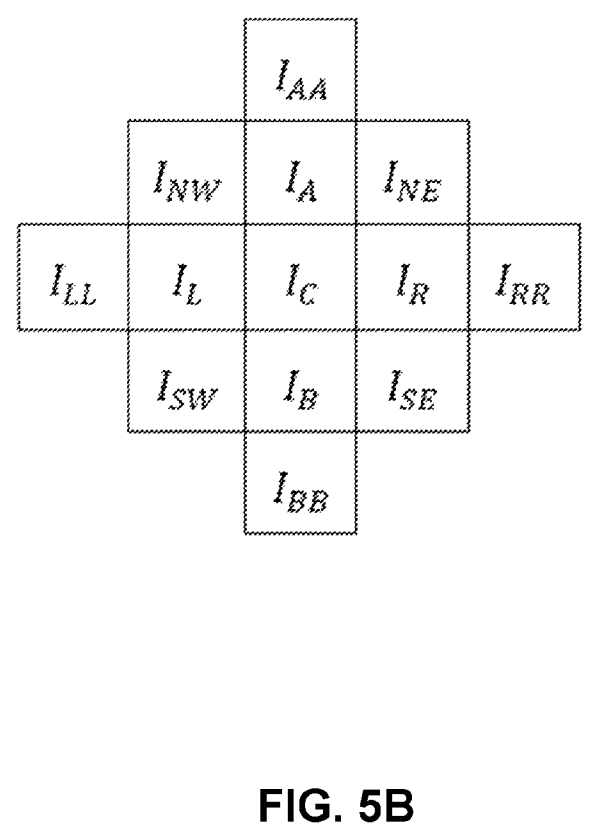

In some examples, for CTUs that are filtered, and the filtering process proceeds as follows. At the picture border, where samples are unavailable, the bilateral filter uses extension (sample repetition) to fill in unavailable samples. For virtual boundaries, the behavior is the same as for SAO, i.e., no filtering occurs. When crossing horizontal CTU borders, the bilateral filter can access the same samples as SAO is accessing. FIG. 5B is a block diagram depicting naming convention for samples surrounding the center sample, in accordance with some implementations of the present disclosure. As an example, if the center sample $I_C$ is located on the top line of a CTU, $I_{NW}$, $I_A$ and $I_{NE}$ are read from the CTU above, just like SAO does, but $I_{AA}$ is padded, so no extra line buffer is needed. The samples surrounding the center sample $I_C$ are denoted according to FIG. 5B, where A, B, L and R stands for above, below, left and right and where NW, NE, SW, SE stands for north-west etc. Likewise, AA stands for above-above, BB for below-below etc. This diamond shape is different from another method which uses a square filter support, not using $I_{AA}$, $I_{BB}$, $I_{LL}$, or $I_{RR}$.

Each surrounding sample $I_A$, $I_R$ etc will contribute with a corresponding modifier value $\mu_{\Delta I_A}$, $\mu_{\Delta I_R}$, etc. These are calculated the following way: starting with the contribution from the sample to the right, $I_R$, the difference is calculated as:

$$\Delta I_R = (|I_R - I_C| + 4) >> 3,$$

where |•| denotes absolute value. For data that is not 10-bit, $\Delta I_R$ $(|I_R - I_C| + 2^{n-6}) >> (n-7)$ is used instead, where n=8 for 8-bit data etc. The resulting value is now clipped so that it is smaller than 16:

$$sI_R = \min(15, \Delta I_R).$$

The modifier value is now calculated as $$\mu_{\Delta I_R} = \begin{cases} LUT_{ROW}[sI_R], & \text{if } I_R - I_C \geq 0, \\ -LUT_{ROW}[sI_R] & \text{otherwise} \end{cases}$$

where $LUT_{ROW}[\ ]$ is an array of 16 values determined by the value of qpb=clip(0, 25, QP+bilateral_filter_qp_offset-17):

{0, 0, 0, 0, 0, 0, 0, 0, 0, 0, 0, 0, 0, 0, 0, 0,}, if qpb=0
{0, 1, 1, 1, 1, 0, 0, 0, 0, 0, 0, 0, 0, 0, 0, 0,}, if qpb=1
{0, 2, 2, 22, 1, 1, 0, 1, 0, 0, 0, 0, 0, 0, 0, −1,}, if qpb=2
{0, 2, 2, 2, 2, 1, 1, 1, 1, 1, 1, 1, 0, 1, 1, −1,}, if qpb=3
{0, 3, 3, 3, 2, 1, 2, 1, 1, 1, 1, 0, 1, 1, −1,}, if qpb=4
{0, 4, 4, 4, 3, 2, 1, 2, 1, 1, 1, 1, 0, 1, 1, −1,}, if qpb=5
{0, 5, 5, 5, 4, 3, 2, 2, 2, 2, 2, 1, 0, 1, 1, −1,}, if qpb=6
{0, 6, 7, 7, 5, 3, 3, 3, 3, 2, 2, 1, 1, 1, 1, −1,}, if qpb=7
{0, 6, 8, 8, 5, 4, 3, 3, 3, 3, 3, 2, 1, 2, 2, −2,}, if qpb=8
{0, 7, 10, 10, 6, 4, 4, 4, 4, 3, 3, 2, 2, 2, 2, −2,}, if qpb=9
{0, 8, 11, 11, 7, 5, 5, 4, 5, 4, 4, 2, 2, 2, 2, −2,}, if qpb=10
{0, 8, 12, 13, 10, 8, 8, 6, 6, 6, 5, 3, 3, 3, 3, −2,}, if qpb=11
{0, 8, 13, 14, 13, 12, 11, 8, 8, 7, 7, 5, 5, 4, 4, −2,}, if qpb=12
{0, 9, 14, 16, 16, 15, 14, 11, 9, 9, 8, 6, 6, 5, 6, −3,}, if qpb=13
{0, 9, 15, 17, 19, 19, 17, 13, 11, 10, 10, 8, 8, 6, 7, −3,}, if qpb=14
{0, 9, 16, 19, 22, 22, 20, 15, 12, 12, 11, 9, 9, 7, 8, −3,}, if qpb=15
{0, 10, 17, 21, 24, 25, 24, 20, 18, 17, 15, 12, 11, 9, 9, −3,}, if qpb=16
{0, 10, 18, 23, 26, 28, 28, 25, 23, 22, 18, 14, 13, 11, 11, −3,}, if qpb=17
{0, 11, 19, 24, 29, 30, 32, 30, 29, 26, 22, 17, 15, 13, 12, −3,}, if qpb=18
{0, 11, 20, 26, 31, 33, 36, 35, 34, 31, 25, 19, 17, 15, 14, −3,}, if qpb=19
{0, 12, 21, 28, 33, 36, 40, 40, 40, 36, 29, 22, 19, 17, 15, −3,}, if qpb=20
{0, 13, 21, 29, 34, 37, 41, 41, 41, 38, 32, 23, 20, 17, 15, −3,}, if qpb=21
{0, 14, 22, 30, 35, 38, 42, 42, 42, 39, 34, 24, 20, 17, 15, −3,}, if qpb=22
{0, 15, 22, 31, 35, 39, 42, 42, 43, 41, 37, 25, 21, 17, 15, −3,}, if qpb=23
{0, 16, 23, 32, 36, 40, 43, 43, 44, 42, 39, 26, 21, 17, 15, −3,}, if qpb=24
{0, 17, 23, 33, 37, 41, 44, 44, 45, 44, 42, 27, 22, 17, 15, −3,}, if qpb=25

These values can be stored using six bits per entry resulting in 26*16*6/8=312 bytes or 300 bytes if excluding the first row which is all zeros. The modifier values for $\mu_{\Delta I_L}$, $\mu_{\Delta I_A}$ and $\mu_{\Delta I_B}$ are calculated from $I_L$, $I_A$ and $I_B$ in the same way. For diagonal samples $I_{NW}$, $I_{NE}$, $I_{SE}$, $I_{SW}$, and the samples two steps away $I_{AA}$, $I_{BB}$, $I_{RR}$ and $I_{LL}$, the calculation also follows Equations 2 and 3, but uses a value shifted by 1. Using the diagonal sample $I_{SE}$ as an example, $$\mu_{\Delta I_{SE}} = \begin{cases} LUT_{ROW}[sI_{SE}] \gg 1, & \text{if } I_{SE} - I_C \geq 0, \\ -(LUT_{ROW}[sI_{SE}] \gg 1) & \text{otherwise} \end{cases}$$

and the other diagonal samples and two-steps-away samples are calculated likewise.

The modifier values are summed together $$m_{sum} = \mu_{\Delta I_A} + \mu_{\Delta I_B} + \mu_{\Delta I_L} + \mu_{\Delta I_R} + \mu_{\Delta I_{NW}} + \mu_{\Delta I_{NE}} + \mu_{\Delta I_{SW}} + \mu_{\Delta I_{SE}} + \mu_{\Delta I_{AA}} + \mu_{\Delta I_{BB}} + \mu_{\Delta I_{LL}} + \mu_{\Delta I_{RR}}.$$

In some examples, $\mu_{\Delta I_R}$ equals $-\mu_{\Delta I_A}$ for the previous sample. Likewise, $\mu_{\Delta I_A}$ equals $-\mu_{\Delta I_B}$ for the sample above, and similar symmetries can be found also for the diagonal- and two-steps-away modifier values. This means that in a hardware implementation, it is sufficient to calculate the six values $\mu_{\Delta I_R}$, $\mu_{\Delta I_B}$, $\mu_{\Delta I_{SW}}$, $\mu_{\Delta I_{SE}}$, $\mu_{\Delta I_{RR}}$ and $\mu_{\Delta I_{BB}}$ and the remaining six values can be obtained from previously calculated values.

The $m_{sum}$ value is now multiplied either by c=1, 2 or 3, which can be done using a single adder and logical AND gates in the following way:

$$c_v = k_1 \& (m_{sum} << 1) + k_2 \& m_{sum},$$

where & denotes logical and $k_1$ is the most significant bit of the multiplier c and $k_2$ is the least significant bit. The value to multiply with is obtained using the minimum block dimension D=min(width, height) as shown in Table 1-5:

TABLE 1-5

| Obtaining the c parameter from the minimum size D = min(width, height) of the block. | | | |
|---|---|---|---|
| Block type | D ≤ 4 | 4 < D < 16 | D ≥ 16 |
| Intra | 3 | 2 | 1 |
| Inter | 2 | 2 | 1 |

Finally, the bilateral filter offset $\Delta I_{BIF}$ is calculated. For full strength filtering, the following is used:

$$\Delta I_{BIF} = (c_v + 16) >> 5,$$

whereas for half-strength filtering, the following is used:

$$\Delta I_{BIF} = (c_v + 32) >> 6.$$

A general formula for n-bit data is to use $$r_{add} = 2^{14-n-bilateral\_filter\_strength}$$

$$r_{shift} = 15 - n - bilateral\_filter\_strength$$

$$\Delta I_{BIF} = (c_v + r_{add}) >> r_{shift},$$

where bilateral_filter_strength can be 0 or 1 and is signalled in the pps.

In some embodiments, methods and systems are disclosed herein to improve the coding efficiency or reduce the complexity of Sample Adaptive Offset (SAO) by introducing cross-component information. SAO is used in the HEVC, VVC, AVS2 and AVS3 standards. Although the existing SAO design in the HEVC, VVC, AVS2 and AVS3 standards is used as the basic SAO method in the following descriptions, to a person skilled in the art of video coding, the cross-component methods described in the disclosure can also be applied to other loop filter designs or other coding tools with the similar design spirits. For example, in the AVS3 standard, SAO is replaced by a coding tool called Enhanced Sample Adaptive Offset (ESAO). However, the CCSAO disclosed herein can also be applied in parallel with ESAO. In another example, CCSAO can be applied in parallel with Constrained Directional Enhancement Filter (CDEF) in the AV1 standard.

For the existing SAO design in the HEVC, VVC, AVS2 and AVS3 standards, the luma Y, chroma Cb and chroma Cr sample offset values are decided independently. That is, for example, the current chroma sample offset is decided by only the current and neighboring chroma sample values, without taking collocated or neighboring luma samples into consideration. However, luma samples preserve more original picture detail information than chroma samples, and they can benefit the decision of the current chroma sample offset. Furthermore, since chroma samples usually lose high frequency details after color conversion from RGB to YCbCr, or after quantization and deblocking filter, introducing luma samples with high frequency detail preserved for chroma offset decision can benefit the chroma sample reconstruction. Hence, further gain can be expected by exploring cross-component correlation, for example, by using the methods and systems of Cross-Component Sample Adaptive Offset (CCSAO). In some embodiments, the correlation here not only includes cross-component sample values but also includes picture/coding information such as prediction/residual coding modes, transformation types, and quantization/deblocking/SAO/ALF parameters from cross-components.

Another example is that, for SAO, the luma sample offsets are decided only by the luma samples. However, for example, a luma sample with the same band offset (BO) classification can be further classified by its collocated and neighboring chroma samples, which may lead to a more effective classification. SAO classification can be taken as a shortcut to compensate the sample difference between the original picture and the reconstructed picture. Therefore, an effective classification is desired.

Figure 6B:
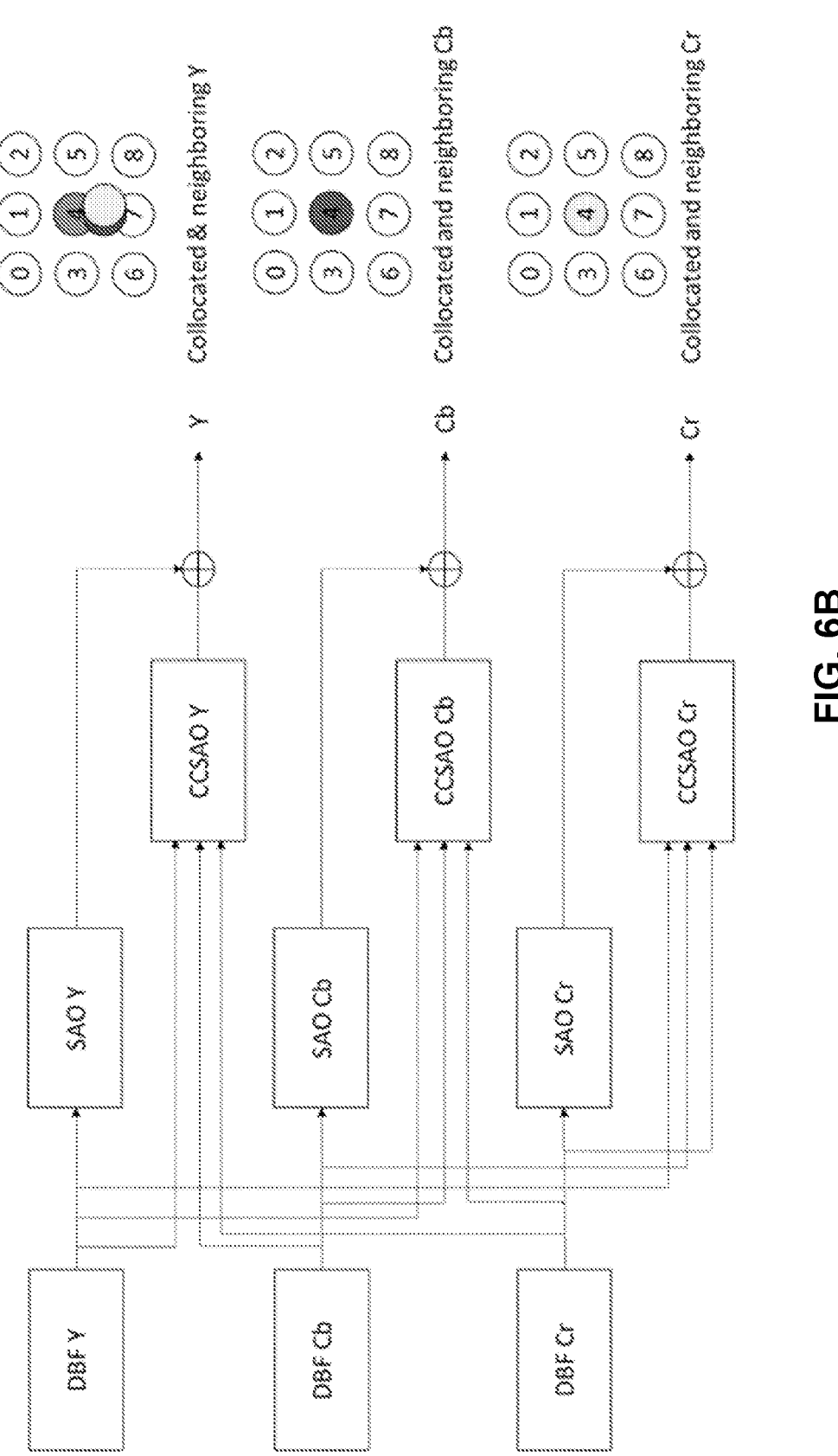
FIG. 6B is a block diagram illustrating the system and process of CCSAO that are applied on luma and chroma samples, and use DBF Y/Cb/Cr as input according to some implementations of the present disclosure.
Figure 6C:
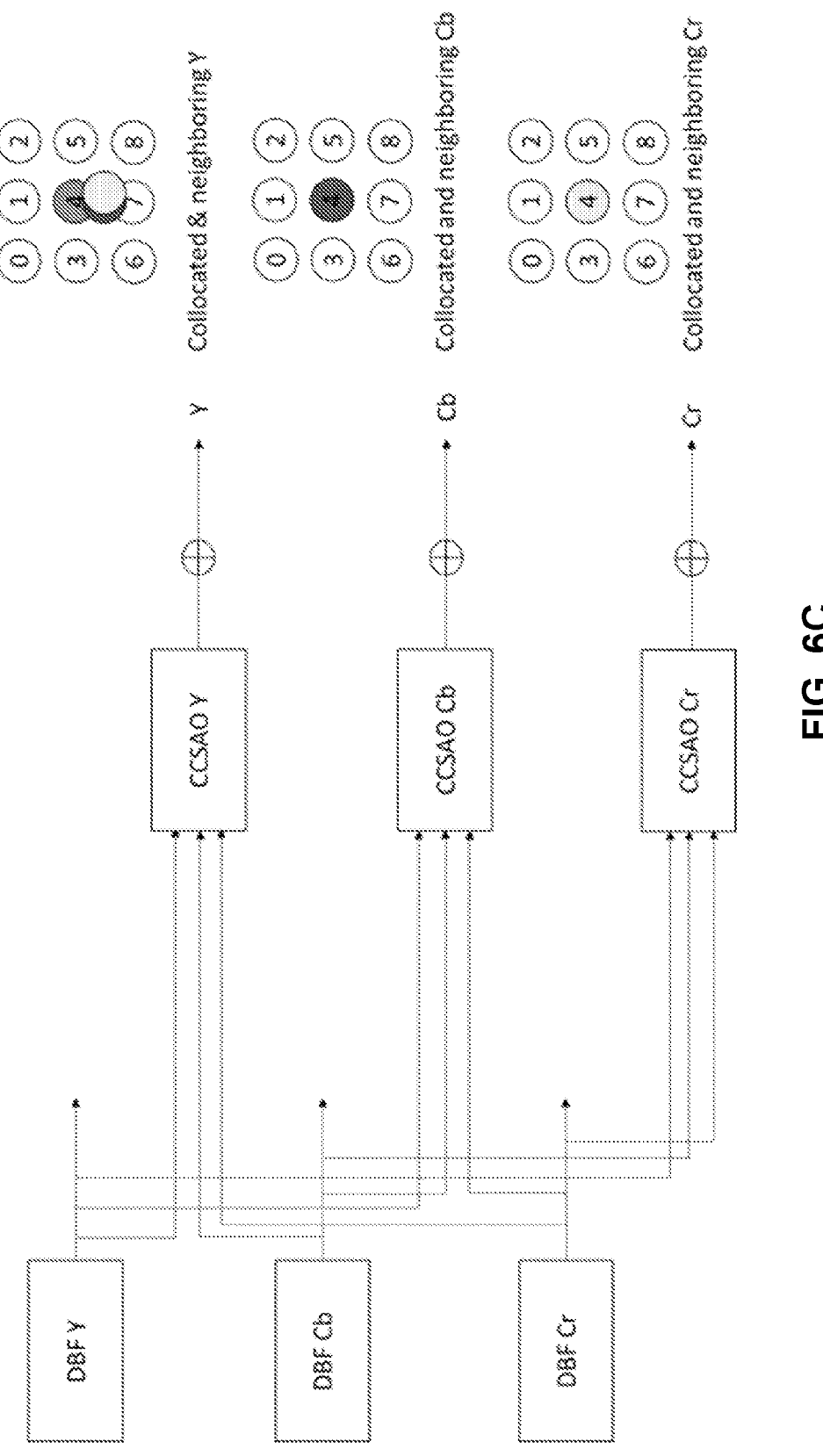
FIG. 6C is a block diagram illustrating the system and process of CCSAO that can work independently according to some implementations of the present disclosure.
Figure 6D:
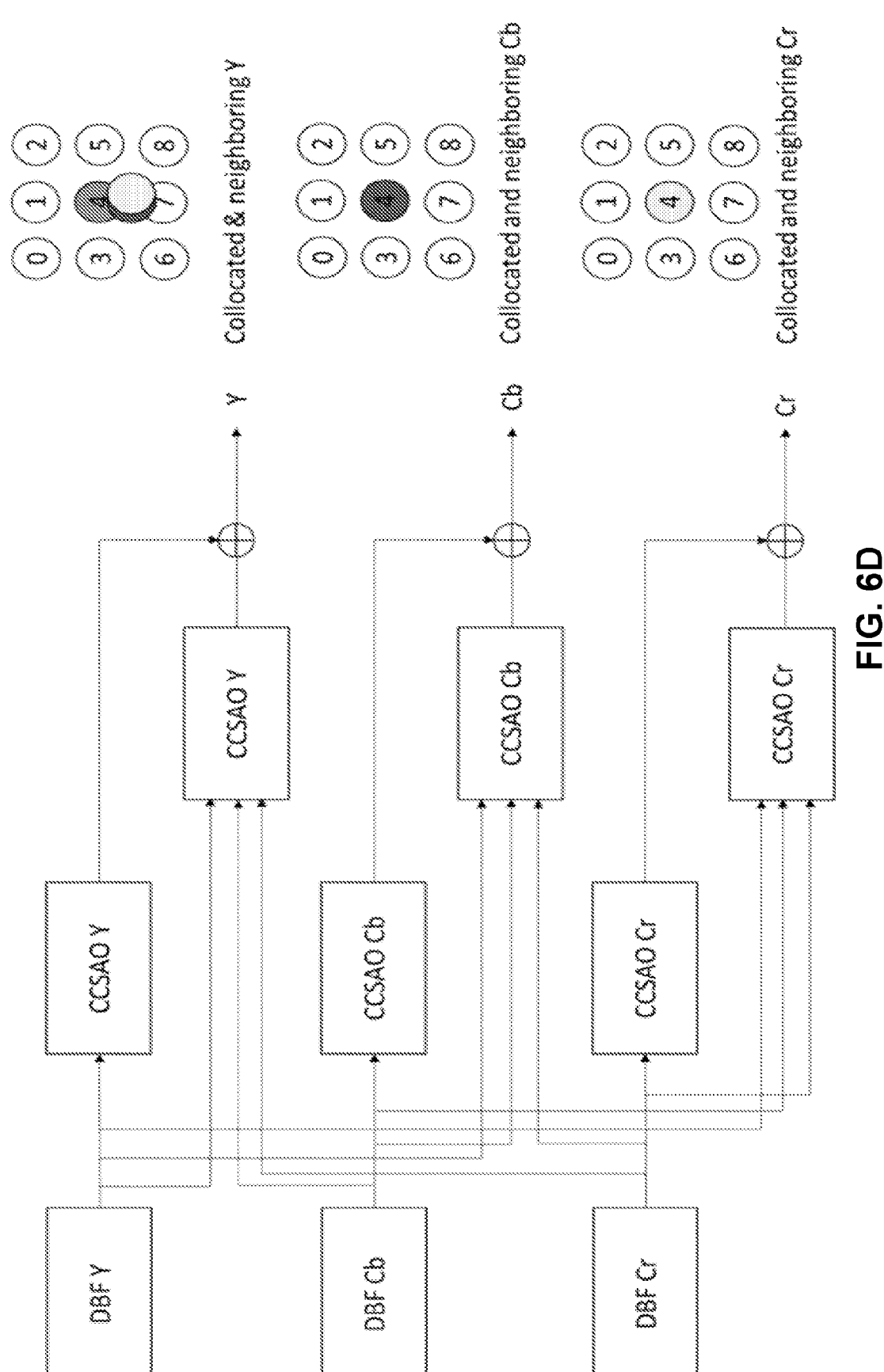
FIG. 6D is a block diagram illustrating the system and process of CCSAO that can be applied recursively (2 or N times) with same or different offsets according to some implementations of the present disclosure.

FIG. 6A is a block diagram illustrating that the system and process of CCSAO that are applied on chroma samples, and use DBF Y as the input according to some implementations of the present disclosure. The luma samples after luma deblocking filter (DBF Y) is used to determine additional offsets for chroma Cb and Cr after SAO Cb and SAO Cr. For example, the current chroma sample 602 is first classified using collocated 604 and neighboring (white) luma samples 606, and the corresponding CCSAO offset value of the corresponding class is added to the current chroma sample value. FIG. 6B is a block diagram illustrating the system and process of CCSAO that are applied on luma and chroma samples, and use DBF Y/Cb/Cr as input according to some implementations of the present disclosure. FIG. 6C is a block diagram illustrating the system and process of CCSAO that can work independently according to some implementations of the present disclosure. FIG. 6D is a block diagram illustrating the system and process of CCSAO that can be applied recursively (2 or N times) with same or different offsets in the same codec stage or repeated in the different stages, according to some implementations of the present disclosure. In summary, in some embodiments, for classifying the current luma sample, the information of current and neighboring luma samples, the information of collocated and neighboring chroma samples (Cb and Cr), can be used. In some embodiments, for classifying the current chroma sample (Cb or Cr), collocated and neighboring luma samples, collocated and neighboring cross-chroma samples, and current and neighboring chroma samples can be used. In some embodiments, CCSAO can be cascaded after (1) DBF Y/Cb/Cr, (2) reconstructed image Y/Cb/Cr before DBF, or (3) after SAO Y/Cb/Cr, or (4) after ALF Y/Cb/Cr.

Figure 6E:
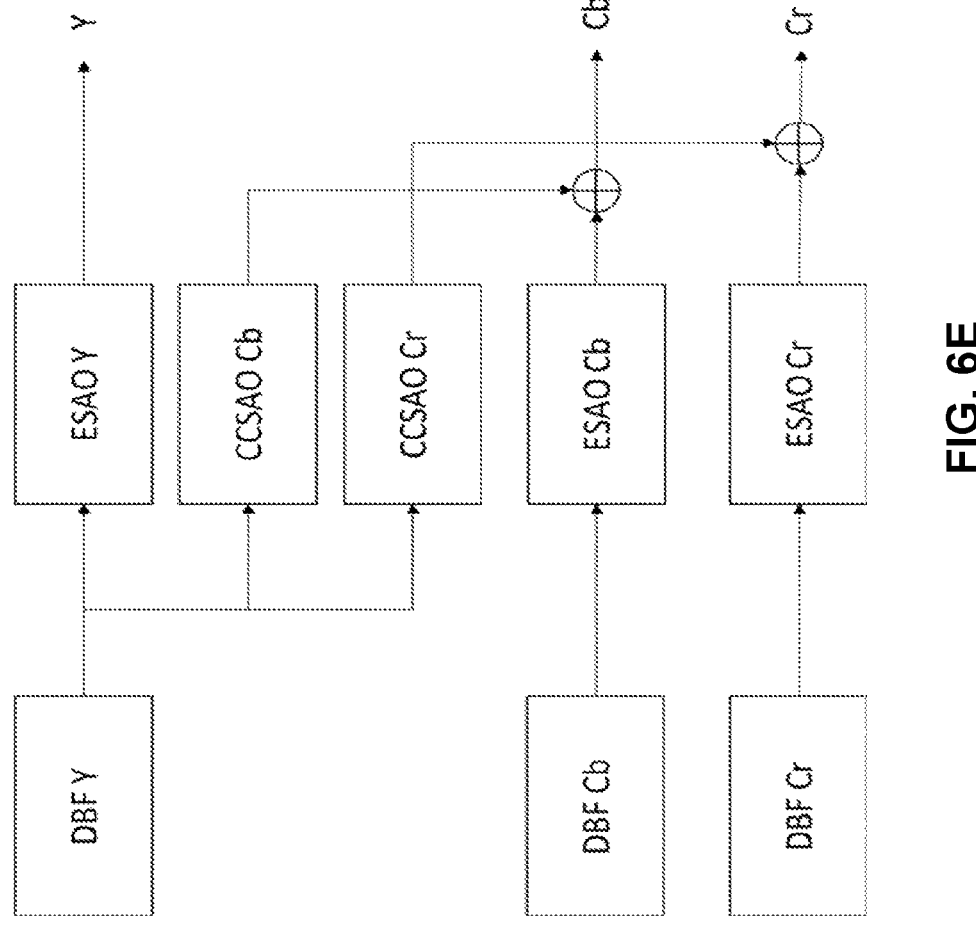
FIG. 6E is a block diagram illustrating the system and process of CCSAO applied in parallel with Enhanced Sample Adaptive Offset (ESAO) in the AVS standard according to some implementations of the present disclosure.

In some embodiments, CCSAO can also be applied in parallel with other coding tools, for example, ESAO in the AVS standard, or CDEF in the AV1 standard, or Neural Network Loop Filter (NNLF). FIG. 6E is a block diagram illustrating the system and process of CCSAO applied in parallel with ESAO in the AVS standard according to some implementations of the present disclosure.

Figure 6F:
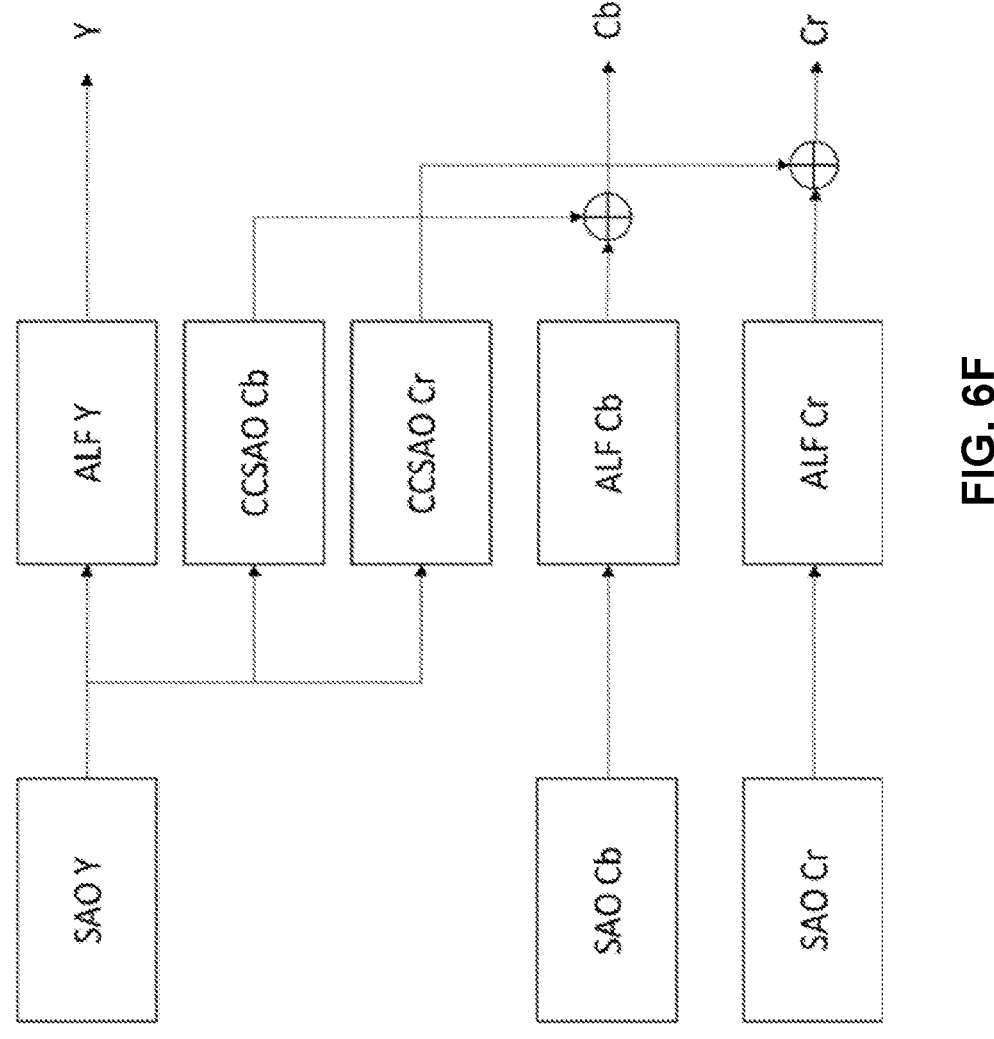
FIG. 6F is a block diagram illustrating the system and process of CCSAO applied after SAO according to some implementations of the present disclosure.
Figure 6G:
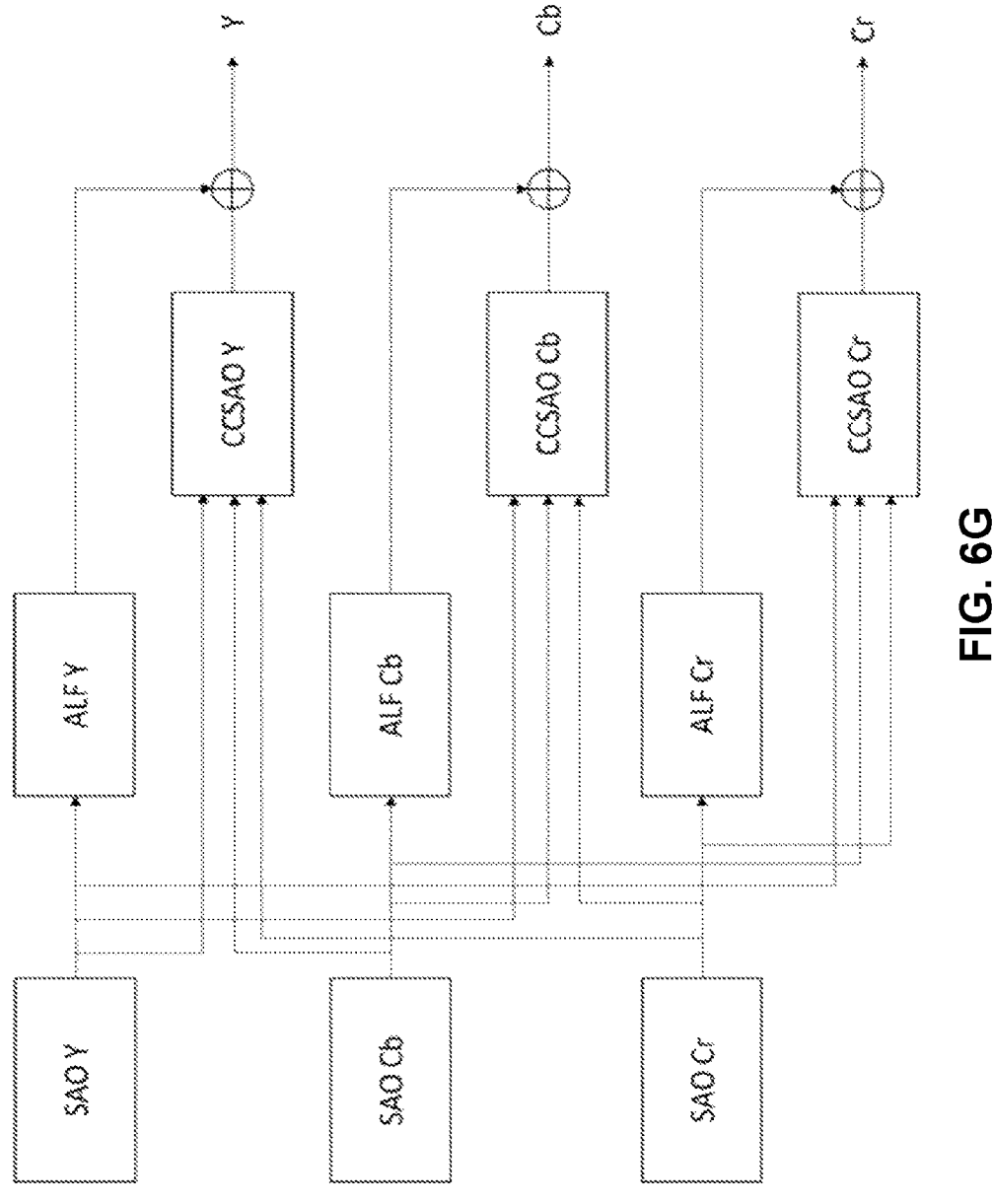
FIG. 6G is a block diagram illustrating that the system and process of CCSAO can work independently without CCALF according to some implementations of the present disclosure.

FIG. 6F is a block diagram illustrating the system and process of CCSAO applied after SAO according to some implementations of the present disclosure. In some embodiments, FIG. 6F shows that the location of CCSAO can be after SAO, i.e., the location of Cross-Component Adaptive Loop Filter (CCALF) in the VVC standard. FIG. 6G is a block diagram illustrating that the system and process of CCSAO can work independently without CCALF, according to some implementations of the present disclosure. In some embodiments, the SAO Y/Cb/Cr can be replaced by ESAO, for example, in the AVS3 standard.

Figure 6H:
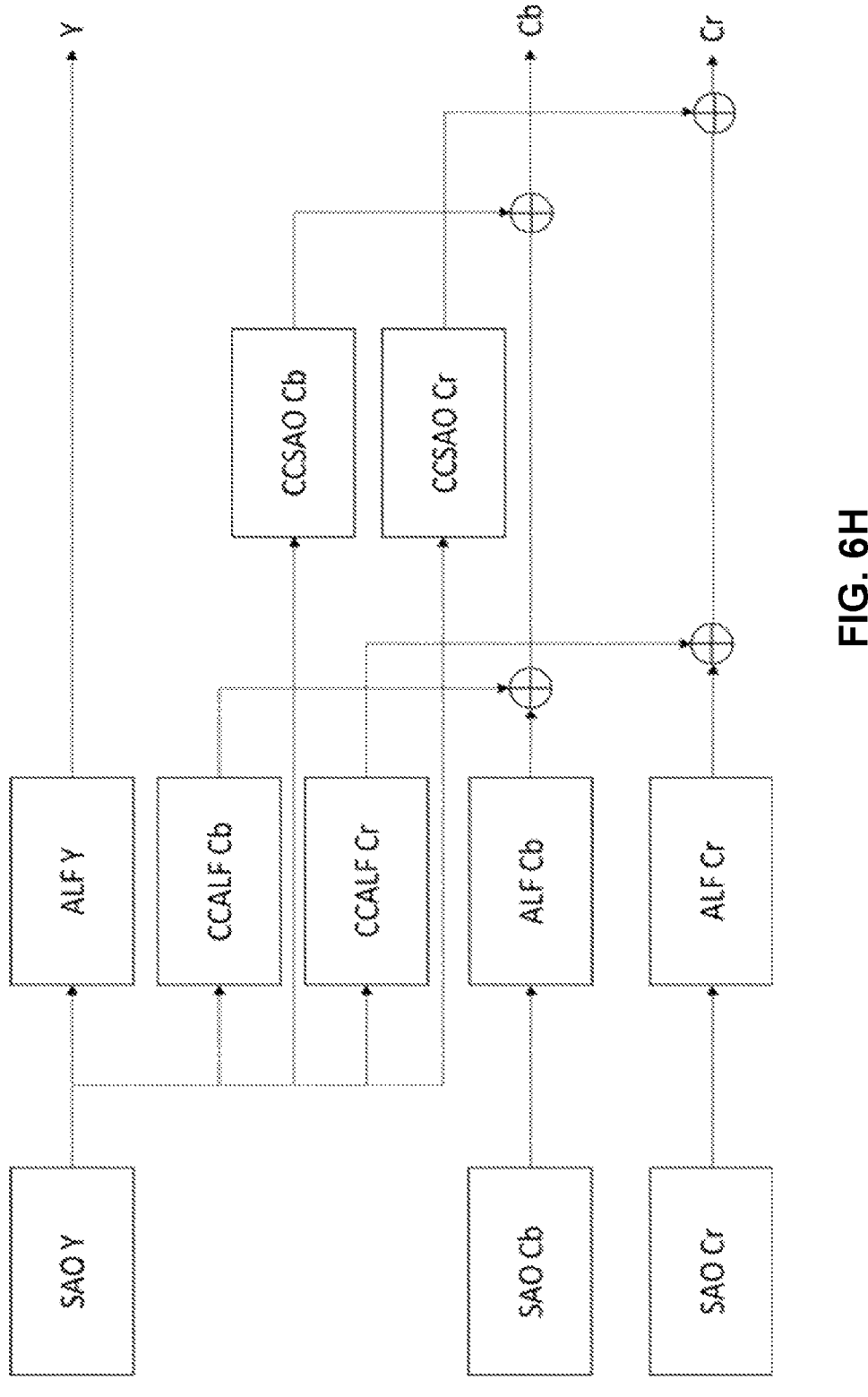
FIG. 6H is a block diagram illustrating the system and process of CCSAO applied in parallel with Cross-Component Adaptive Loop Filter (CCALF) according to some implementations of the present disclosure.

FIG. 6H is a block diagram illustrating the system and process of CCSAO applied in parallel with CCALF according to some implementations of the present disclosure. In some embodiments, CCSAO can be applied in parallel with CCALF. In some embodiments, as shown in FIG. 6H, the locations of CCALF and CCSAO can be switched. In some embodiments, as shown in FIG. 6A to FIG. 6H, or throughout the present disclosure, the SAO Y/Cb/Cr blocks can be replaced by ESAO Y/Cb/Cr (in AVS3) or CDEF (in AV1). Note Y/Cb/Cr also can be denoted as Y/U/V in video coding area. In some embodiments, if the video is in the RGB format, the CCSAO can also be applied by simply mapping the YUV notation to GBR respectively in this disclosure.

Figure 6I:
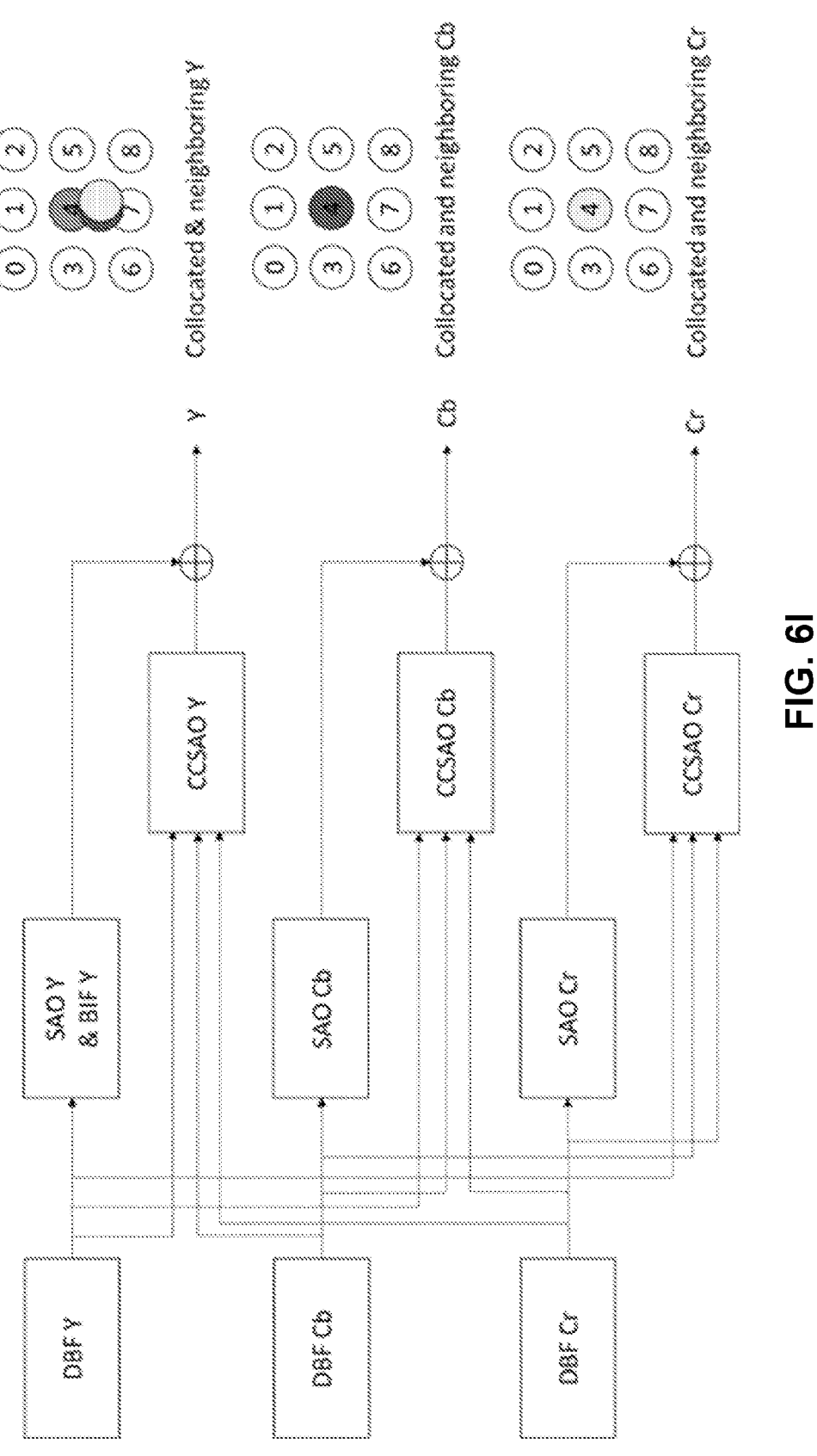
FIG. 6I is a block diagram illustrating the system and process of CCSAO applied in parallel with SAO and BIF according to some implementations of the present disclosure.
Figure 6J:
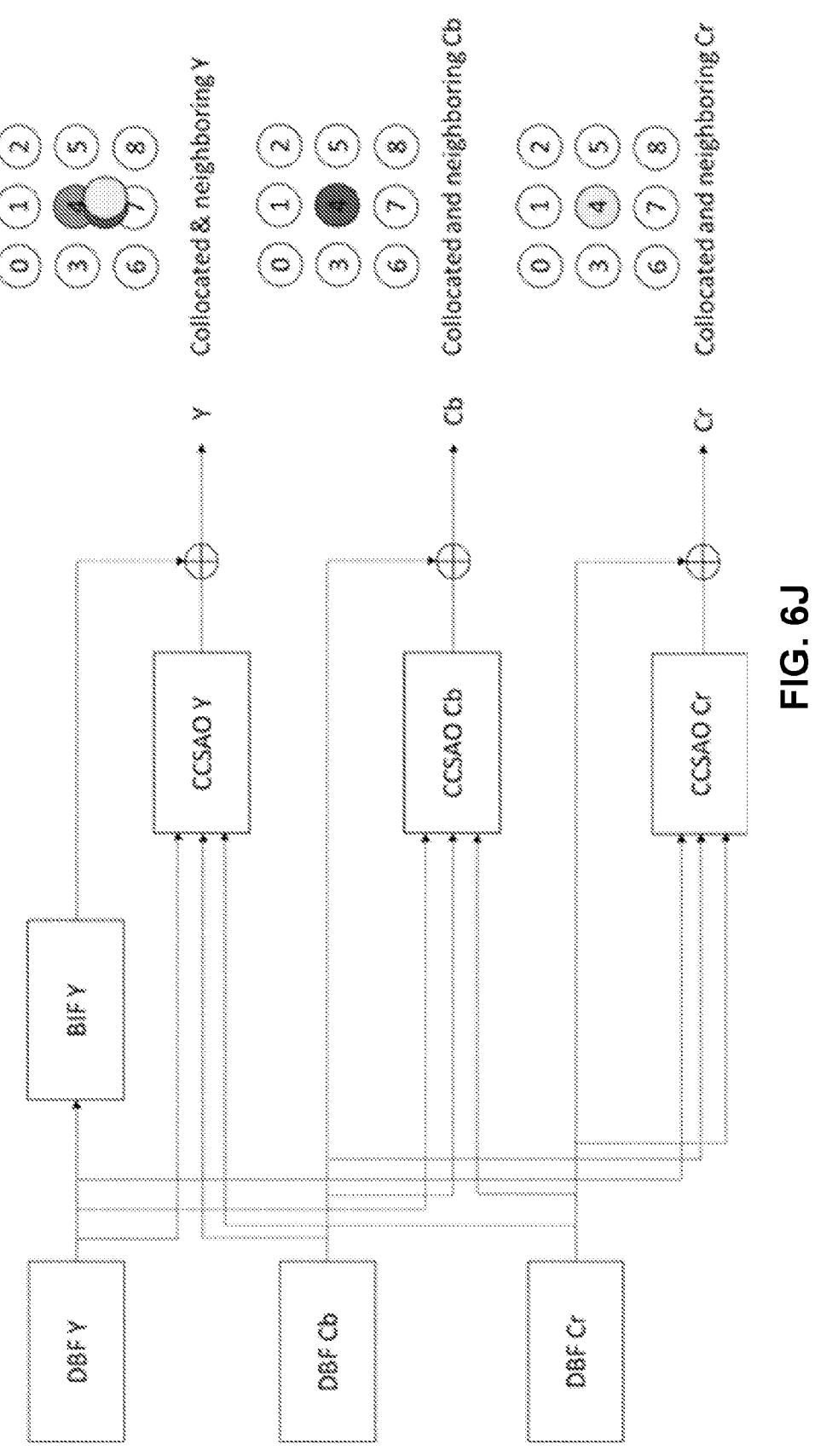
FIG. 6J is a block diagram illustrating the system and process of CCSAO applied in parallel with BIF by replacing SAO according to some implementations of the present disclosure.

FIG. 6I is a block diagram illustrating the system and process of CCSAO applied in parallel with SAO and BIF according to some implementations of the present disclosure. FIG. 6J is a block diagram illustrating the system and process of CCSAO applied in parallel with BIF by replacing SAO according to some implementations of the present disclosure. In some embodiments, the current chroma sample classification is reusing the SAO type (edge offset (EO) or BO), class, and category of the collocated luma sample. The corresponding CCSAO offset can be signaled or derived from the decoder itself. For example, let h_Y be the collocated luma SAO offset, h_Cb and h_Cr be the CCSAO Cb and Cr offset, respectively. h_Cb (or h_Cr)=w*h_Y where w can be selected in a limited table. For example, +−1/4, +−1/2, 0, +−1, +−2, +−4 . . . etc., where |w| only includes the power-of-2 values.

In some embodiments, the comparison score [−8, 8] of the collocated luma samples (Y0) and neighboring 8 luma samples are used, which yields 17 classes in total.

Initial Class=0

Loop over neighboring 8 luma samples (Yi, i=1 to 8)

| | | |
|---|---|---|
| if | Y0 > Yi | Class += 1 |
| else if | Y0 < Yi | Class −= 1 |

In some embodiments, the abovementioned classification methods can be combined. For example, comparison score combined with SAO BO (32 bands classification) is used to increase diversity, which yields 17*32 classes in total. In some embodiments, the Cb and Cr can use the same class to reduce the complexity or saving bits.

Figure 7:
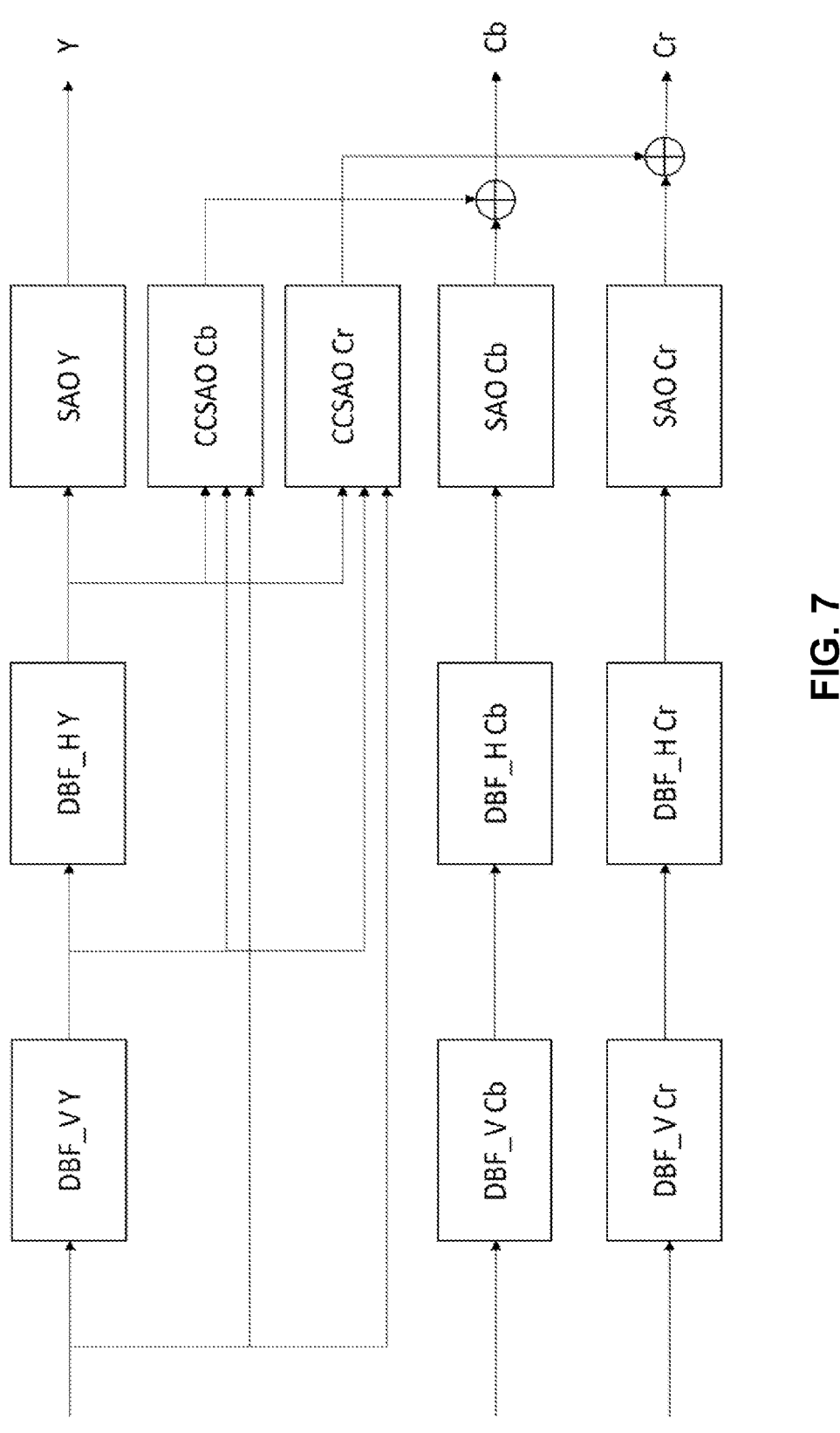
FIG. 7 is a block diagram illustrating a sample process using CCSAO in accordance with some implementations of the present disclosure.

FIG. 7 is a block diagram illustrating a sample process using CCSAO in accordance with some implementations of the present disclosure. Specifically, FIG. 7 shows the input of CCSAO can introduce the input of vertical and horizontal DBF, to simplify the class determination, or increase flexibility. For example, let Y0_DBF_V, Y0_DBF_H, and Y0 be collocated luma samples at the input of DBF_V, DBF_H, and SAO, respectively. Yi_DBF_V, Yi_DBF_H, and Yi are neighboring 8 luma samples at the input of DBF_V, DBF_H, and SAO, respectively, where i=1 to 8.

$$\text{Max } Y0 = \max(Y0\_DBF\_V, Y0\_DBF\_H, Y0\_DBF)$$

$$\text{Max } Yi = \max(Yi\_DBF\_V, Yi\_DBF\_H, Yi\_DBF)$$

And feed max Y0 and max Yi to CCSAO classification.

Figure 8:
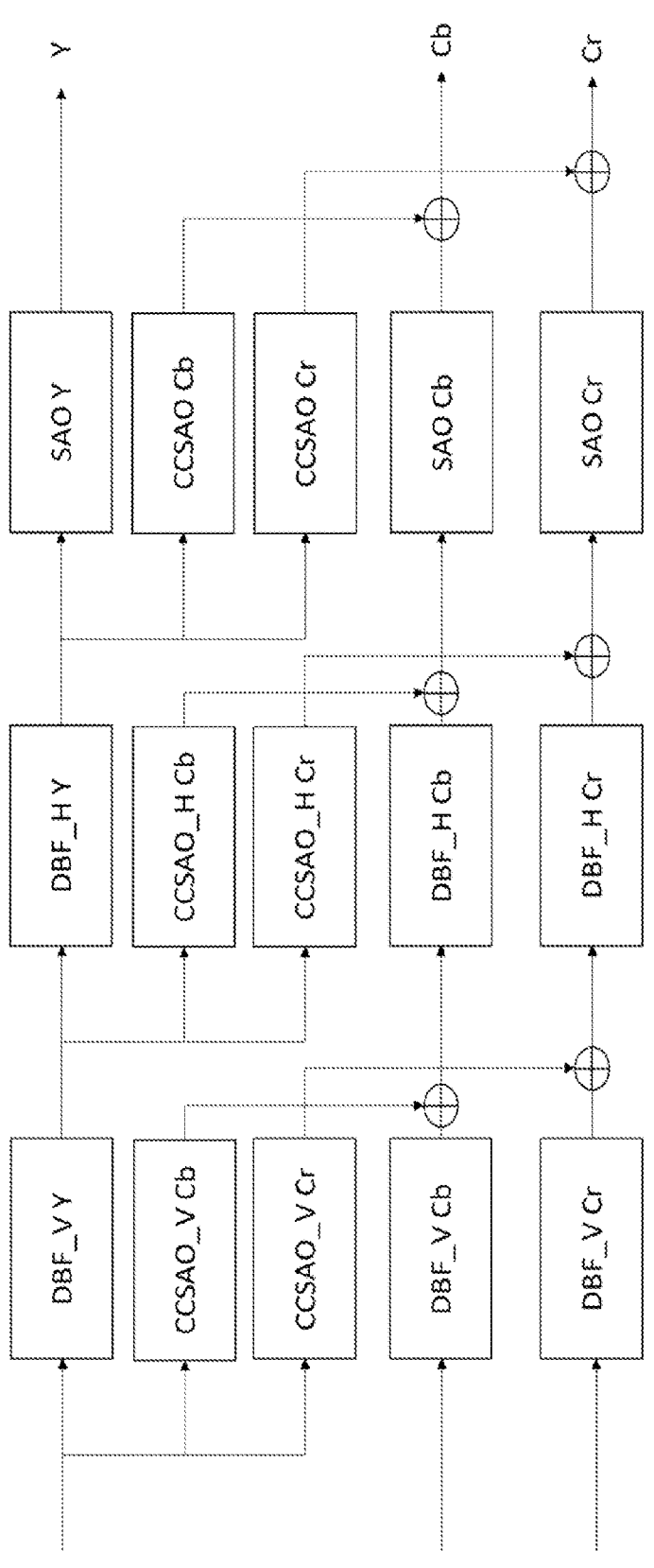
FIG. 8 is a block diagram illustrating that CCSAO process is interleaved to vertical and horizontal deblocking filter (DBF) in accordance with some implementations of the present disclosure.

FIG. 8 is a block diagram illustrating that CCSAO process is interleaved to vertical and horizontal DBF in accordance with some implementations of the present disclosure. In some embodiments, CCSAO blocks in FIGS. 6A-6J, 7 and 8 can be selective. For example, using Y0_DBF_V and Yi_DBF_V for the first CCSAO_V, which applies the same sample processing as in FIGS. 6A-6J, while using the input of DBF_V luma samples as CCSAO input.

In some embodiments, CCSAO syntax implemented is shown in Table 2 below.

TABLE 2

An example of CCSAO syntax

| Level | Syntax element | Meaning |
|-------|----------------|---------|
| SPS | cc_sao_enabled_flag | whether CCSAO is enabled in the sequence |
| SH | slice_cc_sao_cb_flag slice_cc_sao_cr_flag | whether CCSAO is enabled for Cb or Cr |
| CTU | cc_sao_merge_left_flag cc_sao_merge_up_flag | whether CCSAO offset is merged from the left or up CTU |
| CTU | cc_sao_class_idx | CCSAO class index of this CTU |
| CTU | cc_sao_offset_sign_flag cc_sao_offset_abs | CCSAO Cb and Cr offset values of this CTU class |

In some embodiments, for signaling CCSAO Cb and Cr offset values, if one additional chroma offset is signaled, the other chroma component offset can be derived by plus or minus sign, or weighting to save bits overhead. For example, let h_Cb and h_Cr be the offset of CCSAO Cb and Cr, respectively. With explicit signaling w, wherein w=+−|w| with limited |w| candidates, h_Cr can be derived from h_Cb without explicit signaling h_Cr itself.

$$h\_Cr = w * h\_Cb$$

FIG. 7 is a block diagram illustrating a sample process using CCSAO in accordance with some implementations of the present disclosure. FIG. 8 is a block diagram illustrating that CCSAO process is interleaved to vertical and horizontal deblocking filter (DBF) in accordance with some implementations of the present disclosure.

FIG. 9 is a flowchart illustrating an exemplary process 900 of decoding video signal using cross-component correlation in accordance with some implementations of the present disclosure.

The video decoder 30, receives the video signal that includes a first component and a second component (910). In some embodiments, the first component is a luma component, and the second component is a chroma component of the video signal.

The video decoder 30 also receives a plurality of offsets associated with the second component (920).

The video decoder 30 then utilizes a characteristic measurement of the first component to obtain a classification category associated with the second component (930). For example, in FIG. 6A, the current chroma sample 602 is first classified using collocated 604 and neighboring (white) luma samples 606, and the corresponding CCSAO offset value is added to the current chroma sample.

The video decoder 30 further selects a first offset from the plurality of offsets for the second component according to the classification category (940).

The video decoder 30 additionally modifies the second component based on the selected first offset (950).

In some embodiments, utilizing the characteristic measurement of the first component to obtain the classification category associated with the second component (930) includes: utilizing a respective sample of the first component to obtain a respective classification category of a respective each sample of the second component, wherein the respective sample of the first component is a respective collocated sample of the first component to the respective each sample of the second component. For example, the current chroma sample classification is reusing the SAO type (EO or BO), class, and category of the collocated luma sample.

In some embodiments, utilizing the characteristic measurement of the first component to obtain the classification category associated with the second component (930) includes: utilizing a respective sample of the first component to obtain a respective classification category of a respective each sample of the second component, wherein the respective sample of the first component is reconstructed before being deblocked or is reconstructed after being deblocked. In some embodiment, the first component is being deblocked at a deblocking filter (DBF). In some embodiment, the first component is being deblocked at a luma deblocking filter (DBF Y). For example, alternative to FIGS. 6A-6J or 7, the CCSAO input can also be before DBF Y.

In some embodiments, the characteristic measurement is derived by dividing the range of sample values of the first component into several bands and selecting a band based on the intensity value of a sample in the first component. In some embodiments, the characteristic measurement is derived from Band Offset (BO).

In some embodiments, the characteristic measurement is derived based on the direction and strength of the edge information of a sample in the first component. In some embodiments, the characteristic measurement is derived from Edge Offset (EO).

In some embodiments, modifying the second component (950) comprises directly adding the selected first offset to the second component. For example, the corresponding CCSAO offset value is added to the current chroma component sample.

In some embodiments, modifying the second component (950) comprises mapping the selected first offset to a second offset and adding the mapped second offset to the second component. For example, for signaling CCSAO Cb and Cr offset values, if one additional chroma offset is signaled, the other chroma component offset can be derived by using a plus or minus sign, or weighting to save bits overhead.

In some embodiments, receiving the video signal (910) comprises receiving a syntax element that indicates whether the method of decoding video signal using CCSAO is enabled for the video signal in the Sequence Parameter Set (SPS). In some embodiments, cc_sao_enabled_flag indicates whether CCSAO is enabled in the sequence level.

In some embodiments, receiving the video signal (910) comprises receiving a syntax element that indicates whether the method of decoding video signal using CCSAO is enabled for the second component on the slice level. In some embodiments, slice_cc_sao_cb_flag or slice_cc_sao_cr_flag indicates whether CCSAO is enabled in the respective slice for Cb or Cr.

In some embodiments, receiving the plurality of offsets associated with the second component (920) comprises receiving different offsets for different Coding Tree Units (CTUs). In some embodiments, for a CTU, cc_sao_offset_sign_flag indicates a sign for an offset, and cc_sao_offset_abs indicates the CCSAO Cb and Cr offset values of the current CTU.

In some embodiments, receiving the plurality of offsets associated with the second component (920) comprises receiving a syntax element that indicates whether the received offsets of a CTU are the same as that of one of a neighboring CTU of the CTU, wherein the neighboring CTU is either a left or a top neighboring CTU. For example, cc_sao_merge_up_flag indicates whether CCSAO offset is merged from the left or up CTU.

In some embodiments, the video signal further includes a third component and the method of decoding the video signal using CCSAO further includes: receiving a second plurality of offsets associated with a third component; utilizing the characteristic measurement of the first component to obtain a second classification category associated with the third component; selecting a third offset from the second plurality of offsets for the third component according to the second classification category; and modifying the third component based on the selected third offset.

Figure 11:
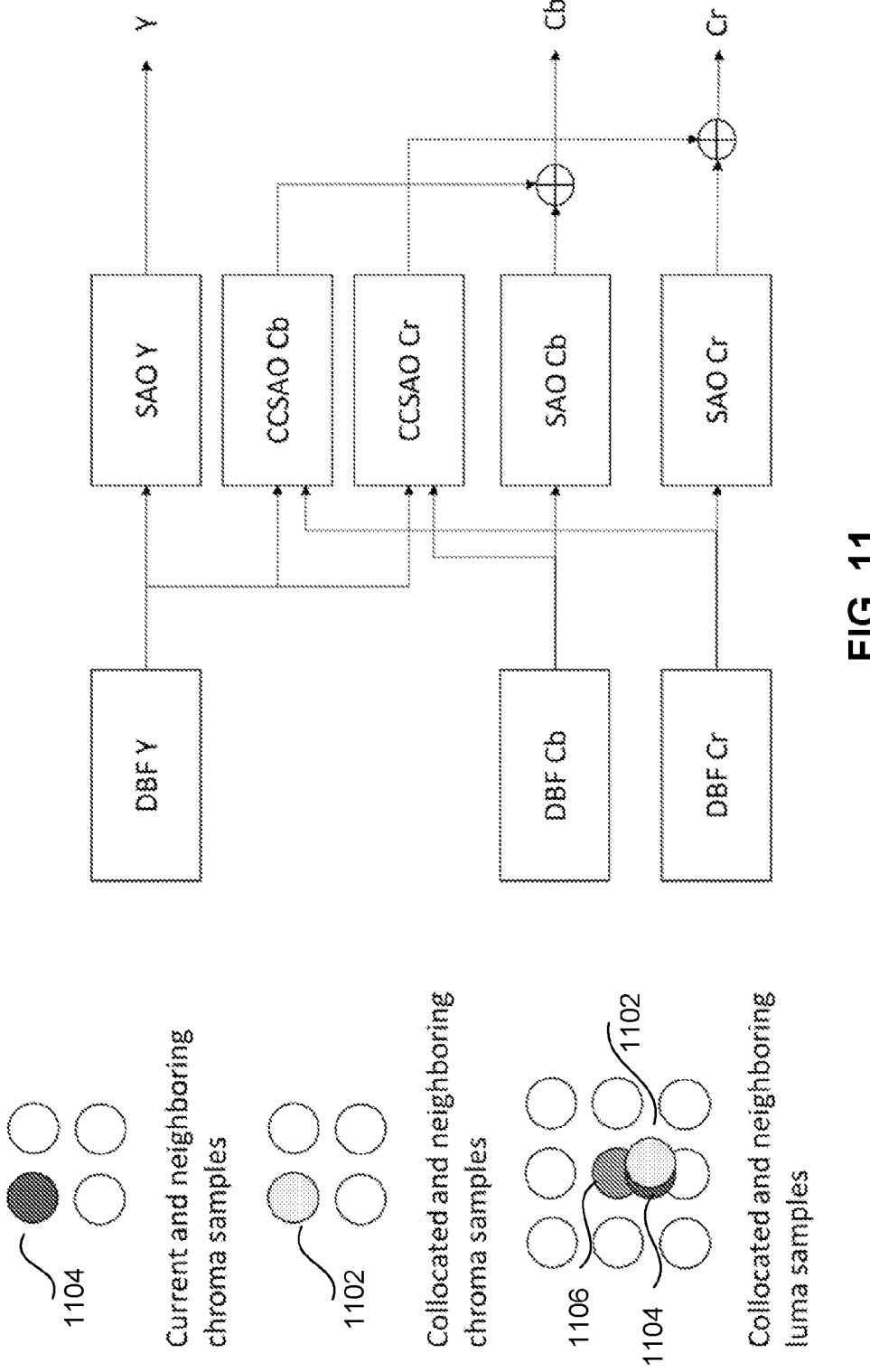
FIG. 11 is a block diagram of a sample process illustrating that all collocated and neighbouring luma/chroma samples can be fed into CCSAO classification in accordance with some implementations of the present disclosure

FIG. 11 is a block diagram of a sample process illustrating that all collocated and neighbouring (white) luma/chroma samples can be fed into CCSAO classification in accordance with some implementations of the present disclosure. FIG. 6A, 6B and FIG. 11 show the input of CCSAO classification. In FIG. 11, current chroma sample is 1104, the cross-component collocated chroma sample is 1102, and the collocated luma sample is 1106.

In some embodiments, a classifier example (C0) uses the collocated luma or chroma sample value (Y0) in FIG. 12 below (Y4/U4/V4 in FIG. 6B, and FIG. 6C) for classification. Let band_num be the number of equally divided bands of luma or chroma dynamic range, and bit_depth be the sequence bit depth, an example of the class index for the current chroma sample is:

$$\text{Class}(C0)=(Y0*\text{band\_num})>>\text{bit\_depth}$$

In some embodiments, the classification takes rounding into account, for example:

$$\text{Class}(C0)=((Y0*\text{band\_num})+(1<<\text{bit\_depth}))>>\text{bit\_depth}$$

Some band_num and bit_depth examples are listed below in Table 3. Table 3 shows three classification examples when the number of bands is different for each of the classification examples.

TABLE 3

Exemplary band_num and bit_depth for each class index.

| band_num | 16 | | band_num | 7 | | band_num | 7 | |
|---|---|---|---|---|---|---|---|---|
| bit-depth | 10 | | bit_depth | 10 | | bit_depth | 8 | |
| Class | Y0 | | Class | Y0 | | Class | Y0 | |
| 0 | 0 | 63 | 0 | 0 | 145 | 0 | 0 | 36 |
| 1 | 64 | 127 | 1 | 146 | 292 | 1 | 37 | 72 |
| 2 | 128 | 191 | 2 | 293 | 438 | 2 | 73 | 109 |
| 3 | 192 | 255 | 3 | 439 | 584 | 3 | 110 | 145 |
| 4 | 256 | 319 | 4 | 585 | 730 | 4 | 146 | 182 |
| 5 | 320 | 383 | 5 | 731 | 877 | 5 | 183 | 218 |
| 6 | 384 | 447 | 6 | 878 | 1023 | 6 | 219 | 255 |
| 7 | 448 | 511 | | | | | | |
| 8 | 512 | 575 | | | | | | |
| 9 | 576 | 639 | | | | | | |
| 10 | 640 | 703 | | | | | | |
| 11 | 704 | 767 | | | | | | |

TABLE 3-continued

Exemplary band_num and bit_depth for each class index.

| band_num | 16 | | band_num | 7 | | band_num | 7 | |
|---|---|---|---|---|---|---|---|---|
| bit-depth | 10 | | bit_depth | 10 | | bit_depth | 8 | |
| Class | Y0 | | Class | Y0 | | Class | Y0 | |
| 12 | 768 | 831 | | | | | | |
| 13 | 832 | 895 | | | | | | |
| 14 | 896 | 959 | | | | | | |
| 15 | 960 | 1023 | | | | | | |

Figure 10A:
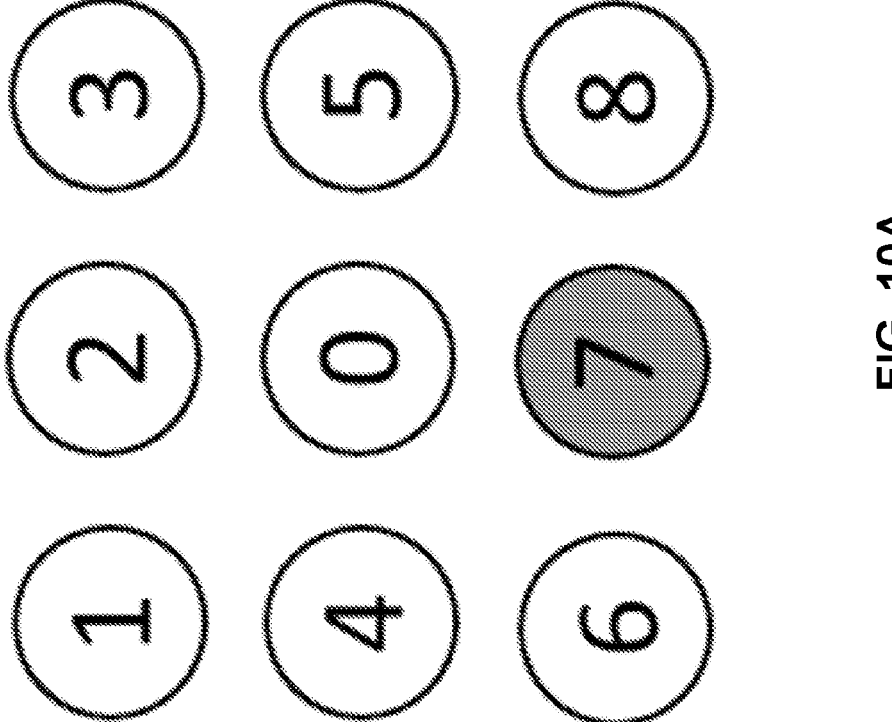
FIG. 10A is a block diagram showing a classifier using different luma (or chroma) sample position for C0 classification in accordance with some implementations of the present disclosure.

In some embodiments, a classifier uses different luma sample position for C0 classification. FIG. 10A is a block diagram showing a classifier using different luma (or chroma) sample position for C0 classification in accordance with some implementations of the present disclosure, for example, using the neighboring Y7 but not Y0 for C0 classification.

In some embodiments, different classifiers can be switched in Sequence Parameter Set (SPS)/Adaptation parameter set (APS)/Picture parameter set (PPS)/Picture header (PH)/Slice header (SH)/Region/Coding tree unit (CTU)/Coding unit (CU)/Subblock/Sample levels. For example, in FIGS. 10A-10B, using Y0 for POC0 but using Y7 for POC1, as shown in Table 4 below.

TABLE 4

Different classifiers are applied to different pictures

| POC | Classifier | C0 band_num | Total classes |
|---|---|---|---|
| 0 | C0 using Y0 position | 8 | 8 |
| 1 | C0 using Y7 position | 8 | 8 |

In some embodiments, FIG. 10B illustrates some examples of different shapes for luma candidates, in accordance with some implementations of the present disclosure. For example, a constraint can be applied to the shapes. In some instances, the total number of luma candidates must be the power of 2, as shown in FIG. 10B (b) (c) (d). In some instances, the number of luma candidates must be horizontal and vertical symmetric relative to the chroma sample (in the center), as shown in FIG. 10B (a) (c) (d) (e). In some embodiments, the power of 2 constraint and the symmetric constraint can also be applied for chroma candidates. The U/V part of FIG. 6B and FIG. 6C shows an example for symmetric constraint. In some embodiments, different color format can have different classifier "constraints". For example, 420 color format uses luma/chroma candidate selection (one candidate selected from 3×3 shape) as shown in FIG. 6B and FIG. 6C, but 444 color format uses FIG. 10B(f) for luma and chroma candidate selection, 422 color format uses FIG. 10B(g) for luma candidates (2 chroma samples share 4 luma candidates), FIG. 10B(f) for chroma candidates.

In some embodiments, the C0 position and C0 band_num can be combined and switched in SPS/APS/PPS/PH/SH/Region/CTU/CU/Subblock/Sample levels. Different combinations can be different classifiers as shown in Table 5 below.

TABLE 5

| | Different classifier and band number combinations are applied to different pictures | | |
|---|---|---|---|
| POC | Classifier | C0 band_num | Total classes |
| 0 | C0 using Y0 position | 16 | 16 |
| 1 | C0 using Y7 position | 8 | 8 |

In some embodiments, the collocated luma sample value (Y0) is replaced by a value (Yp) obtained by weighing collocated and neighboring luma samples. FIG. 12 illustrates exemplary classifiers by replacing the collocated luma sample value with a value obtained by weighing collocated and neighboring luma samples in accordance with some implementations of the present disclosure. The collocated luma sample value (Y0) can be replaced by a phase corrected value (Yp) obtained by weighing neighboring luma samples. Different Yp can be a different classifier.

In some embodiments, different Yp is applied on different chroma format. For example, as shown in FIG. 12, the Yp of FIG. 12 (*a*) is used for the 420 chroma format, the Yp of FIG. 12 (*b*) is used for the 422 chroma format, and Y0 is used for the 444 chroma format.

In some embodiments, another classifier (C1) is the comparison score [–8, 8] of the collocated luma samples (Y0) and neighboring 8 luma samples, which yields 17 classes in total as shown below.

```
Initial Class (C1) = 0, Loop over neighboring 8
luma samples (Yi, i=1 to 8)
            if      Y0 > Yi        Class += 1
            else if    Y0 < Yi        Class -= 1
```

In some embodiments, the C1 example is equal to the following function with threshold th being 0.

$$ClassIdx = Index2ClassTable(f(C,P1) + f(C,P2) + \ldots + f(C,P8))$$

if x-y>th, f(x, y)=1; if x-y=th, f(x, y)=0; if x-y<th, f(x, y)=–1 wherein Index2ClassTable is a look up table (LUT), C is the current or collocated sample, and P1 to P8 are neighboring samples.

In some embodiments, similar to the C4 classifier, one or more thresholds can be predefined (e.g., kept in a LUT) or signaled in SPS/APS/PPS/PH/SH/Region/CTU/CU/Subblock/Sample levels to help classify (quantize) the difference.

In some embodiments, a variation (C1') only counts comparison score [0, 8], and this yields 8 classes. (C1, C1') is a classifier group and a PH/SH level flag can be signaled to switch between C1 and C1'.

Initial Class (C1')=0, Loop over neighboring 8 luma samples (Yi, i=1 to 8)

if Y0>Yi Class+=1

In some embodiments, a variation (C1s) is selectively using neighboring N out of M neighboring samples to count the comparison score. An M-bit bitmask can be signaled at SPS/APS/PPS/PH/SH/Region/CTU/CU/Subblock/Sample levels to indicate which neighboring samples are selected to count the comparison score. Using FIG. 6B as an example for a luma classifier: 8 neighboring luma samples are candidates, and a 8-bit bitmask (01111110) is signaled at PH, indicating Y1 to Y6 6 samples are selected, so the comparison score is in [–6, 6], which yields 13 offsets. The selective classifier C1s gives encoder more choices to trade-off between offsets signaling overhead and classification granularity.

Similar to C1s, a variation (C1's) is only counting comparison score [0, +N], the previous bitmask 01111110 example gives comparison score in [0, 6], which yields 7 offsets.

In some embodiments, different classifiers are combined to yield a general classifier. For example, for different pictures (different POC values), different classifiers are applied as shown in Table 6-1 below.

TABLE 6-1

| | Different general classifiers are applied to different pictures | | |
|---|---|---|---|
| POC | Classifier | C0 band_num | Total classes |
| 0 | combine C0 and C1 | 16 | 16*17 |
| 1 | combine C0 and C1' | 16 | 16*9 |
| 2 | combine C0 and C1 | 7 | 7*17 |

In some embodiments, another classifier example (C3) is using a bitmask for classification as shown in Table 6-2. A 10-bit bitmask is signaled in SPS/APS/PPS/PH/SH/Region/CTU/CU/Subblock/Sample levels to indicate the classifier. For example, bitmask 11 1100 0000 means that for a given 10-bit luma sample value, only most significant bit (MSB): 4 bits are used for classification, and that yields 16 classes in total. Another example bitmask 10 0100 0001 means that only 3 bits are used for classification, and that yields 8 classes in total.

In some embodiments, the bitmask length (N) can be fixed or switched in SPS/APS/PPS/PH/SH/Region/CTU/CU/Subblock/Sample levels. For example, for a 10-bit sequence, a 4-bit bitmask 1110 is signaled in PH in a picture, and MSB 3 bits b9, b8, b7 are used for classification. Another example is a 4-bit bitmask 0011 on LSB, and b0, b1 are used for classification. The bitmask classifier can apply on luma or chroma classification. Whether to use MSB or LSB for bitmask N can be fixed or switched in SPS/APS/PPS/PH/SH/Region/CTU/CU/Subblock/Sample levels.

In some embodiments, the luma position and C3 bitmask can be combined and switched in SPS/APS/PPS/PH/SH/Region/CTU/CU/Subblock/Sample levels. Different combinations can be different classifiers.

In some embodiments, a "max number of is" of the bitmask restriction can be applied to restrict the corresponding number of offsets. For example, restricting "max number of is" of the bitmask to 4 in SPS, and that yields the max offsets in the sequence to be 16. The bitmask in different POC can be different, but the "max number of is" shall not exceed 4 (total classes shall not exceed 16). The "max number of is" value can be signaled and switched in SPS/APS/PPS/PH/SH/Region/CTU/CU/Subblock/Sample levels.

TABLE 6-2

| | Classifier example uses a bitmask for classification (bit mask position is underscored) | | |
|---|---|---|---|
| POC | Classifier | C3 10-bit bitmask | Total classes |
| 0 | C3 using Y0 position | <u>11 1</u>100 0000 | 16 |
| | | Luma sample value | Class index |

TABLE 6-2-continued

| Classifier example uses a bitmask for classification (bit mask position is underscored) | | |
|---|---|---|
| | 00 0000 1111 | 0 (0000) |
| | 1̲0 1̲011 0011 | 9 (1010) |
| | 1̲1 1̲100 1001 | 15 (1111) |

| POC | Classifier | C3 10-bit bitmask | Total classes |
|---|---|---|---|
| 1 | C3 using Y4 position | 10 0̲100 0001̲ | 8 |

| | Luma sample value | Class index |
|---|---|---|
| | 00 0000 1111 | 1 (001) |
| | 1̲0 1011 001̲1̲ | 5 (101) |
| | 1̲1 1̲100 100̲1̲ | 7 (111) |

In some embodiments, as shown in FIG. 11, the other cross-component chroma samples, for example, chroma sample 1102 and its neighboring samples. can be also fed into the CCSAO classification, e.g., for the current chroma sample 1104. For example, Cr chroma samples can be fed into the CCSAO Cb classification. Cb chroma samples can be fed into the CCSAO Cr classification. The classifier of cross-component chroma samples can be the same as luma cross-component classifier or can have its own classifier as described in this disclosure. The two classifiers can be combined to form a joint classifier to classify the current chroma sample. For example, a joint classifier combining cross-component luma and chroma samples, yields total 16 classes as shown in Table 6-3 below.

TABLE 6-3

| Classifier example using a joint classifier combining cross-component luma and chroma samples (bit mask position is underscored) | | | | |
|---|---|---|---|---|
| POC | Classifier | | classes | Total classes |
| 0 | Combine C3 using Y4 position | Bitmask: 1001̲000001 | 8 | |
| | C0 using cross chroma collocated position | C0 band_num: 2 | 2 | |
| | | | | 16 |

All abovementioned classifies (C0, C1, C1', C2, C3) can be combined. For example, see Table 6-4 below.

TABLE 6-4

| Different classifiers are combined | | | | |
|---|---|---|---|---|
| POC | Classifier | | | Total classes |
| 0 | Combine C0, C1 and C2 | C0 band_num: 4 | C2 band_num: 4 | 4*17*4 |
| 1 | Combine C0, C1' and C2 | C0 band_num: 6 | C2 band_num: 4 | 6*9*4 |
| 2 | Combine C1 and C3 | C3 Number of 1s: 4 | | 16*17 |

In some embodiments, a classifier example (C2) uses the difference (Yn) of collocated and neighboring luma samples. FIG. 12 (c) shows an example of Yn, which has a dynamic range of [−1024, 1023] when bit depth is 10. Let C2 band_num be the number of equally divided bands of Yn dynamic range, $$Class(C2)=(Yn+(1<<bit\_depth)*band\_num)>>(bit\_depth+1).$$

In some embodiments, C0 and C2 are combined to yield a general classifier. For example, for different pictures (different POC), different classifiers are applied as shown in Table 7 below.

TABLE 7

| Different general classifiers are applied to different pictures | | | | |
|---|---|---|---|---|
| POC | Classifier | C0 band_num | C2 band_num | Total classes |
| 0 | combine C0 and C2 | 16 | 16 | 16*17 |
| 1 | combine C0 and C2 | 8 | 7 | 8*7 |

In some embodiments, all above mentioned classifiers (C0, C1, C1', C2) are combined. For example, for different pictures (different POCs), different classifiers are applied as shown in Table 8-1 below.

TABLE 8-1

| Different general classifiers are applied to different pictures | | | | |
|---|---|---|---|---|
| POC | Classifier | C0 band_num | C2 band_num | Total classes |
| 0 | combine C0, C1 and C2 | 4 | 4 | 4*17*4 |
| 1 | combine C0, C1' and C2 | 6 | 4 | 6*9*4 |

In some embodiments, a classifier example (C4) uses the difference of CCSAO input values and to-be-compensated sample values for classification as shown in Table 8-2 below. For example, if CCSAO is applied in the ALF stage, the difference of the current component pre-ALF and post-ALF sample values are used for classification. One or more thresholds can be predefined (e.g., kept in a look up table (LUT)) or signalled in SPS/APS/PPS/PH/SH/Region/CTU/CU/Subblock/Sample levels to help classify (quantize) the difference. The C4 classifier can be combined with C0 Y/U/V bandNum to form a joint classifier (for example, POC1 example as shown in Table 8-2).

TABLE 8-2

| a classifier example uses the difference of CCSAO input values and to-be-compensated sample values for classification | | | | |
|---|---|---|---|---|
| POC | Classifier | Difference threshold (Th) | bandNum | Total classes |
| 0 | C4 with diff<−Th? <0? <Th? Else | Th = 3 | | 4 |
| 1 | Combine C4/C0 using Y0 | Th = 3 | 16 | 48 |
| 2 | C4 with diff < Th1? <Th2? Else | Th1 = 4, Th2 = 5 | | 3 |
| 3 | C4 with diff<−Th? <Th? Else | Th = 1 | | 3 |

Figure 30:
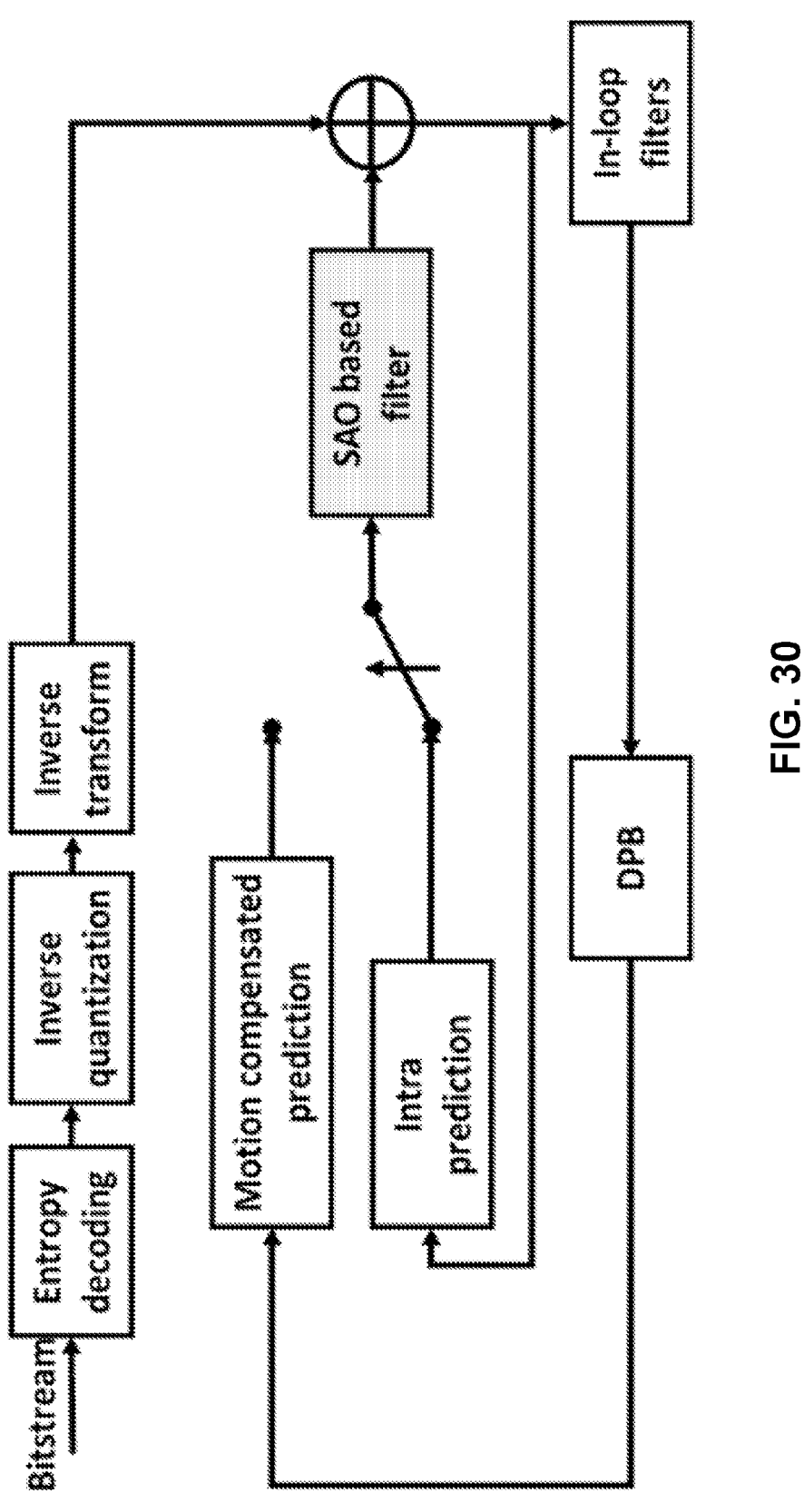
FIG. 30 is a block diagram illustrating that the SAO classification methods disclosed in the present disclosure serve as a post prediction filter in accordance with some implementations of the present disclosure.

In some embodiments, a classifier example (C5) uses "coding information" to help subblock classification since different coding mode may introduce different distortion statistics in the reconstruction image. A CCSAO sample is classified by its sample previous coding information and the combination of the coding information can form a classifier, for example, as shown in Table 8-3 below. FIG. 30 below shows another example of different stages of the coding information for C5.

TABLE 8-3

A CCSAO sample is classified by its sample previous coding information and the combination of the coding information can form a classifier

| POC | 0 | | | |
|---|---|---|---|---|
| Comp | Y | | U | V |
| Set | 0 | 1 | 0 | 0 |
| Pred info | 3: inter/intra/else | 2: Skip? | 2: intra inherit luma? | 2: CCLM? |
| transform info | 2: LFNST? | 2: MTS? | 2: (local) dual tree? | 2: CTB > 32 × 32? |
| quant info | 2: dep quant? | 2: dep quant odd? | 3: CU QP > 37/27? | 2: slice QP < 27? |
| residual coding info | 2: all res 0? | 3: all res > 2/3/ow | 3: JCCR sign = 1/1/ow | CCP used? |
| LMCS info | 2: LMCS applied? | 3: map slope > 0.5/0.7? | 2: is CRS applied? | 2: is CRS applied? |
| DBF info | 2: is long tap DBF used | 3: inter/intra bdry/ow | 3: DBF H/Vow? | 2: tC value ! = 0? |
| SAO info | 2: is BO? | 3: EO/BO/ow | 5: 4 EO Types/ow | 2: BO start from band 0? |
| ALF info | 2: is temporal (APS) selected? | 4: transpose idx | 2: is CCALF applied? | 2: any 1 coeff = 0? |
| Offsets num | 384 | 1728 | 1080 | 256 |

In some embodiments, a classifier example (C6) uses the YUV color transformed value for classification. For example, to classify the current Y component, 1/1/1 collocated or neighboring Y/U/V samples are selected to be color transformed to RGB, and using C3 bandNum to quantize the R value to be the current Y component classifier.

In some embodiments, other classifier examples, which use only current component information for current component classification, can be used as cross-component classification. For example, as shown in FIG. 5A and Table 1, luma sample information and eo-class are used to derive an EdgeIdx, and classify the current chroma sample. Other "non-cross-component" classifiers which can also be used as cross-component classifiers include edge direction, pixel intensity, pixel variation, pixel variance, pixel sum-of-Laplacian, sobel operator, compass operator, high-pass filtered value, low-pass filtered value, etc.

In some embodiments, plural classifiers are used in the same POC. The current frame is divided by several regions, and each region uses the same classifier. For example, 3 different classifiers are used in POC0, and which classifier (0, 1, or 2) is used is signaled in CTU level as shown in Table 9 below.

TABLE 9

Different general classifiers are applied to different regions in the same picture

| POC | Classifier | C0 band_num | Region |
|---|---|---|---|
| 0 | C0 using Y0 position | 16 | 0 |
| 0 | C0 using Y0 position | 8 | 1 |
| 0 | C0 using Y1 position | 8 | 2 |

In some embodiments, the maximum number of plural classifiers (plural classifiers can also be called alternative offset sets) can be fixed or signaled in SPS/APS/PPS/PH/SH/Region/CTU/CU/Subblock/Sample levels. In one example, the fixed (pre-defined) maximum number of plural classifiers is 4. In that case, 4 different classifiers are used in POC0, and which classifier (0, 1, or 2) is used is signaled in the CTU level. Truncated-unary (TU) code can be used to indicate the classifier used for each luma or chroma CTB. For example, as shown in Table 10 below, when TU code is 0: CCSAO is not applied; when TU code is 10: set 0 is applied; when TU code is 110, set 1 is applied; when TU code is 1110: set 2 is applied; when TU code is 1111: set 3 is applied. Fixed-length code, golomb-rice code, and exponential-golomb code can also be used to indicate the classifier (offset set index) for CTB. 3 different classifiers are used in POC1.

TABLE 10

Truncated-unary (TU) code is used to indicate the classifier used for each chroma CTB

| POC | Classifier | C0 band_num | Region | TU code |
|---|---|---|---|---|
| 0 | C0 using Y3 position | 6 | 0 | 10 |
| 0 | C0 using Y3 position | 7 | 1 | 110 |
| 0 | C0 using Y1 position | 3 | 2 | 1110 |
| 0 | C0 using Y6 position | 6 | 3 | 1111 |
| 1 | C0 using Y0 position | 16 | 0 | 10 |
| 1 | C0 using Y0 position | 8 | 1 | 110 |
| 1 | C0 using Y1 position | 8 | 2 | 1110 |

An example of Cb and Cr CTB offset set indices is given for 1280×720 sequence POC0 (number of CTUs in a frame is 10×6 if the CTU size is 128×128). POC0 Cb uses 4 offset sets and Cr uses 1 offset set. As shown in Table 11-1 below, when the offset set index is 0: CCSAO is not applied; when the offset set index is 1: set 0 is applied; when the offset set index is 2: set 1 is applied; when the offset set index is 3: set 2 is applied; when the offset set index is 4: set 3 is applied. Type means the position of the chosen collocated luma sample (Yi). Different offset sets can have different types, band_num and corresponding offsets.

TABLE 11-1

An example of Cb and Cr CTB offset set indices is given for 1280 × 720 sequence POCO (number of CTUs in a frame is 10x6 if the CTU size is 128 × 128)

```
ccsao_on_frame POC: 0, TID: 0, comp: 0, on: 1, lcu_ctrl: 1, set_num: 4, set: 0, type: 3, band_num: 6
ccsao_on_frame POC: 0, TID: 0, comp: 0, on: 1, lcu_ctrl: 1, set_num: 4, set: 1, type: 3, band_num: 7
ccsao_on_frame POC: 0, TID: 0, comp: 0, on: 1, lcu_ctrl: 1, set_num: 4, set: 2, type: 1, band_num: 3
ccsao_on_frame POC: 0, TID: 0, comp: 0, on: 1, lcu_ctrl: 1, set_num: 4, set: 3, type: 6, band_num: 6
ccsao_on_frame POC: 0, TID: 0, comp: 1, on: 1, lcu_ctrl: 0, set_num: 1, set: 0, type: 8, band_num: 10
1 0 2 2 0 0 1 2 0 0    1 1 1 1 1 1 1 1 1 1
0 0 0 0 1 1 1 1 2 4    1 1 1 1 1 1 1 1 1 1
1 1 4 1 3 1 1 2 2 1    1 1 1 1 1 1 1 1 1 1
4 3 1 1 4 2 1 1 1 4    1 1 1 1 1 1 1 1 1 1
0 0 3 1 1 1 1 2 1 3    1 1 1 1 1 1 1 1 1 1
0 0 3 3 3 1 1 3 4 1    1 1 1 1 1 1 1 1 1 1
offset[ 0]    U:  6 |  0 |   −1 |  2 |  v: −2 |
offset[ 1]    U:  2 |  1 |   −7 |  0 |  v:  0 |
```

TABLE 11-1-continued

An example of Cb and Cr CTB offset set indices is given for 1280 × 720
sequence POC0 (number of CTUs in a frame is 10x6 if the CTU size is 128 × 128)

| offset[ 2] | U: 0 \| −1 \| | −6 \| −2 \| | v: 0 \| |
|---|---|---|---|
| offset[ 3] | U: −2 \| 2 \| | 0 \| −1 \| | v: 0 \| |
| offset[ 4] | U: −3 \| 2 \| | 0 \| −1 \| | v: 0 \| |
| offset[ 5] | U: −4 \| 1 \| | 0 \| −7 \| | v: 1 \| |
| offset[ 6] | U: \| \| | \| \| | v: 0 \| |
| offset[ 7] | U: \| \| | \| \| | v: 0 \| |
| offset[ 8] | U: \| \| | \| \| | v: 0 \| |
| offset[ 9] | U: \| \| | \| \| | v: −2 \| |
| offset[ 10] | U: \| \| | \| \| | v: \| |
| offset[ 11] | U: \| \| | \| \| | v: \| |
| offset[ 12] | U: \| \| | \| \| | v: \| |
| offset[ 13] | U: \| \| | \| \| | v: \| |
| offset[ 14] | U: \| \| | \| \| | v: \| |
| offset[ 15] | U: \| \| | \| \| | v: \| |

In some embodiments, an example of jointly using collocated/current and neighboring Y/U/V samples for classification is listed (3 component joint bandNum classification for each Y/U/V component) in Table 11-2 below. In POC0, {2,4,1} offset sets are used for {Y, U, V}, respectively. Each offset set can be adaptively switched in SPS/APS/PPS/PH/SH/Region/CTU/CU/Subblock/Sample levels. Different offset sets can have different classifiers. For example, as candidate position (candPos) indicating in FIGS. 6B and 6C, for classifying current Y4 luma sample, Y set0 selects {current Y4, collocated U4, collocated V4} as candidates, with different bandNum { Y, U, V}={16,1,2}, respectively. With {candY, candU, candV} as the sample values of selected {Y, U, V} candidates, the number of total classes is 32, and the class index derivation can be shown as:

$$band Y = (cand Y * bandNum Y) >> BitDepth;$$

$$band U = (cand U * bandNum U) >> BitDepth;$$

$$band V = (cand V * bandNum V) >> BitDepth;$$

$$classIdx = band Y * bandNum U * bandNum V + band U * bandNum V + band V.$$

In some embodiments, the classIdx derivation of a joint classifier can be represented as the "or-shift" form to simplify the derivation process. For example, max bandNum={16, 4, 4}

$$classIdx = (band Y << 4) | (band U << 2) | band V.$$

Another example is in POC1 component V set1 classification. In that example, candPos={neighboring Y8, neighboring U3, neighboring V0} with bandNum={4,1,2} are used, which yields 8 classes.

TABLE 11-2

An example of jointly using collocated/current and
neighboring Y/U/V samples for classification

| POC | Current Comp | offset set | Classifier: candPos(Y, U, V) with bandNum(Y, U, V) | Total classes (offsets number) |
|---|---|---|---|---|
| 0 | Y | 0 | (Y4, U4, V4), (16, 1, 2) | 16*1*2 = 32 |
| | | 1 | (Y4, U0, V2), (15, 4, 1) | 15*4*1 = 60 |
| | U | 0 | (Y8, U3, V0), (1, 1, 2) | 2 |
| | | 1 | (Y4, U1, V0), (15, 2, 2) | 60 |
| | | 2 | (Y6, U6, V6), (4, 4, 1) | 16 |
| | | 3 | (Y2, U0, V5), (1, 1, 1) | 1 |
| | V | 0 | (Y2, U0, V5), (1, 1, 1) | 1 |

TABLE 11-2-continued

An example of jointly using collocated/current and
neighboring Y/U/V samples for classification

| POC | Current Comp | offset set | Classifier: candPos(Y, U, V) with bandNum(Y, U, V) | Total classes (offsets number) |
|---|---|---|---|---|
| 1 | Y | 0 | (Y4, U1, V0), (15, 2, 2) | 60 |
| | U | 0 | (Y6, U2, V1), (7, 1, 2) | 14 |
| | V | 0 | (Y8, U3, V0), (1, 1, 2) | 2 |
| | | 1 | (Y8, U3, V0), (4, 1, 2) | 8 |

In some embodiments, an example of jointly using collocated and neighboring Y/U/V samples for the current Y/U/V sample classification is listed (3 components joint edgeNum (CIs) and bandNum classification for each Y/U/V component), for example, as shown in Table 11-3 below. Edge CandPos is the centered position used for CIs classifier, edge bitMask is the CIs neighboring samples activation indicator, and edgeNum is corresponding number of CIs classes. In this example, CIs is only applied on Y classifier (so edgeNum equals to edgeNumY) with edge candPos is always Y4 (current/collocated sample position). However, CIs can be applied on Y/U/V classifiers with edge candPos as the neighboring sample position.

With diff denoting Y CIs's comparison score, the classIdx derivation can be $$band Y = (cand Y * bandNum Y) >> BitDepth;$$

$$band U = (cand U * bandNum U) >> BitDepth;$$

$$band V = (cand V * bandNum V) >> BitDepth;$$

$$edgeIdx = diff + (edgeNum >> 1);$$

$$bandIdx = band Y * bandNum U * bandNum V + band U * bandNum V + band V;$$

$$classIdx = bandIdx * edgeNum + edgeIdx.$$

TABLE 11-3 (part 1)

An example of jointly using collocated/current and
neighboring Y/U/V samples for classification

| POC | 0 | | | |
|---|---|---|---|---|
| Current Component | Y | | | U |
| Set | 0 | 1 | 2 | 0 |
| edge candPos(y) | (Y4) | (Y4) | (Y4) | (Y4) |
| edge bitmask(Y) | 10000001 | 00010000 | 01111110 | 10000000 |
| edgeNum | 5, [-2, 2] | 3, [-1, 1] | 13, [-6, 6] | 3, [-1, 1] |
| band candPos(Y, U, V) | (Y4, U4, V4) | (Y4, U0, V2) | (Y4, U1, V2) | (Y8, U3, V0) |
| bandNum(Y, U, V) | (16, 1, 2) | (15, 4, 1) | (2, 1, 1) | (1, 1, 2) |
| Total classes | 5*16*1*2 = 160 | 3*15*4*1 = 180 | 13*2*1*1 * = 26 | 3*1*1*2 = 6 |
| Signaled offsets | 160 offsets values: (3, 3, 2, -1 . . .) | 180 offsets values | 26 offsets values | 6 offset values |
| Sorted set idx | 0 | 1 | 2 | 0 |
| Component | Y | Y | Y | U |

TABLE 11-3 (part 2)

An example of jointly using collocated/current and neighboring Y/U/V samples for classification

| POC | | | | | 1 |
|---|---|---|---|---|---|
| Current Component | | | | V | Y |
| Set | 1 | 2 | 3 | 0 | 0 |
| edge candPos(y) | (Y4) | (Y4) | (Y4) | (Y4) | reuse |
| edge bitmask(Y) | 00000000 | 00000000 | 10000001 | 00000000 | reuse |
| edgeNum | 1, [0] | 1, [0] | 5, [-2, 2] | 1, [0] | reuse |
| band candPos(Y, U, V) | (Y4, U1, V0) | (Y6, U6, V6) | (Y2, U0, V5) | (Y2, U0, V5) | reuse |
| bandNum(Y, U, V) | (15, 2, 2) | (4, 1, 1) | (1, 1, 1) | (1, 1, 1) | reuse |
| Total classes | 60 | 4 | 1 | 1 | 160 |
| Signaled offsets | 60 offsets values | 4 offsets values: (1, 2, 0, 1) | 1 offsets values | 1 offsets values | signal idxY = 0, reuse params & offsets (3, 3, 2, -1 . . .) |
| Sorted set idx | 1 | 2 | 3 | 0 | |
| Component | U | U | U | V | Y |

TABLE 11-3 (part 3)

An example of jointly using collocated/current and
neighboring Y/U/V samples for classification

| POC | | | | |
|---|---|---|---|---|
| Current Component | | U | V | |
| Set | 1 | 0 | 0 | 1 |
| edge candPos(y) | (Y4) | reuse | (Y4) | (Y4) |
| edge bitmask(Y) | 11111111 | reuse | 00000000 | 00000000 |
| edgeNum | 17, [-8, 8] | reuse | 1, [0] | 1, [0] |
| band candPos(Y, U, V) | (Y4, U1, V2) | reuse | (Y8, U3, V0) | (Y8, U3, V0) |
| bandNum(Y, U, V) | (4, 1, 1) | reuse | (1, 1, 2) | (4, 1, 2) |
| Total classes | 17*4*1*1 = 68 | 4 | 2 | 8 |
| Signaled offsets | 68 offsets values | signal idxU = 2, reuse params & offsets (1, 2, 0, 1) | 2 offsets values | 8 offsets values |
| Sorted set idx | 3 | | | |
| Component | Y | U | V | V |

In some embodiments, the maximum band_num (bandNumY, bandNumU, or bandNumV) can be fixed or signaled in SPS/APS/PPS/PH/SH/Region/CTU/CU/Sub-block/Sample levels. For example, fixing max band_num=16 in the decoder and for each frame, 4 bits are signaled to indicate the C0 band_num in a frame. Some other maximum band_num examples are listed below in Table 12.

TABLE 12

Maximum band_num and band_num bit examples

| Band_num_min | Band_num_max | Band_num bit |
|---|---|---|
| 1 | 1 | 0 |
| 1 | 2 | 1 |
| 1 | 4 | 2 |
| 1 | 8 | 3 |
| 1 | 16 | 4 |
| 1 | 32 | 5 |
| 1 | 64 | 6 |
| 1 | 128 | 7 |
| 1 | 256 | 8 |

In some embodiments, the max number of classes or offsets (combinations of jointly using multiple classifiers, for example, C1s edgeNum*C1 bandNumY*bandNumU*bandNumV) for each set (or all set added) can be fixed or signaled in SPS/APS/PPS/PH/SH/Region/CTU/CU/Subblock/Sample levels. For example, max is fixed for all sets added class_num=256*4, and an encoder conformance check or a decoder normative check can be used to check the constraint.

In some embodiments, a restriction can be applied on the C0 classification, for example, restricting band_num (bandNumY, bandNumU, or bandNumV) to be only power of 2 values. Instead of explicitly signaling band_num, a syntax band_num_shift is signaled. Decoder can use shift operation to avoid multiplication. Different band_num_shift can be used for different component.

$$Class(C0)=(Y0>>band\_num\_shift)>>bit\_depth$$

Another operation example is taking rounding into account to reduce error.

$$Class(C0)=((Y0+(1<<(band\_num\_shift-1)))>>band\_num\_shift)>>bit\_depth$$

For example, if band_num_max (Y, U, or V) is 16, the possible band_num_shift candidates are 0, 1, 2, 3, 4, corresponding to band_num=1, 2, 4, 8, 16, as shown in Table 13.

TABLE 13

Band_num and corresponding band_num_shift candidates

| POC | Classifier | C0 band_num_shift | C0 band_num | Total classes |
|---|---|---|---|---|
| 0 | C0 using Y0 position | 4 | 16 | 16 |
| 1 | C0 using Y7 position | 3 | 8 | 8 |

| Band_num_max | Valid band_num | Band_num_shift candidates |
|---|---|---|
| 1 | 1 | 0 |
| 2 | 1, 2 | 0, 1 |
| 4 | 1, 2, 4 | 0, 1, 2 |
| 8 | 1, 2, 4, 8 | 0, 1, 2, 3 |
| 16 | 1, 2, 4, 8, 16 | 0, 1, 2, 3, 4 |
| 32 | 1, 2, 4, 8, 16, 32 | 0, 1, 2, 3, 4, 5 |
| 64 | 1, 2, 4, 8, 16, 32, 64 | 0, 1, 2, 3, 4, 5, 6 |
| 128 | 1, 2, 4, 8, 16, 32, 64, 128 | 0, 1, 2, 3, 4, 5, 6, 7 |
| 256 | 1, 2, 4, 8, 16, 32, 64, 128, 256 | 0, 1, 2, 3, 4, 5, 6, 7, 8 |

In some embodiments, the classifiers applied to Cb and Cr are different. The Cb and Cr offsets for all classes can be signaled separately. For example, different signaled offsets are applied to different chroma components as shown in Table 14 below.

TABLE 14

The Cb and Cr offsets for all classes can be signaled separately

| POC | Component | Classifier | C0 band_num | Total classes | Signaled offsets |
|---|---|---|---|---|---|
| 0 | Cb | C0 | 16 | 16 | 16 |
| 0 | Cr | C0 | 5 | 5 | 5 |

In some embodiments, the max offset value is fixed or signaled in Sequence Parameter Set (SPS)/Adaptation parameter set (APS)/Picture parameter set (PPS)/Picture header (PH)/Slice header (SH)/Region/CTU/CU/Subblock/Sample levels. For example, the max offset is between [−15, 15]. Different component can have different max offset value.

In some embodiments, the offset signaling can use Differential pulse-code modulation (DPCM). For example, offsets {3, 3, 2, 1, −1} can be signaled as {3, 0, −1, −1, −2}.

In some embodiments, the offsets can be stored in APS or a memory buffer for the next picture/slice reuse. An index can be signaled to indicate which stored previous frame offsets are used for the current picture.

In some embodiments, the classifiers of Cb and Cr are the same. The Cb and Cr offsets for all classes can be signaled jointly, for example, as shown in Table 15 below.

TABLE 15

The Cb and Cr offsets for all classes can be signaled jointly

| POC | Component | Classifier | C0 band_num | Total classes | Signaled offsets |
|---|---|---|---|---|---|
| 0 | Cb and Cr | C0 | 8 | 8 | 8 |

In some embodiments, the classifier of Cb and Cr can be the same. The Cb and Cr offsets for all classes can be signaled jointly, with a sign flag difference, for example, as shown in Table 16 below. According to Table 16, when Cb offsets are (3, 3, 2, −1), the derived Cr offsets are (−3, −3, −2, 1).

TABLE 16

| | Com-ponent | Clas-sifier | C0 band_num | Total classes | Signaled offsets | Signaled sign flag |
|---|---|---|---|---|---|---|
| POC | | | | | | |
| 0 | Cb and Cr | C0 | 4 | 4 | 4: (3, 3, 2, −1) | 1: (−) |

*The Cb and Cr offsets for all classes can be signaled jointly with a sign flag difference*

In some embodiments, the sign flag can be signaled for each class. for example, as shown in Table 17 below. According to Table 17, when Cb offsets are (3, 3, 2, −1), the derived Cr offsets are (−3, 3, 2, 1) according to the respective signed flag.

TABLE 17

| | Com-ponent | Clas-sifier | C0 band_num | Total classes | Signaled offsets | Signaled sign flag |
|---|---|---|---|---|---|---|
| POC | | | | | | |
| 0 | Cb and Cr | C0 | 4 | 4 | 4: (3, 3, 2, −1) | 1: (−, +, +, −) |

*The Cb and Cr offsets for all classes can be signaled jointly with a sign flag signaled for each class*

In some embodiments, the classifiers of Cb and Cr can be the same. The Cb and Cr offsets for all classes can be signaled jointly, with a weight difference, for example, as shown in Table 18 below. The weight (w) can be selected in a limited table, for example, +−1/4, +−1/2, 0, +−1, +−2, +−4 . . . etc., where |w| only includes the power-of-2 values. According to Table 18, when Cb offsets are (3, 3, 2, −1), the derived Cr offsets are (−6, −6, −4, 2) according to the respective signed flag.

TABLE 18

| | Com-ponent | Clas-sifier | C0 band_num | Total classes | Signaled offsets | Signaled weight |
|---|---|---|---|---|---|---|
| POC | | | | | | |
| 0 | Cb and Cr | C0 | 4 | 4 | 4: (3, 3, 2, −1) | −2 |

*The Cb and Cr offsets for all classes can be signaled jointly with a weight difference*

In some embodiments, the weight can be signaled for each class. for example, as shown in Table 19 below. According to Table 19, when Cb offsets are (3, 3, 2, −1), the derived Cr offsets are (−6, 12, 0, −1) according to the respective signed flag.

TABLE 19

| | Com-ponent | Clas-sifier | C0 band_num | Total classes | Signaled offsets | Signaled weight |
|---|---|---|---|---|---|---|
| POC | | | | | | |
| 0 | Cb and Cr | C0 | 4 | 4 | 4: (3, 3, 2, −1) | 4: (−2, 4, 0, 1) |

*The Cb and Cr offsets for all classes can be signaled jointly with a weight signaled for each class*

In some embodiments, if plural classifiers are used in the same POC, different offset sets are signaled separately or jointly.

In some embodiments, the previously decoded offsets can be stored for use of future frames. An index can be signaled to indicate which previously decoded offsets set is used for the current frame, to reduce offsets signaling overhead. For example, POC0 offsets can be reused by POC2 with signaling offsets set idx=0 as shown in Table 20 below.

TABLE 20

| POC | Com-ponent | Clas-sifier | C0 band_num | Total classes | Signaled offsets | Stored offset set idx |
|---|---|---|---|---|---|---|
| 0 | Cb | C0 | 4 | 4 | 4: (3, 3, 2, −1) | 0 |
| 0 | Cr | C0 | 4 | 4 | 4: (−2, 1, 0, 1) | 0 |
| 1 | Cb | C0 | 4 | 4 | 4: (0, 0, 1, −1) | 1 |
| 1 | Cr | C0 | 4 | 4 | 4: (1, 2, 0, 1) | 1 |
| 2 | Cb | C0 | 4 | 4 | Reuse offsets (3, 3, 2, −1) | Signal idx = 0 |
| 2 | Cr | C0 | 4 | 4 | Reuse offsets (−2, 1, 0, 1) | Signal idx = 0 |

*An index can be signaled to indicate which previously decoded offsets set is used for the current frame*

In some embodiments, the reuse offsets set idx for Cb and Cr can be different, for example, as shown in Table 21 below.

TABLE 21

| POC | Com-ponent | Clas-sifier | C0 band_num | Total classes | Signaled offsets | Stored offset set idx |
|---|---|---|---|---|---|---|
| 0 | Cb | C0 | 4 | 4 | 4: (3, 3, 2, −1) | 0 |
| 0 | Cr | C0 | 4 | 4 | 4: (−2, 1, 0, 1) | 0 |
| 1 | Cb | C0 | 4 | 4 | 4: (0, 0, 1, −1) | 1 |
| 1 | Cr | C0 | 4 | 4 | 4: (1, 2, 0, 1) | 1 |
| 2 | Cb | C0 | 4 | 4 | Reuse offsets (3, 3, 2, −1) | Signal idx = 0 |
| 2 | Cr | C0 | 4 | 4 | Reuse offsets (1, 2, 0, 1) | Signal idx = 1 |

*An index can be signaled to indicate which previously decoded offsets set is used for the current frame, and the index can be different for Cb and Cr components.*

In some embodiments, the offset signaling can use additional syntax including start and length, to reduce signaling overhead. For example, when band_num=256, only offsets of band_idx=37~44 are signaled. In the example below in Table 22-1, the syntax of start and length both are 8 bits fixed-length coded that should match band_num bits.

TABLE 22-1

| band_idx | | offset | band_num_max | band_num bits, start, length |
|---|---|---|---|---|
| 1 | | 0 | 1 | 0 |
| 2 | | 0 | 2 | 1 |
| 3 | | 0 | 4 | 2 |
| . . . | | | 8 | 3 |
| 37 | start = 37 | offset[0] | 16 | 1 |
| 38 | | offset[1] | 32 | 5 |
| 39 | | offset[2] | 64 | 6 |
| 40 | | offset[3] | 128 | 7 |
| 41 | | offset[4] | 256 | 8 |
| 42 | | offset[5] | | |
| 43 | | offset[6] | | |
| 44 | length = 8 | offset[7] | | |
| . . . | | | | |
| 255 | | 0 | | |
| 256 | | 0 | | |

*the offset signaling uses additional syntax including start and length*

In some embodiments, if CCSAO is applied to all YUV 3 components, collocated and neighbouring YUV samples can be jointly used for classification, and all abovementioned offsets signaling method for Cb/Cr can be extended to Y/Cb/Cr. In some embodiments, different component offset set can be stored and used separately (each component has its own stored sets) or jointly (each component shares/reuses the same stored). A separate set example is shown in Table 22-2 below.

TABLE 22-2 an example showing that different component offset set can be stored and used separately
(each component has its own stored sets) or jointly (each component shares/reuses the same stored)

| POC | Current Component | Offset set | Classifier: candPos(Y, U, V) with bandNum (Y, U, V) | Total classes (offsets number) | Signaled offsets | Sorted offsets set idx | |
|---|---|---|---|---|---|---|---|
| 0 | Y | 0 | (Y4, U4, V4), (16, 1, 2) | 16*1*2 = 32 | 32 offsets values (3, 3, 2, 1, . . . ) | 0 | Y |
| | | 1 | (Y4, U0, V2), (14, 4, 1) | 15*4*1 = 60 | 60 offsets values | 0 | Y |
| | U | 0 | (Y8, U3, V0), (1, 1, 2) | 2 | 2 offsets values | 0 | U |
| | | 1 | (Y4, U1, V0), (15, 2, 2) | 60 | 60 offsets values | 1 | U |
| | | 2 | (Y6, U6, V6), (4, 1, 1) | 4 | 4 offsets values | 2 | U |
| | | 3 | (Y2, U0, V5), (1, 1, 1) | 1 | 1 offsets values | 3 | U |
| | V | 0 | (Y2, U0, V5), (1, 1, 1) | 1 | 1 offsets values | 0 | V |
| 1 | Y | 0 | Reuse Y stored offset set idx 0 | 32 | Signal idx = 0 and reuse offsets (3, 3, 2, −1, . . . ) | | Y |
| | U | 0 | Reuse U stored offset set idx 2 | 4 | Signal idx = 2 and reuse offsets (1, 2, 0, 1) | | U |
| | V | 0 | (Y8, U3, V0), (1, 1, 2) | 2 | 2 offsets values | | V |
| | | 1 | (Y8, U3, V0), (4, 1, 2) | 8 | 8 offsets values | | V |

In some embodiments, if a sequence bit depth is higher than 10 (or a certain bit depth), the offset can be quantized before signaling. On the decoder side, the decoded offset is dequantized before applying it as shown in Table 23-1 below. For example, for a 12-bit sequence, the decoded offsets are left shifted (dequantized) by 2.

TABLE 23-1

The decoded offset is dequantized before applying it

| Signaled offset | Dequantized and applied offset |
|---|---|
| 0 | 0 |
| 1 | 4 |
| 2 | 8 |
| 3 | 12 |
| . . . | |
| 14 | 56 |
| 15 | 60 |

In some embodiments, the offset can be calculated as CcSaoOffsetVal=(1−2*ccsao_offset_sign_flag)*(ccsao_offset_abs<<(BitDepth−Min(10, BitDepth))).

In some embodiments, the filter strength concept is further introduced herein. For example, the classifier offsets can be further weighted before being applied to samples. The weight (w) can be selected in a table of power-of-2 values. For example, +−1/4, +−1/2, 0, +−1, +−2, +−4 . . . etc., where |w| only includes the power-of-2 values. The weight index can be signaled at SPS/APS/PPS/PH/SH/Region (Set)/CTU/CU/Subblock/Sample levels. The quantized offset signaling can be taken as a subset of this weight application. If recursive CCSAO is applied as shown in FIG. 6D, a similar weight index mechanism can be applied between the $1^{st}$ and $2^{nd}$ stages.

In some examples, weighting for different classifiers: plural classifiers' offsets can be applied to the same sample with a weight combination. A similar weight index mechanism can be signaled as mentioned above. For example, $$\text{offset\_final}=w*\text{offset\_1}+(1-w)*\text{offset\_2, or}$$

$$\text{offset\_final}=w1*\text{offset\_1}+w2*\text{offset\_2}+ . . .$$

In some embodiments, instead of directly signaling CCSAO parameters in PH/SH, the previously used parameters/offsets can be stored in Adaptation Parameter Set (APS) or a memory buffer for the next pictures/slices reuse. An index can be signaled in PH/SH to indicate which stored previous frame offsets are used for the current picture/slice. A new APS ID can be created to maintain the CCSAO history offsets. The following table shows one example using FIG. 6I, candPos and bandNum{Y,U,V}={16,4,4}. In some examples, candPos, bandNum, offsets signaling method can be fixed length code (FLC) or other methods, such as truncated unary (TU) code, exponential-golomb code with order k (EGk), signed EGO (SVLC), or unsigned EGO (UVLC). sao_cc_y_class_num (or cb, or cr) equals to sao_cc_yband_num_y*sao_cc_yband_num_u*sao_ccy_band_num_v (or cb, or cr) in this case. ph_sao_cc_y_aps_id is the parameter index used in this picture/slice. Note cb and cr component can follow the same signaling logic.

TABLE 23-2

| Adaptation Parameter Set (APS) syntax. | |
| --- | --- |
| | Descriptor |
| adaptation_parameter_set_rbsp( ) { | |
|     aps_params_type | u(3) |
|     aps_adaptation_parameter_set_id | u(5) |
|     aps_chroma_present_flag | u(1) |
|     if( aps_params_type = = ALF_APS ) | |
|       alf_data( ) | |
|     else if( aps_params_type = = LMCS_APS ) | |
|       lmcs_data( ) | |
|     else if( aps_params_type = = SCALING_APS ) | |
|       scaling_list_data( ) | |
|     else if( aps_params_type = = CCSAO_APS ) | |
|       ccsao_data( ) | |

| | Descriptor |
| --- | --- |
| ccsao_data( ) { | |
|   sao_cc_y_set_signal_flag | u(1) |
|   if( aps_chroma_present_flag ) {   (can be without this if) | |
|     sao_cc_cb_set_signal_flag | u(1) |
|     sao_cc_cr_set_signal_flag | u(1) |
|   } | |
|   if( sao_cc_y_set_signal_flag ) { | |
|     sao_cc_y_sets_signalled_minus1 | |
|     for( k = 0; k < sao_cc_cb_sets_signalled_minus1 + 1; k++ ) { | |
|       sao_cc_y_cand_pos_y | ue(v) |
|       sao_cc_y_band_num_y | u(4) |
|       sao_cc_y_band_num_u | u(2) |
|       sao_cc_y_band_num_v | u(2) |
|       for( j = 0; j < sao_cc_y_class_num; j++ ) { | |
|         sao_cc_y_offset_abs[ k ][ j ] | |
|         if( sao_cc_y_offset_abs[ k ][ j ] ) | |
|           sao_cc_y_offset_sign[ k ][ j ] | |
|       } | |
|     } | |
|   } | |
|   if( sao_cc_cb_set_signal_flag ) { | |
|     sao_cc_cb_sets_signalled_minus1 | |
|     for( k = 0; k < sao_cc_cb_sets_signalled_minus1 + 1; k++ ) { | |
|       sao_cc_cb_band_num_y | u(4) |
|       sao_cc_cb_band_num_u | u(2) |
|       sao_cc_cb_band_num_v | u(2) |
|       for( j = 0; j < sao_cc_cb_class_num; j++ ) { | |
|         sao_cc_cb_offset_abs[ k ][ j ] | |
|         if( sao_cc_cb_offset_abs[ k ][ j ] ) | |
|           sao_cc_cb_offset_sign[ k ][ j ] | |
|       } | |
|     } | |
|   } | |
|   if( sao_cc_cr_set_signal_flag ) { | |
|     sao_cc_cr_sets_signalled_minus1 | |
|     for( k = 0; k < sao_cc_cr_sets_signalled_minus1 + 1; k++ ) { | |
|       sao_cc_cr_band_num_y | u(4) |
|       sao_cc_cr_band_num_u | u(2) |
|       sao_cc_cr_band_num_v | u(2) |
|       for( j = 0; j < sao_cc_cr_class_num; j++ ) { | |
|         sao_cc_cr_offset_abs[ k ][ j ] | |
|         if( sao_cc_cr_offset_abs[ k ][ j ] ) | |
|           sao_cc_cr_offset_sign[ k ][ j ] | |
|       } | |
|     } | |
|   } | |
| } | | aps_adaptation_parameter_set_id provides an identifier for the APS for reference by other syntax elements. When aps_params_type is equal to CCSAO_APS, the value of aps_adaptation_parameter_set_id shall be in the range of 0 to 7, inclusive (for example).

ph_sao_cc_y_aps_id specifies the aps_adaptation_parameter_set_id of the CCSAO APS that the Y color component of the slices in the current picture refers to. When ph_sao_cc_y_aps_id is present, the following applies: the value of sao_cc_y_set_signal_flag of the APS NAL unit having aps_params_type equal to CCSAO_APS and aps_adaptation_parameter_set_id equal to ph_sao_cc_y_aps_id shall be equal to 1; the TemporalId of the APS network abstraction layer (NAL) unit having aps_params_type equal to CCSAO_APS and aps_adaptation_parameter_set_id equal to ph_sao_cc_y_aps_id shall be less than or equal to the TemporalId of the current picture.

In some embodiments, APS update mechanism is described herein. A maximum number of APS offset sets can be predefined or signaled in SPS/APS/PPS/PH/SH/Region/

CTU/CU/Subblock/Sample levels. Different component can have different maximum number limitation. If the APS offset sets are full, the newly added offset set can replace one existing stored offset sets with first in, first out (FIFO), last in, first out (LIFO), or least-recently-used (LRU) mechanism, or an index value is received which indicates which APS offset set should be replaced. In some examples, if the chosen classifier consists of candPos/edge info/coding info . . . , etc., all classifier information can be taken as part of the APS offset set and can be also stored in the APS offset set with its offset values. In some instances, the update mechanisms mentioned above may be predefined or signaled in SPS/APS/PPS/PH/SH/Region/CTU/CU/Subblock/Sample levels.

In some embodiments, a constraint can be applied which is referred to as "pruning". For example, the newly received classifier info and offsets cannot be the same as any of the stored APS offset set (of the same component, or across different components).

In some examples, if C0 candPos/bandNum classifier is used, the maximum number of APS offset sets is 4 per Y/U/V, and FIFO update is used for Y/V, idx indicating updating is used for U.

TABLE 23-3

| | | | CCSAO offset sets update using FIFO. | | | | |
|---|---|---|---|---|---|---|---|
| POC | Comp | Set | classifier description candPos(Y, U, V) | classifier description bandNum(Y, U, V) | number of offsets | sorted set idx | separate set comp |
| 0 | Y | 0 | (Y4, U4, V4) | (16, 1, 2) | 32: (3, 3, 2, −1, . . . ) | 0 | Y |
| | | 1 | (Y4, U0, V2) | (15, 4, 1) | 60: (−1, 0, 2, 3, . . . ) | 1 | |
| | | 2 | (Y4, U1, V2) | (2, 1, 1) | 2: (6, 8) | 2 | |
| | | 3 | (Y4, U1, V1) | (4, 1, 1) | 4: (5, 5, 0, −3) | 3 | |
| | U | 0 | (Y8, U3, V0) | (1, 1, 4) | 4: (0, 2, 0, −1) | 0 | U |
| | | 1 | (Y4, U1, V0) | (15, 2, 2) | 60: (4, 1, 1, 3, . . . ) | 1 | |
| | | 2 | (Y6, U6, V6) | (4, 1, 1) | 4: (1, 2, 0, 1) | 2 | |
| | | 3 | (Y2, U0, V5) | (1, 1, 1) | 1: (2) | 3 | |
| | V | 0 | (Y2, U0, V5) | (1, 1, 1) | 1(−1) | 0 | V |
| | | 1 | (Y2, U4, V4) | (8, 2, 2) | 32: (2, 2, 0, −1, . . . ) | 1 | |
| 1 | Y | 0 | (Y4, U0, V2) | (2, 1, 1) | 2: (5, 8) | replace 0 | newly received, FIFO replaces set 0 |
| | | 1 | (Y4, U1, V0) | (4, 1, 1) | 4: (0, 0, −2, 1) | replace 1 | newly received, FIFO replaces set 1 |
| | | 2 | reuse idx 0 | reuse idx 0 | | | reuse updated set 0 (Y4, U0, V2) (2, 1, 1) |
| | | 3 | reuse idx 1 | reuse idx 1 | | | reuse updated set 1 (Y4, U1, V0) (4, 1, 1) |
| | U | 0 | (Y2, U0, V5) | (1, 2, 1) | 2: (−15, 0) | replace 1 | newly received, receiving an idx indicating to update set 1 |
| | | 1 | reuse idx 1 | reuse idx 1 | | | reuse updated set 1 (Y2, U0, V5) (1, 2, 1) |
| | V | 0 | (Y2, U4, V4) | (8, 1, 1) | 8: (1, 1, 0, 6, . . . ) | 1 | newly received, APS not full, insert |
| 2 | Y | 0 | (Y4, U1, V1) | (2, 1, 1) | 2: (5, 8) | replace 2 | newly received, FIFO replaces set 2 |
| | | 1 | (Y4, U0, V0) | (2, 1, 1) | 2: (0, −1) | replace 3 | newly received, FIFO replaces set 3 |
| | U | 0 | reuse idx 1 | reuse idx 1 | | | reuse updated set 1 |

TABLE 23-3-continued

| | | | classifier description candPos(Y, U, V) | classifier description bandNum(Y, U, V) | number of offsets | sorted set idx | separate set comp |
|---|---|---|---|---|---|---|---|
| POC | Comp | Set | | | | | |
| V | | 0 | (Y2, U4, V4) | (8, 2, 2) | 32: (2, 2, 0, −1, . . . ) | 0 | (Y2, U0, V5) (1, 2, 1) newly received, but already in set 1, (illegal, dec assert or skip adding this set) |

CCSAO offset sets update using FIFO.

In some embodiments, the pruning criterion may be relaxed to give a more flexible way for encoder trade-off: for example, allowing N offsets to be different when applying pruning operation, (e.g., N=4); in another example, allowing difference (represented as "thr") for values of each offset when applying pruning operation, (e.g., +−2).

In some embodiments, the 2 criteria may be applied at the same time or individually. Whether to apply each criterion is predefined or switched in SPS/APS/PPS/PH/SH/Region/CTU/CU/Subblock/Sample levels.

In some embodiments, N/thr can be predefined or switched in SPS/APS/PPS/PH/SH/Region/CTU/CU/Subblock/Sample levels.

In some embodiments, the FIFO update can be (1) update from previously left set idx circularly (if all updated, started from set 0 again) as in the above example, (2) every time update from set 0. In some examples, the update can be in PH (as in example), or SPS/APS/PPS/PH/SH/Region/CTU/CU/Subblock/Sample levels, when receiving a new offset set.

For LRU update, the decoder maintains a count table which counts the "total offset set used count", which can be refreshed in SPS/APS/per Group of Pictures (GOP) structure/PPS/PH/SH/Region/CTU/CU/Subblock/Sample levels. The newly received offset set replaces the least-recently-used offset set in the APS. If 2 stored offset sets have the same count, FIFO/LIFO can be used. For example, see component Y in Table 23-4 below.

TABLE 23-4

CCSAO offset sets update using LRU.

| POC | Comp | Set | classifier description candPos(Y, U, V) | classifier description band Num(Y, U, V) | number of offsets | sorted set idx | used count of 4 sets |
|---|---|---|---|---|---|---|---|
| 0 | Y | 0 | (Y4, U4, V4) | (16, 1, 2) | 32: (3, 3, 2, −1, . . . ) | 0 | 1000 |
| | | 1 | (Y4, U0, V2) | (15, 4, 1) | 60: (−1, 0, 2, 3, . . . ) | 1 | 1100 |
| | | 2 | (Y4, U1, V2) | (2, 1, 1) | 2: (6, 8) | 2 | 1110 |
| | | 3 | (Y4, U1, V1) | (4, 1, 1) | 4: (5, 5, 0, −3) | 3 | 1111 |
| 1 | Y | 0 | reuse idx 0 | reuse idx 0 | | | 2111 |
| | | 1 | reuse idx 0 | reuse idx 0 | | | 3111 |
| | | 2 | reuse idx 0 | reuse idx 0 | | | 4111 |
| | | 3 | reuse idx 1 | reuse idx 1 | | | 4211 |
| 2 | Y | 0 | (Y4, U1, V1) | (2, 1, 1) | 2: (5, 8) | replace 2 | 4211 newly received, LRU replaces set 2 |
| | | 1 | (Y4, U0, V0) | (2, 1, 1) | 2: (0, −1) | replace 3 | 4211 newly received, LRU replaces set 3 |
| | | 2 | reuse idx 2 | reuse idx 2 | | | 4221 |
| | | 3 | reuse idx 2 | reuse idx 2 | | | 4231 |
| 2 | Y | 0 | (Y2, U4, V4) | (2, 1, 1) | 2: (2, 0) | replace 3 | 4231 newly received, LRU replaces set 3 |
| | | 1 | (Y2, U4, V4) | (2, 1, 1) | 2: (1, −1) | replace 2 | 4131 newly received, |

TABLE 23-4-continued

| | | | | CCSAO offset sets update using LRU. | | | |
|---|---|---|---|---|---|---|---|
| POC | Comp | Set | classifier description candPos(Y, U, V) | classifier description band Num(Y, U, V) | number of offsets | sorted set idx | used count of 4 sets |
| | | | | | | | LRU replaces set 2 |
| | | 2 | reuse idx 2 | reuse idx 2 | | | 4141 |
| | | 3 | reuse idx 2 | reuse idx 2 | | | 4151 |

In some embodiments, different components can have different update mechanisms.

In some embodiments, different components (for example, U/V) can share the same classifier (same candPos/ edge info/coding info/offsets, can additionally have a weight with a modifier).

In some embodiments, since different picture/slice used offset sets may only have slight offset value difference, a "patch" implementation may be used in the offset replacement mechanism. In some embodiments, the "patch" implementation is differential pulse-code modulation (DPCM). For example, when signaling a new offset set (OffsetNew), the offset values may be on top of an existed APS stored offset set (OffsetOld). The encoder only signals delta values to update the old offset set (DPCM: OffsetNew=OffsetOld+ delta). In the following examples as shown in Table 23-5, choices other than FIFO update (LRU, LIFO, or signaling an index indicating which set to be updated) may also be used. YUV components may have the same or use different updating mechanisms. Although the classifier candPos/ bandNum does not change in the examples in Table 23-5, overwriting the set classifier may be indicated by signaling an additional flag (flag=0: only update set offsets, flag=1: update both set classifier and set offsets).

TABLE 23-5

| | | | | CCSAO offset sets update using DPCM. | | | |
|---|---|---|---|---|---|---|---|
| POC | Comp | Set | classifier description candPos(Y, U, V) | classifier description bandNum(Y, U, V) | target offsets | sorted set idx | enable APS DPCM | max APS setNum = 4 |
| 0 | Y | 0 | (Y4, U4, V4) | (8, 1, 2) | 16: (3, 3, 2, -1, . . . ) | 0 | default 0 | signal 16 offsets: (3, 3, 2, -1, . . . ) |
| | | 1 | (Y4, U0, V2) | (4, 2, 2) | 16: (-1, 0, 2, 3, . . . ) | 1 | default 0 | signal 16 offsets: (-1, 0, 2, 3, . . . ) |
| | | 2 | (Y4, U1, V2) | (2, 1, 1) | 2: (6, 8) | 2 | default 0 | signal 2 offsets: (6, 8) |
| | | 3 | (Y4, U1, V1) | (4, 1, 1) | 4: (5, 5, 0, -3) | 3 | default 0 | signal 4 offsets: (5, 5, 0, -3) |
| | U | 0 | (Y8, U3, V0) | (4, 2, 1) | 8: (12, 7, 5, -9, . . . ) | 0 | default 0 | signal 8 offsets: (12, 7, 5, -9, . . . ) |
| | | 1 | (Y4, U1, V0) | (8, 1, 1) | 8: (4, 1, 1, 3, . . . ) | 1 | default 0 | signal 8 offsets: (4, 1, 1, 3, . . . ) |
| | | 2 | (Y6, U6, V6) | (4, 1, 1) | 4: (1, 2, 0, 1) | 2 | default 0 | signal 4 offsets: (1, 2, 0, 1) |
| | V | 0 | (Y2, U0, V5) | (7, 1, 2) | 14: (-1, 9, 2, 0, . . . ) | 0 | default 0 | signal 14 offsets: (-1, 9, 2, 0, . . . ) |
| | | 1 | (Y2, U4, V4) | (6, 2, 2) | 24: (2, 2, 0, -1, . . . ) | 1 | default 0 | signal 24 offsets: (2, 2, 0, -1, . . . ) |
| 1 | Y | 0 | (Y4, U4, V4) | (8, 1, 2) | 16: (3, 2, 2, 0, . . . ) | FIFO update 0 | 1 | signal 16 DPCM offsets: (0, -1, 0, 1, . . . ) |
| | | 1 | (Y4, U0, V2) | (4, 2, 2) | 4: (0, 0, 3, 1) | FIFO update 1 | 1 | signal 16 DPCM offsets: (1, 0, 1, -2, . . . ) |
| | | 2 | (Y4, U1, V2) | (2, 1, 1) | 2: (-7, 5) | FIFO update 2 | 0 | signal 2 offsets: (-7, 5), overwrite |
| | | 3 | reuse idx 1 | reuse idx 1 | | | | reuse updated set 1 |
| | U | 0 | (Y4, U4, V4) | (6, 2, 1) | 12: (4, 4, -3, 1, . . . ) | 3 | default 0 | signal 12 offsets: (4, 4, -3, 1, . . . ) |

TABLE 23-5-continued

CCSAO offset sets update using DPCM.

| POC | Comp | Set | classifier description candPos(Y, U, V) | classifier description bandNum(Y, U, V) | target offsets | sorted set idx | enable APS DPCM | max APS setNum = 4 |
|---|---|---|---|---|---|---|---|---|
| | | 1 | (Y4, U4, V4) | (4, 2, 1) | 8: (3, 0, 2, -1, ... ) | indicate update 2 | 0 | signal 8 offsets: (3, 0, 2, -1 ... ) |
| | | 2 | reuse idx 2 | reuse idx 2 | | | | reuse idx 2 offsets: (3, 0, 2, -1, ... ) |
| | V | 0 | reuse idx 0 | reuse idx 0 | | | | reuse idx 0 offsets: (-1, 9, 2, 0, ... ) |

In some embodiments, the DPCM delta offset values may be signaled in FLC/TU/EGk (order-=0, 1, . . . ) codes. One flag may be signaled for each offset set indicating whether to enable DPCM signaling. The DPCM delta offset values, or the new added offset values (directly signaled without DPCM, when enable APS DPCM=0) (ccsao_offset_abs), may be dequantized/mapped before applying to the target offsets (CcSaoOffsetVal). The offset quantization step can be predefined or signaled in SPS/APS/PPS/PH/SH/Region/CTU/CU/Subblock/Sample levels. For example, one method is to directly signaling offset with quantization step=2:

$$CcSaoOffsetVal=(1-2*ccsao\_offset\_sign\_flag)*(ccsao\_offset\_abs<<1)$$

Another method is to use a DPCM signaling offset with quantization step=2:

$$CcSaoOffsetVal=CcSaoOffsetVal+(1-2*ccsao\_offset\_sign\_flag)*(ccsao\_offset\_abs<<1)$$

In some embodiments, one constraint may be applied to reduce the direct offset signaling overhead, for example, the updated offset values must have the same sign as the old offset values. By using such a inferred offset sign, the new updated offset does not need to transmit the sign flag again (ccsao_offset_sign_flag is inferred to be the same as the old offset).

In some embodiments, a sample processing is described below. Let R(x, y) be the input luma or chroma sample value before CCSAO, R'(x, y) be the output luma or chroma sample value after CCSAO:

$$offset=ccsao\_offset[class\_index \ of \ R(x,y)]$$

$$R'(x,y)=Clip3(0,(1<<bit \ depth)-1,R(x,y)+offset)$$

According to the above equations, each luma or chroma sample value R(x, y) is classified using the indicated classifier of the current picture and/or current offset set idx. The corresponding offset of the derived class index is added to each luma or chroma sample value R(x, y). A clip function Clip 3 is applied to the (R(x, y)+offset) to make the output luma or chroma sample value R'(x, y) within the bit depth dynamic range, for example, range 0 to (1<<bit_depth)-1.

FIG. 13 is a block diagram illustrating that CCSAO is applied with other in-loop filters with different clipping combinations in accordance with some implementations of the present disclosure.

In some embodiments, when CCSAO is operated with other loop filters, the clip operation can be (1) Clipping after adding. Following equations show examples when (a) CCSAO is operated with SAO and BIF, or (b) CCSAO replaces SAO but is still operated with BIF.

$$I_{OUT}=clip1(I_C+\Delta I_{SAO}+\Delta I_{BIF}++\Delta I_{CCSAO}) \quad (a)$$

$$I_{OUT}=clip1(I_C+\Delta I_{CCSAO}+\Delta I_{BIF}) \quad (b)$$

(2) Clipping before adding, operated with BIF. In some embodiments, the clip order can be switched.

$$I_{OUT}=clip1(I_C+\Delta I_{SAO})$$

$$I'_{OUT}=clip1(I_{OUT}+\Delta I_{BIF})$$

$$I''_{OUT}=clip1(I'_{OUT}+\Delta I_{CCSAO}) \quad (a)$$

$$I_{OUT}=clip1(I_C+\Delta I_{BIF})$$

$$I'_{OUT}=clip1(I'_{OUT}+\Delta I_{CCSAO}) \quad (b)$$

(3) Clipping after partial adding $$I_{OUT}=clip1(I_C+\Delta I_{SAO}+I_{BIF})$$

$$I'_{OUT}=clip1(I_{OUT}+\Delta I_{CCSAO}) \quad (a)$$

In some embodiments, different clipping combinations give different trade-offs between correction precision and hardware temporary buffer size (register or SRAM bit-width).

FIG. 13(a) shows SAO/BIF offsets clipping. FIG. 13(b) shows the one additional bitdepth clipping for CCSAO. FIG. 13(c) shows jointly clipping after adding SAO/BIF/CCSAO offsets to the input sample. More specifically, for example, FIG. 13(a) shows the current BIF design when it interacts with SAO. Offsets from SAO and BIF are added to the input sample, followed by performing one bitdepth clipping. However, when CCSAO is also joined in the SAO stage, two possible clipping designs can be selected: (1) adding one additional bitdepth clipping for CCSAO, and (2) one harmonized design that performs a joint clipping after adding SAO/BIF/CCSAO offsets to the input sample, as shown in FIG. 13(b) and FIG. 13(c). In some embodiments, the abovementioned clipping designs only differ in luma samples since BIF only applies on them.

Figure 14A:
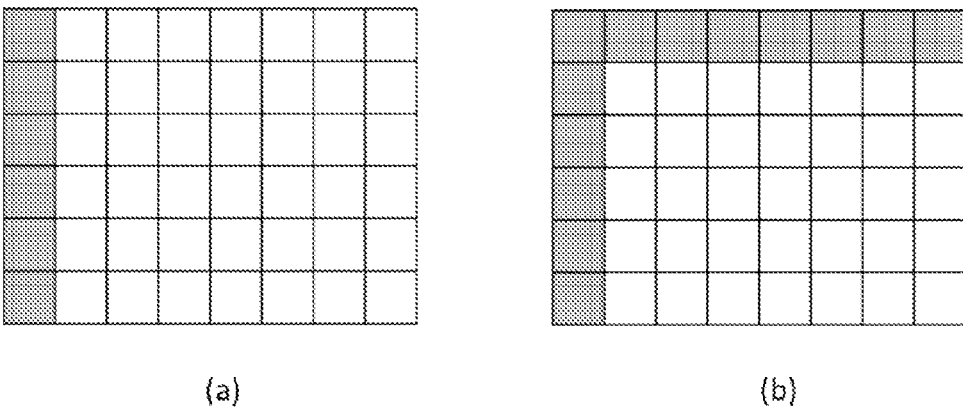
FIG. 14A is a block diagram illustrating CCSAO is not applied on the current chroma (luma) sample if any of the collocated and neighboring luma (chroma) samples used for classification is outside the current picture in accordance with some implementations of the present disclosure.

In some embodiments, a boundary processing is described below. If any of the collocated and neighboring luma (chroma) samples used for classification is outside the current picture, CCSAO is not applied on the current chroma (luma) sample. FIG. 14A is a block diagram illustrating CCSAO is not applied on the current chroma (luma) sample if any of the collocated and neighboring luma (chroma)

samples used for classification is outside the current picture in accordance with some implementations of the present disclosure. For example, in FIG. 14A(a), if a classifier is used, CCSAO is not applied on the left 1 column chroma components of the current picture. For example, if C1' is used, CCSAO is not applied on the left 1 column and the top 1 row chroma components of the current picture, as shown in FIG. 14A(b).

Figure 14B:
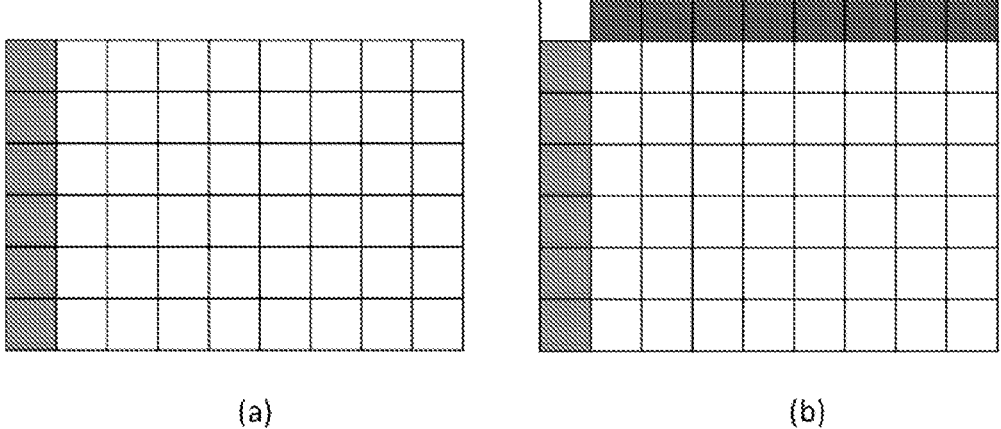
FIG. 14B is a block diagram illustrating CCSAO is applied on the current luma or chroma sample if any of the collocated and neighboring luma or chroma samples used for classification is outside the current picture in accordance with some implementations of the present disclosure.

FIG. 14B is a block diagram illustrating CCSAO is applied on the current luma or chroma sample if any of the collocated and neighboring luma or chroma samples used for classification is outside the current picture in accordance with some implementations of the present disclosure. In some embodiments, a variation is, if any of the collocated and neighboring luma or chroma samples used for classification is outside the current picture, the missed samples are used repetitively as shown in FIG. 14B(a), or the missed samples are mirror padded to create samples for classification as shown in FIG. 14B(b), and CCSAO can be applied on the current luma or chroma samples. In some embodiments, disabled/repetitive/mirror picture boundary processing method disclosed herein can also be applied on the subpicture/slice/tile/CTU/360 virtual boundary if any of the collocated and neighboring luma (chroma) samples used for classification is outside the current subpicture/slice/tile/patch/CTU/360 virtual boundary.

For example, a picture is divided into one or more tile rows and one or more tile columns. A tile is a sequence of CTUs that covers a rectangular region of a picture.

A slice consists of an integer number of complete tiles or an integer number of consecutive complete CTU rows within a tile of a picture.

A subpicture contains one or more slices that collectively cover a rectangular region of a picture.

In some embodiments, a 360-degree video is captured on a sphere and inherently has no "boundary," the reference samples that are out of the boundaries of a reference picture in the projected domain can always be obtained from neighboring samples in the spherical domain. For projection formats composed of a plurality of faces, no matter what kind of compact frame packing arrangement is used, discontinuities appear between two or more adjacent faces in the frame packed picture. In VVC, vertical and/or horizontal virtual boundaries, across which the in-loop filtering operations are disabled, are introduced and the positions of those boundaries are signalled in either SPS or Picture Header. Compared to using two tiles, one for each set of continuous faces, the use of 360 virtual boundary is more flexible as it does not require the face size to be a multiple of the CTU size. In some embodiments, the maximum number of vertical 360 virtual boundaries is 3 and the maximum number of horizontal 360 virtual boundaries is also 3. In some embodiments, The distance between two virtual boundaries is greater than or equal to the CTU size and the virtual boundary granularity is 8 luma samples, for example, an 8×8 sample grid.

Figure 14C:
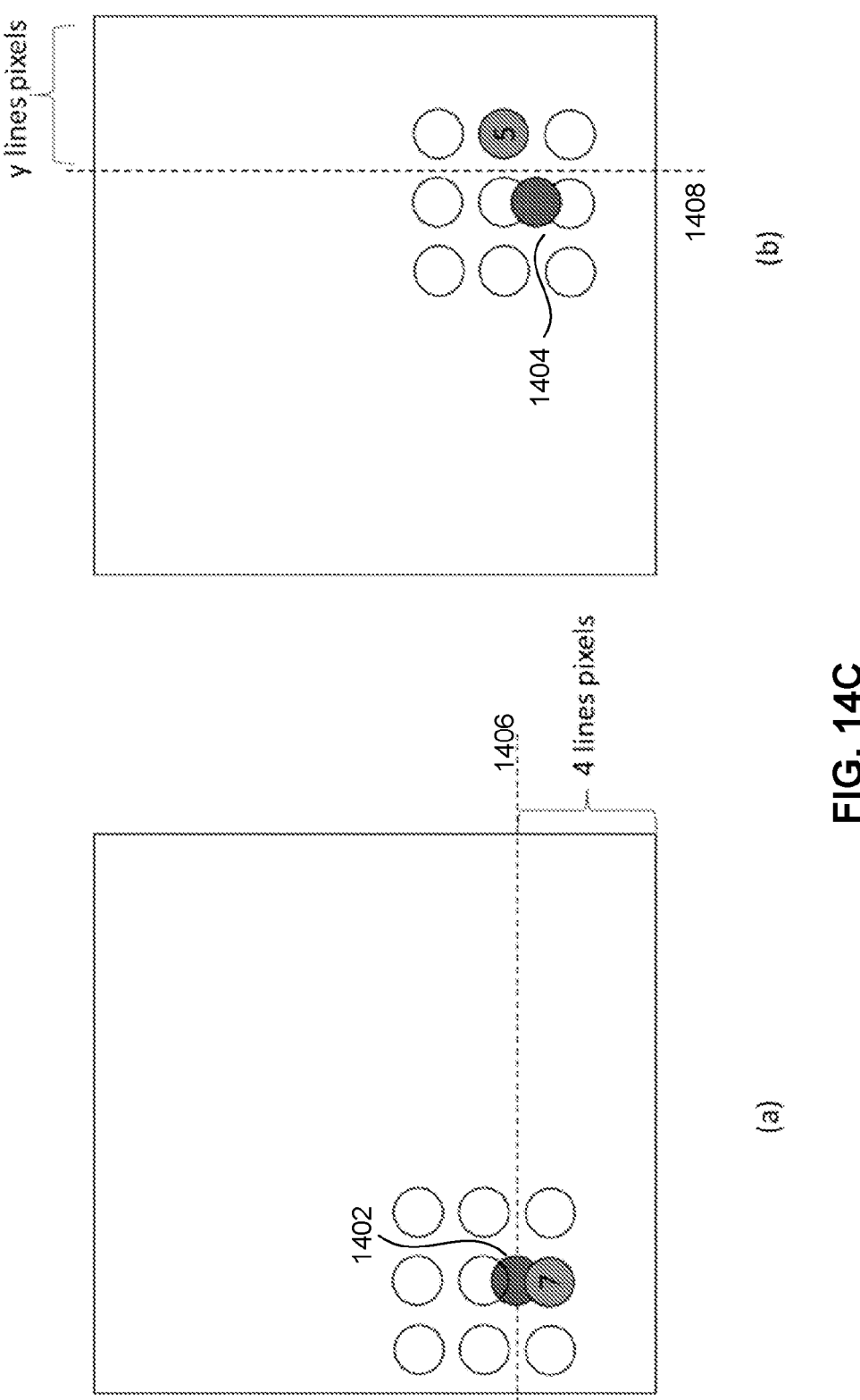
FIG. 14C is a block diagram illustrating CCSAO is not applied on the current chroma sample if a corresponding selected collocated or neighboring luma sample used for classification is outside a virtual space defined by a virtual boundary (VB) in accordance with some implementations of the present disclosure.

FIG. 14C is a block diagram illustrating CCSAO is not applied on the current chroma sample if a corresponding selected collocated or neighboring luma sample used for classification is outside a virtual space defined by a virtual boundary in accordance with some implementations of the present disclosure. In some embodiments, a virtual boundary (VB) is a virtual line that separates the space within a picture frame. In some embodiments, if a virtual boundary (VB) is applied in the current frame, CCSAO is not applied on the chroma samples that have selected corresponding luma position outside a virtual space defined by the virtual boundary. FIG. 14C shows an example with a virtual boundary for C0 classifier with 9 luma position candidates. For each CTU, CCSAO is not applied on the chroma samples for which the corresponding selected luma position is outside a virtual space surrounded by the virtual boundary. For example, in FIG. 14C(a), CCSAO is not applied to the chroma sample 1402 when the selected Y7 luma sample position is on the other side of the horizontal virtual boundary 1406 which is located 4 pixel lines from the bottom side of the frame. For example, in FIG. 14C(b), CCSAO is not applied to the chroma sample 1404 when the selected Y5 luma sample position is located on the other side of the vertical virtual boundary 1408 which is located y pixel lines from the right side of the frame.

Figure 15:
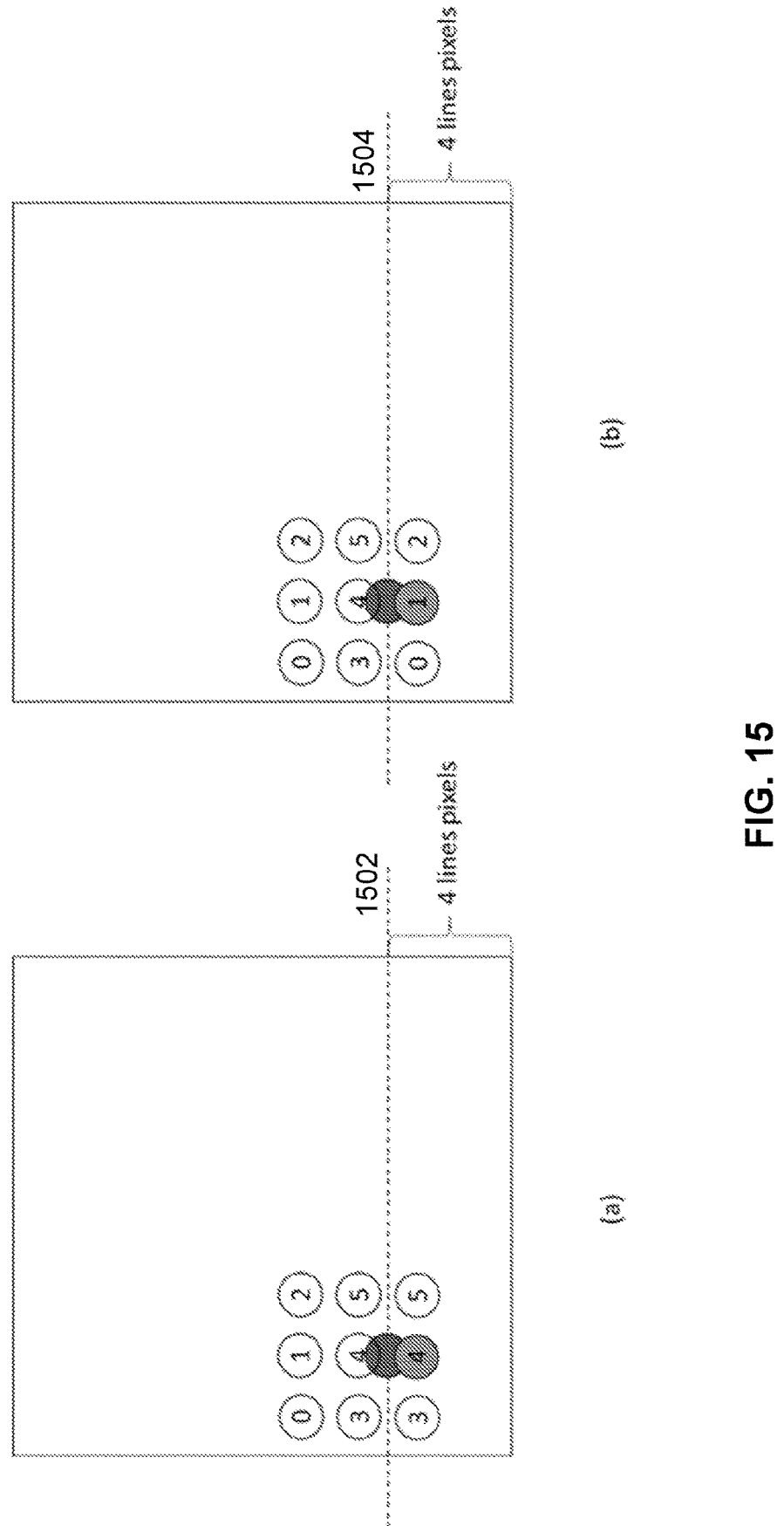
FIG. 15 shows repetitive or mirror padding is applied on the luma samples that are outside the virtual boundary in accordance with some implementations of the present disclosure.

FIG. 15 shows repetitive or mirror padding can be applied on the luma samples that are outside the virtual boundary in accordance with some implementations of the present disclosure. FIG. 15 (*a*) shows an example of repetitive padding. If the original Y7 is chosen to be the classifier which is located on the bottom side of the VB 1502, the Y4 luma sample value is used for classification (copied to the Y7 position), instead of the original Y7 luma sample value. FIG. 15 (*b*) shows an example of mirror padding. If Y7 is chosen to be the classifier which is located on the bottom side of the VB 1504, the Y1 luma sample value which is symmetric to the Y7 value relative to the Y0 luma sample is used for classification, instead of the original Y7 luma sample value. The padding methods give more chroma samples possibility to apply CCSAO so more coding gain can be achieved.

Figure 16:
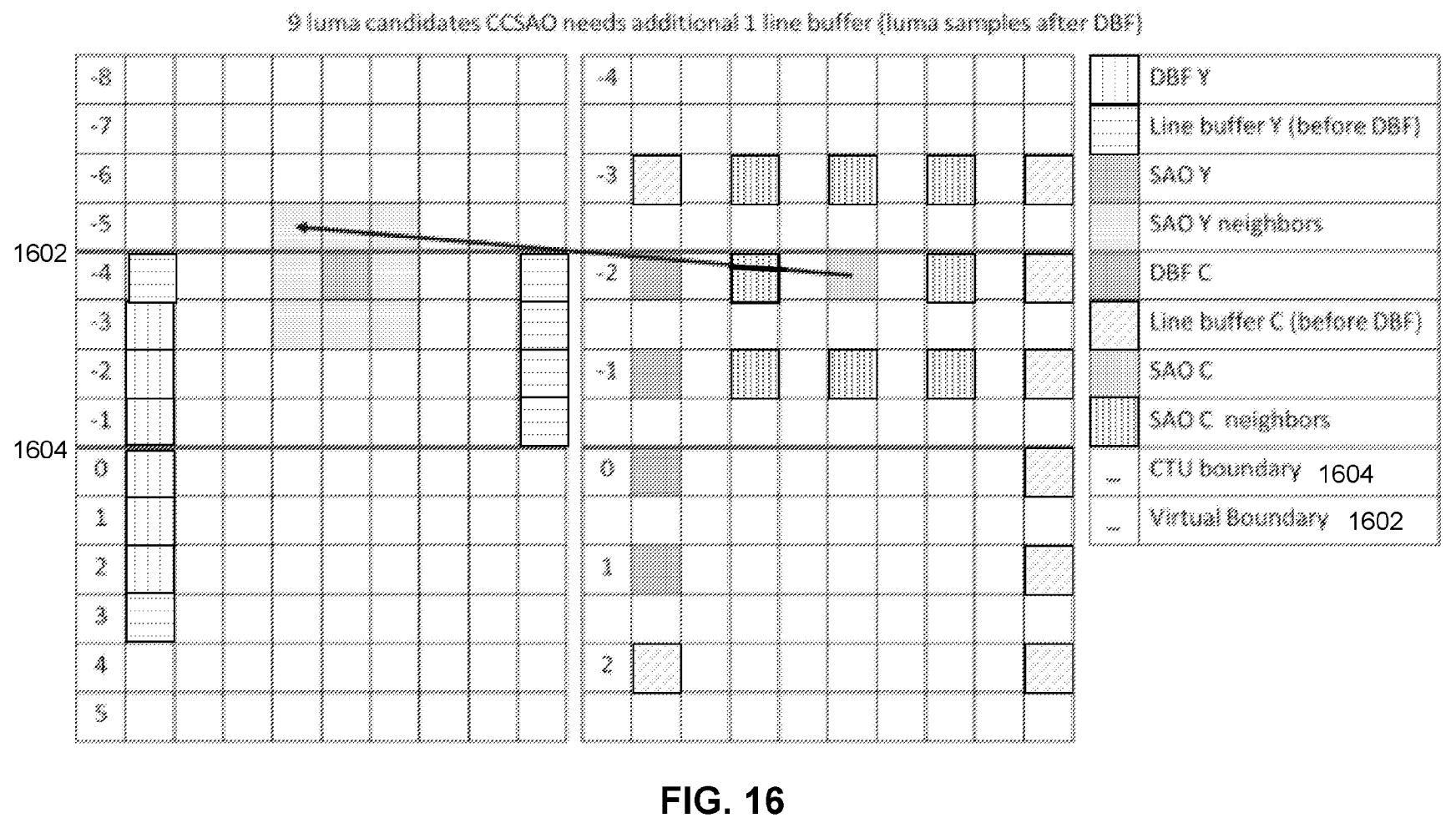

In some embodiments, a restriction can be applied to reduce the CCSAO required line buffer, and to simplify the boundary processing condition check. FIG. 16 shows additional 1 luma line buffer, i.e., the whole line luma samples of line −5 above the current VB 1602, may be required if all 9 collocated neighboring luma samples are used for classification in accordance with some implementations of the present disclosure. FIG. 10B (a) shows an example using only 6 luma candidates for classification, which reduces the line buffer and does not need any additional boundary check in FIG. 14A and FIG. 14B.

Figure 17:
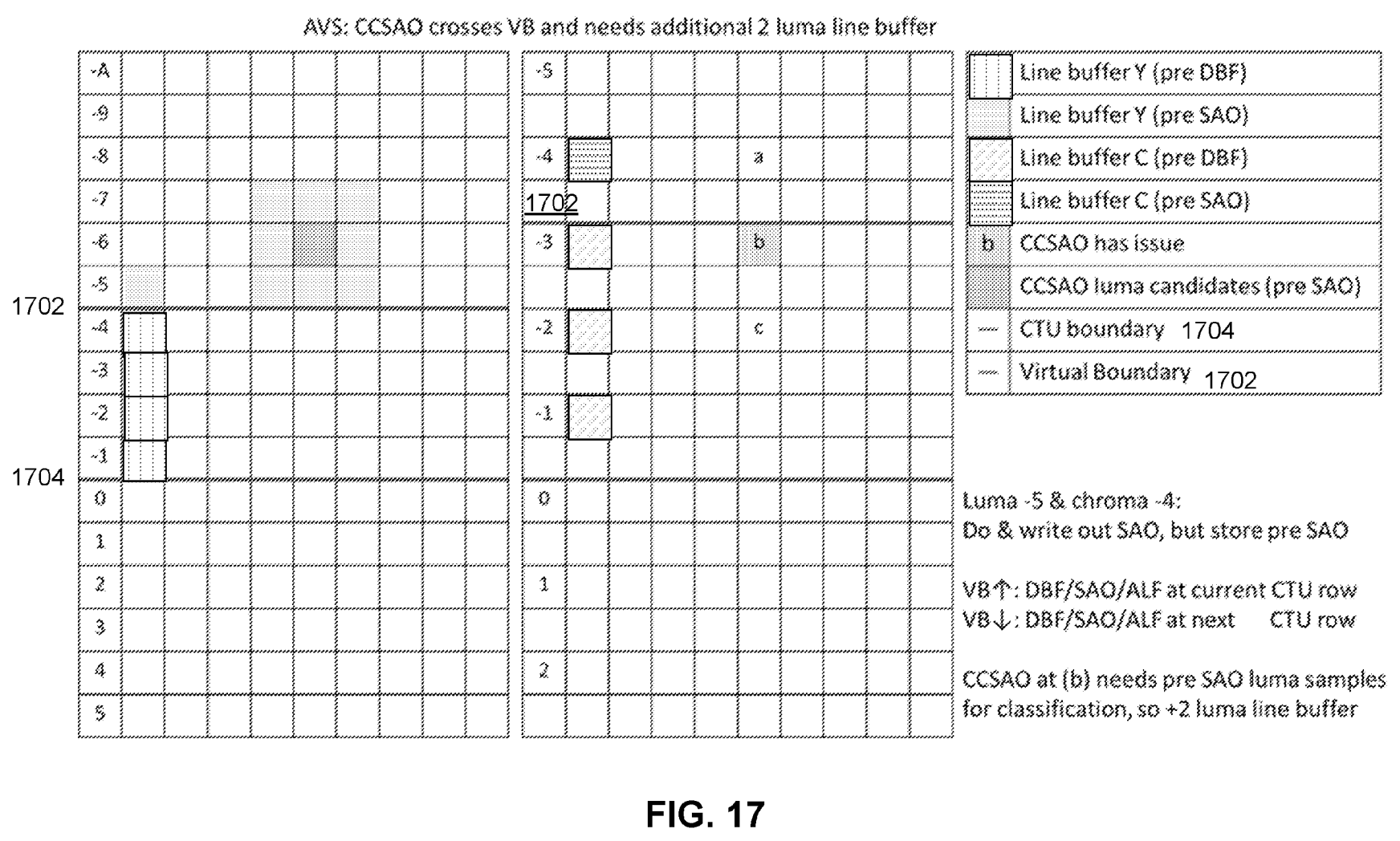

In some embodiments, using luma samples for CCSAO classification may increase the luma line buffer and hence increase the decoder hardware implementation cost. FIG. 17 shows an illustration in AVS that 9 luma candidates CCSAO crossing VB 1702 may increase 2 additional luma line buffers in accordance with some implementations of the present disclosure. For luma and chroma samples above Virtual Boundary (VB) 1702, DBF/SAO/ALF are processed at the current CTU row. For luma and chroma samples below VB 1702, DBF/SAO/ALF are processed at the next CTU row. In AVS decoder hardware design, luma line −4 to −1 pre DBF samples, line −5 pre SAO samples, and chroma line −3 to −1 pre DBF samples, line −4 pre SAO samples are stored as line buffers for next CTU row DBF/SAO/ALF processing. When processing the next CTU row, luma and chroma samples not in the line buffer are not available. However, for example, at chroma line −3 (b) position, the chroma sample is processed at the next CTU row, but CCSAO requires pre SAO luma sample lines −7, −6, and −5 for classification. Pre SAO luma sample lines −7, −6 are not in the line buffer so they are not available. And adding pre SAO luma samples line −7 and −6 to the line buffer will increase the decoder hardware implementation cost. In some examples, luma VB (line −4) and chroma VB (line −3) can be different (not aligned).

Figure 18A:
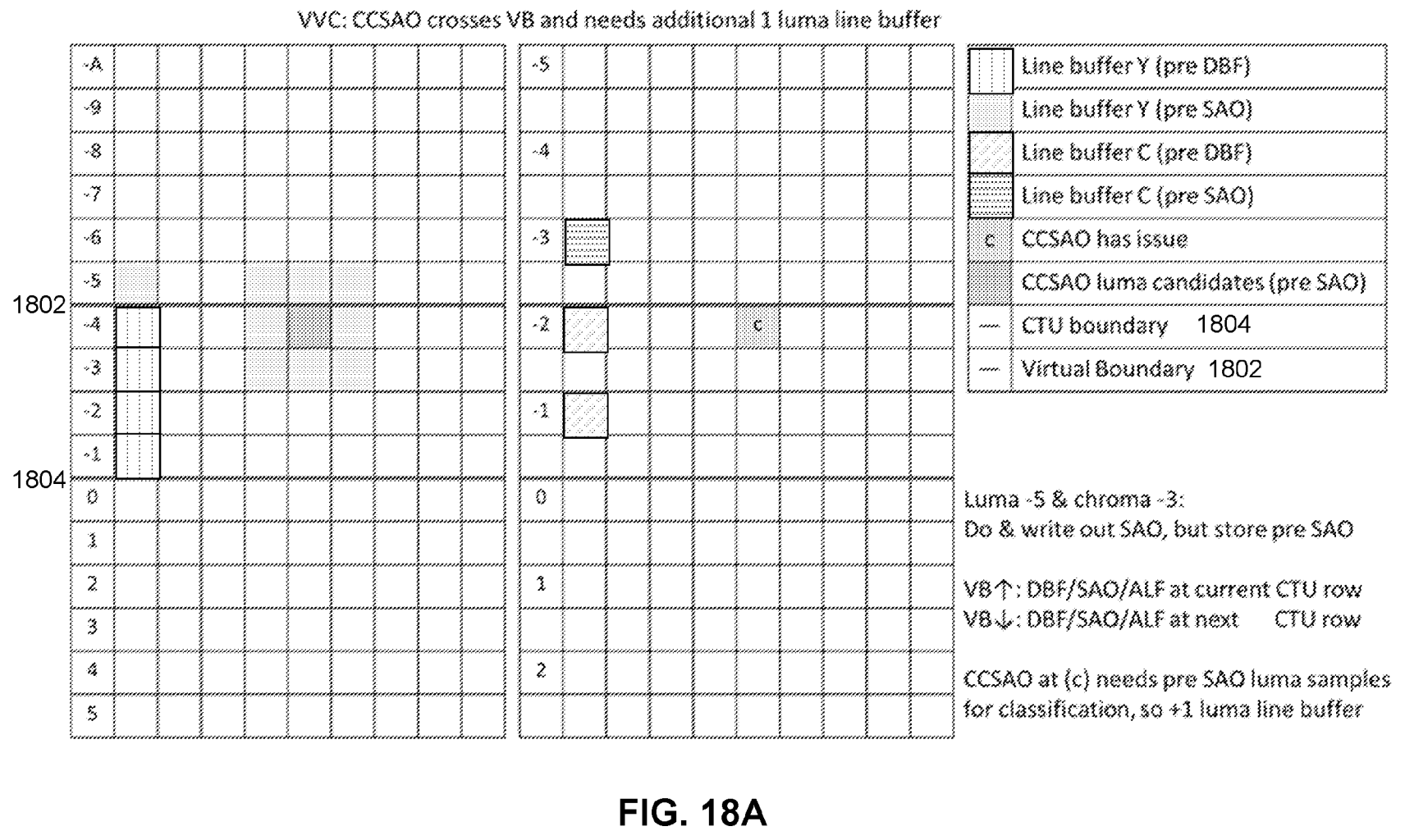

Similar as FIG. 17, FIG. 18A shows an illustration in VVC that 9 luma candidates CCSAO crossing VB 1802 may increase 1 additional luma line buffer in accordance with some implementations of the present disclosure. VB can be different in different standard. In VVC, luma VB is line −4 and chroma VB is line −2, so 9 candidate CCSAO may increase 1 luma line buffer.

Figure 19A:
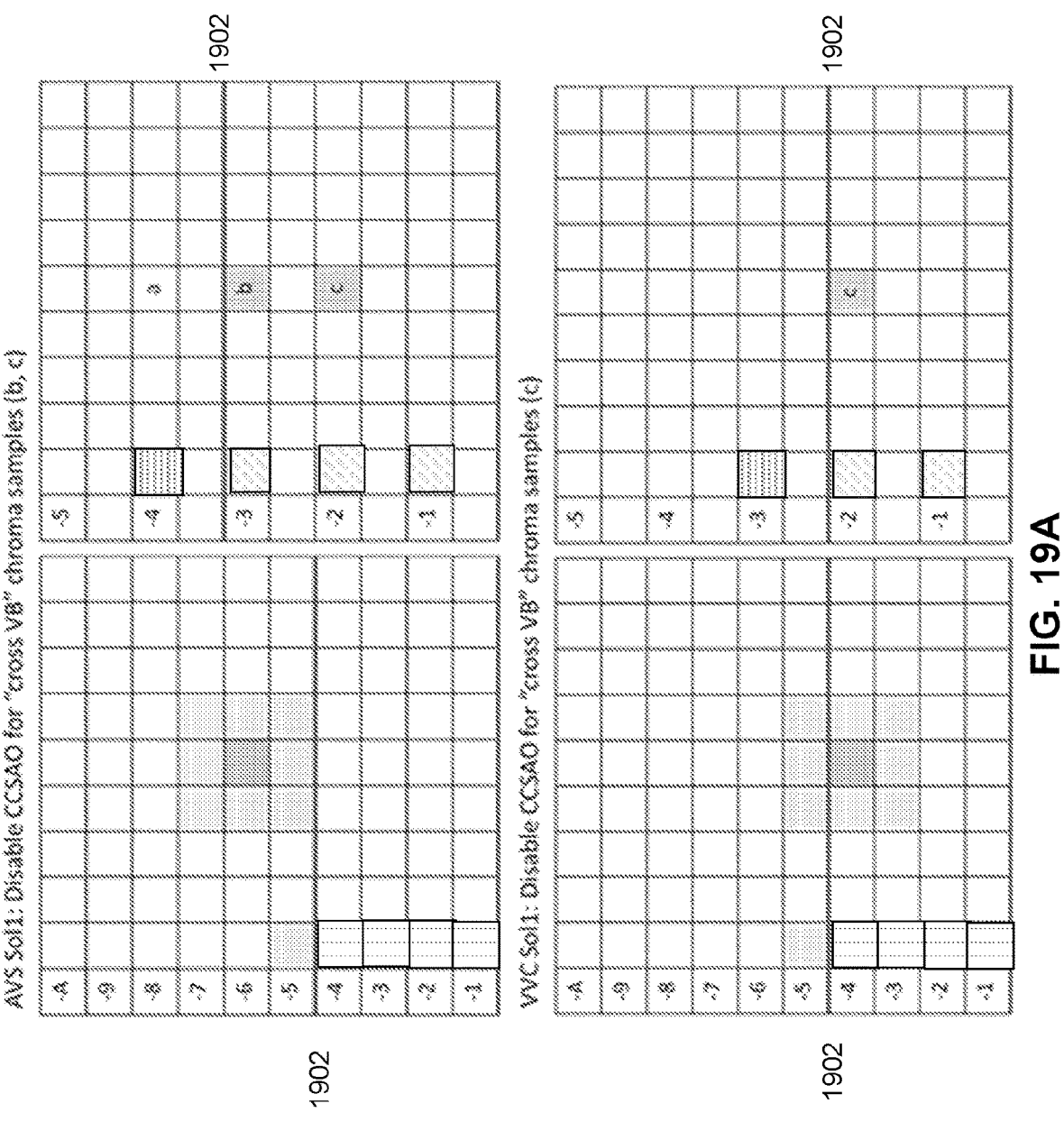
FIGS. 19A-19C show in AVS and VVC, CCSAO is disabled for a chroma sample if any of the chroma sample's luma candidates is across VB (outside the current chroma sample VB) in accordance with some implementations of the present disclosure.
Figure 19B:
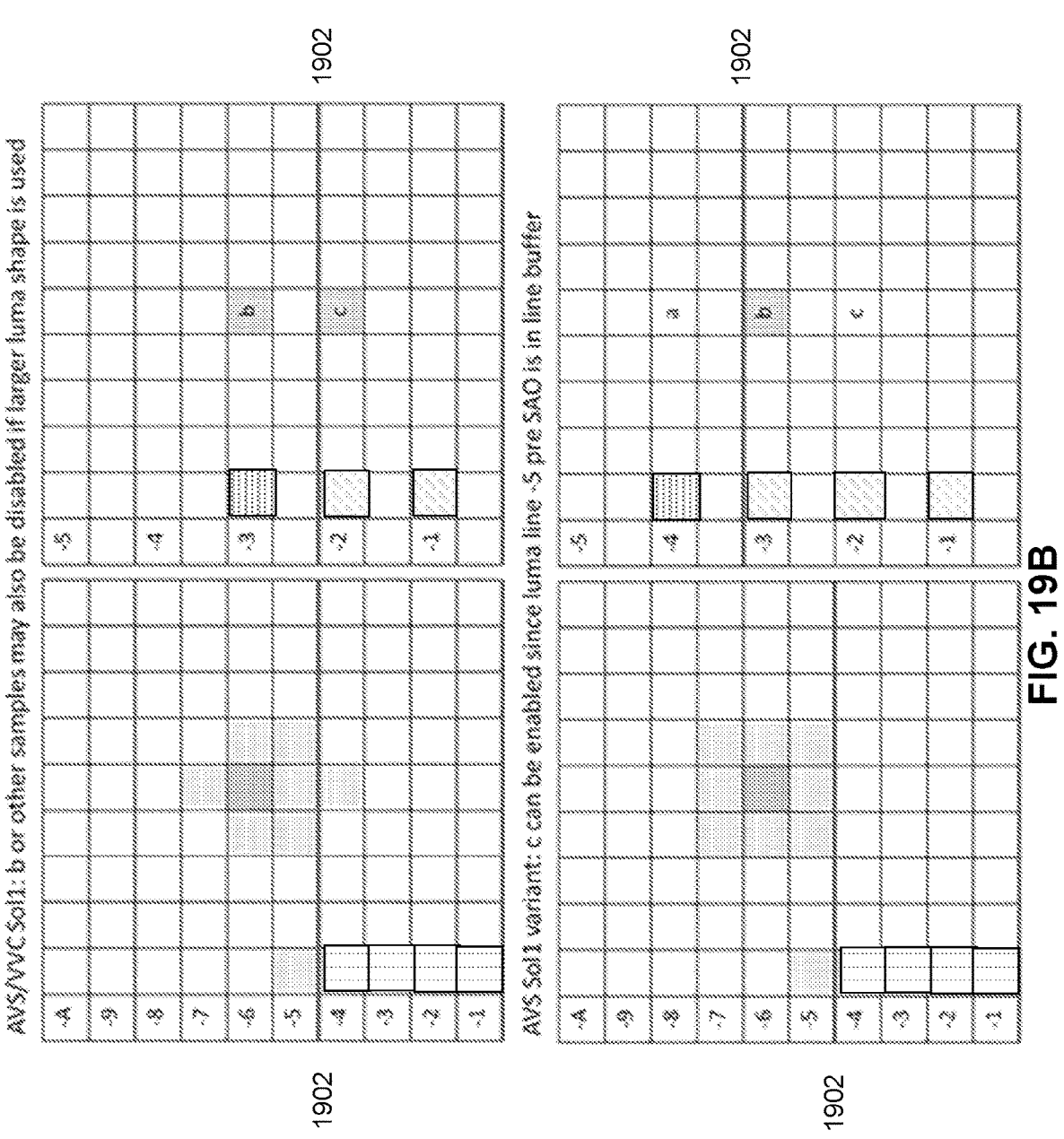
Figure 19C:
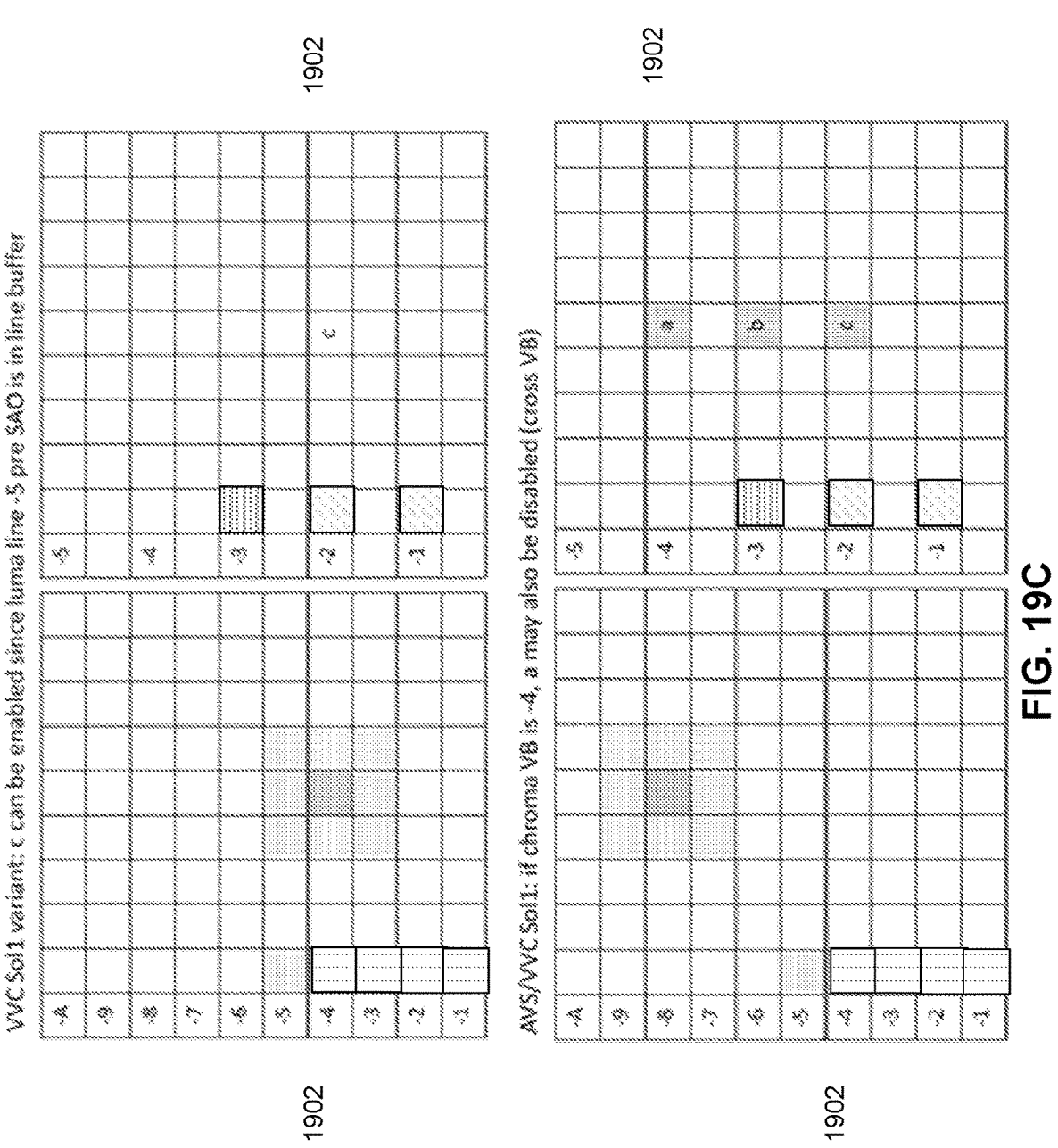

In some embodiments, in a first solution, CCSAO is disabled for a chroma sample if any of the chroma sample's luma candidates is across VB (outside the current chroma sample VB). FIGS. 19A-19C show in AVS and VVC, CCSAO is disabled for a chroma sample if any of the chroma sample's luma candidates is across VB 1902 (outside the current chroma sample VB) in accordance with some implementations of the present disclosure. FIG. 14C also shows some examples of this implementation.

Figure 20A:
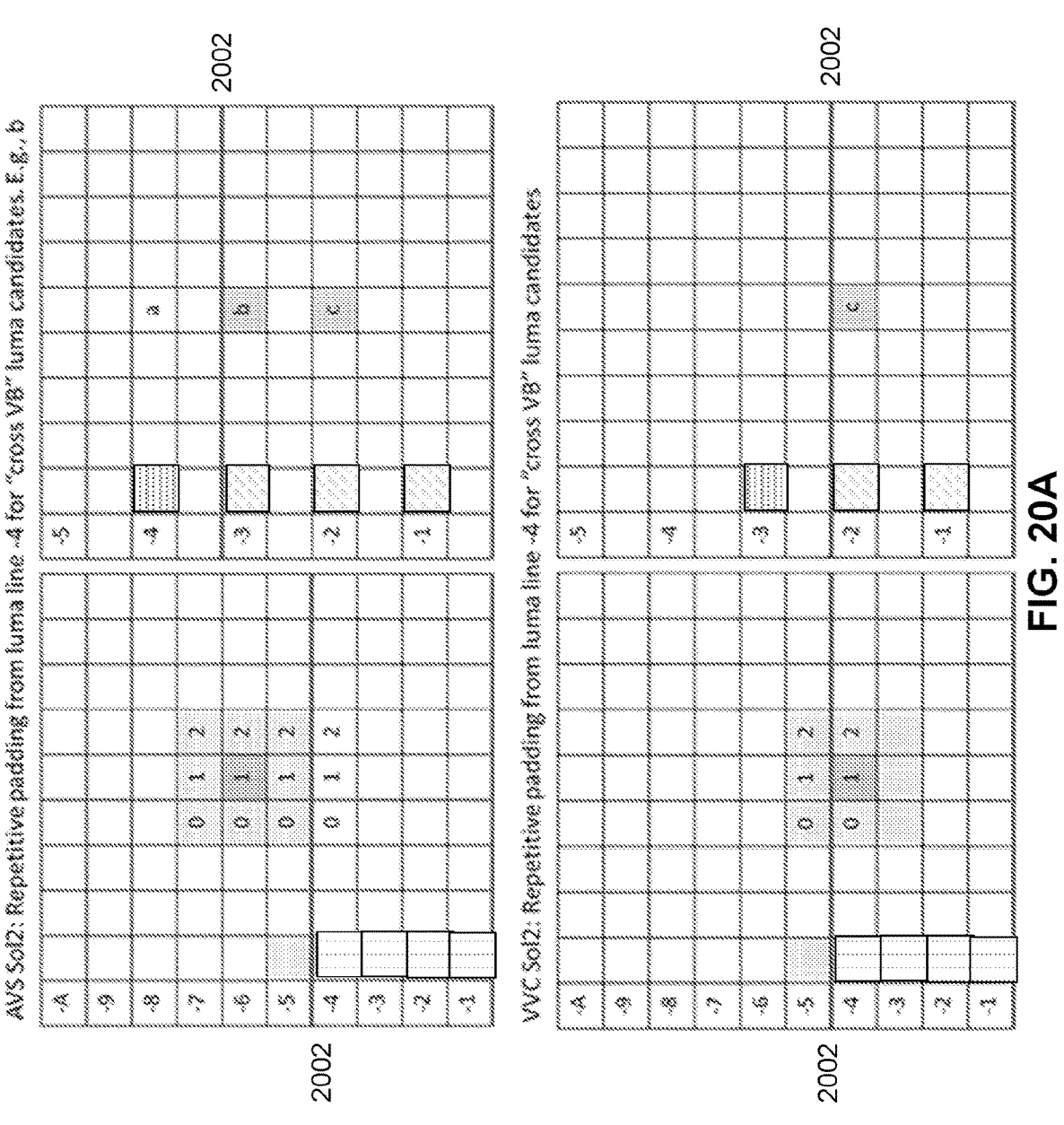
FIGS. 20A-20C show in AVS and VVC, CCSAO is enabled using repetitive padding for a chroma sample if any of the chroma sample's luma candidates is across VB (outside the current chroma sample VB) in accordance with some implementations of the present disclosure.
Figure 20B:
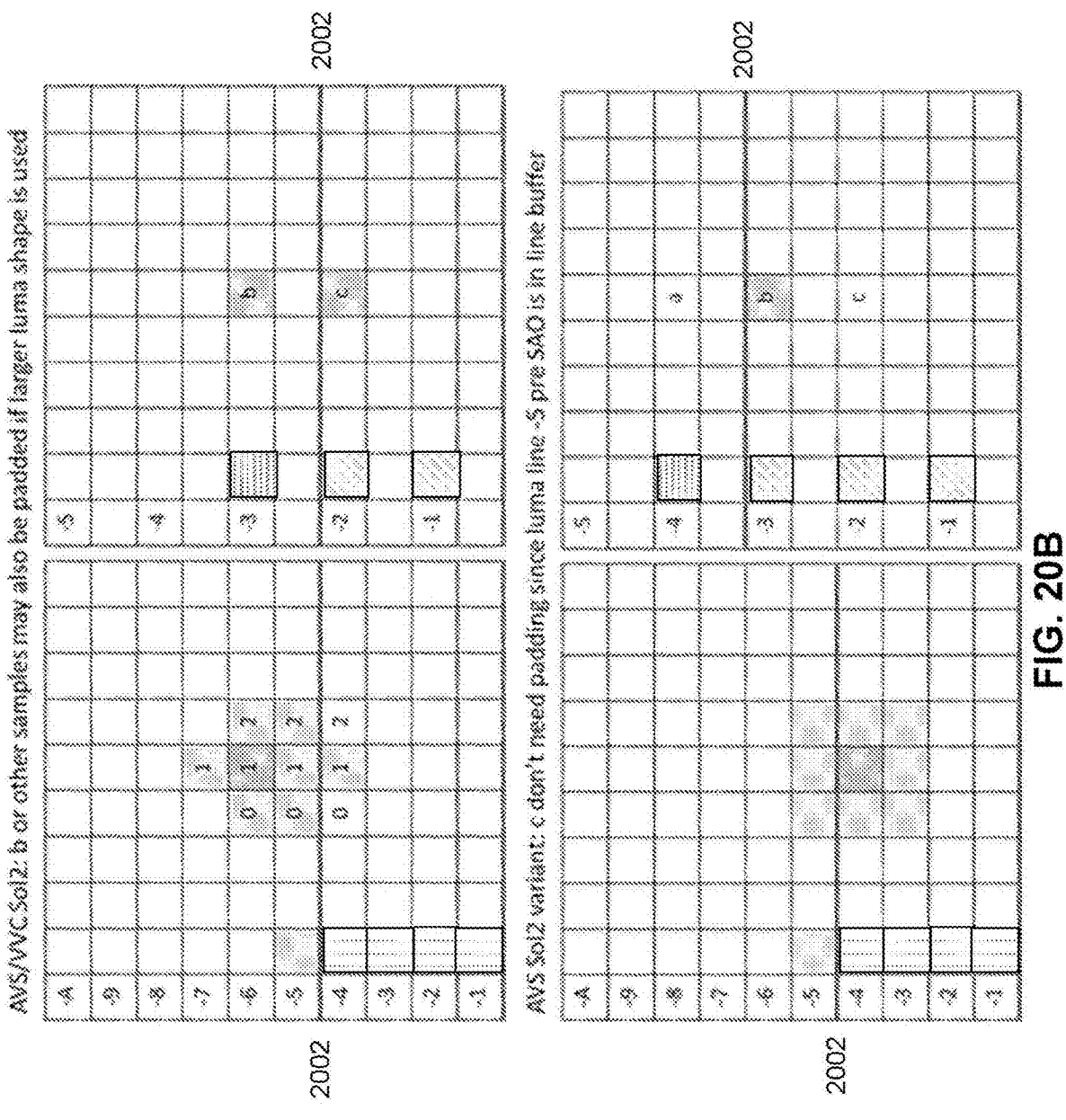
Figure 20C:
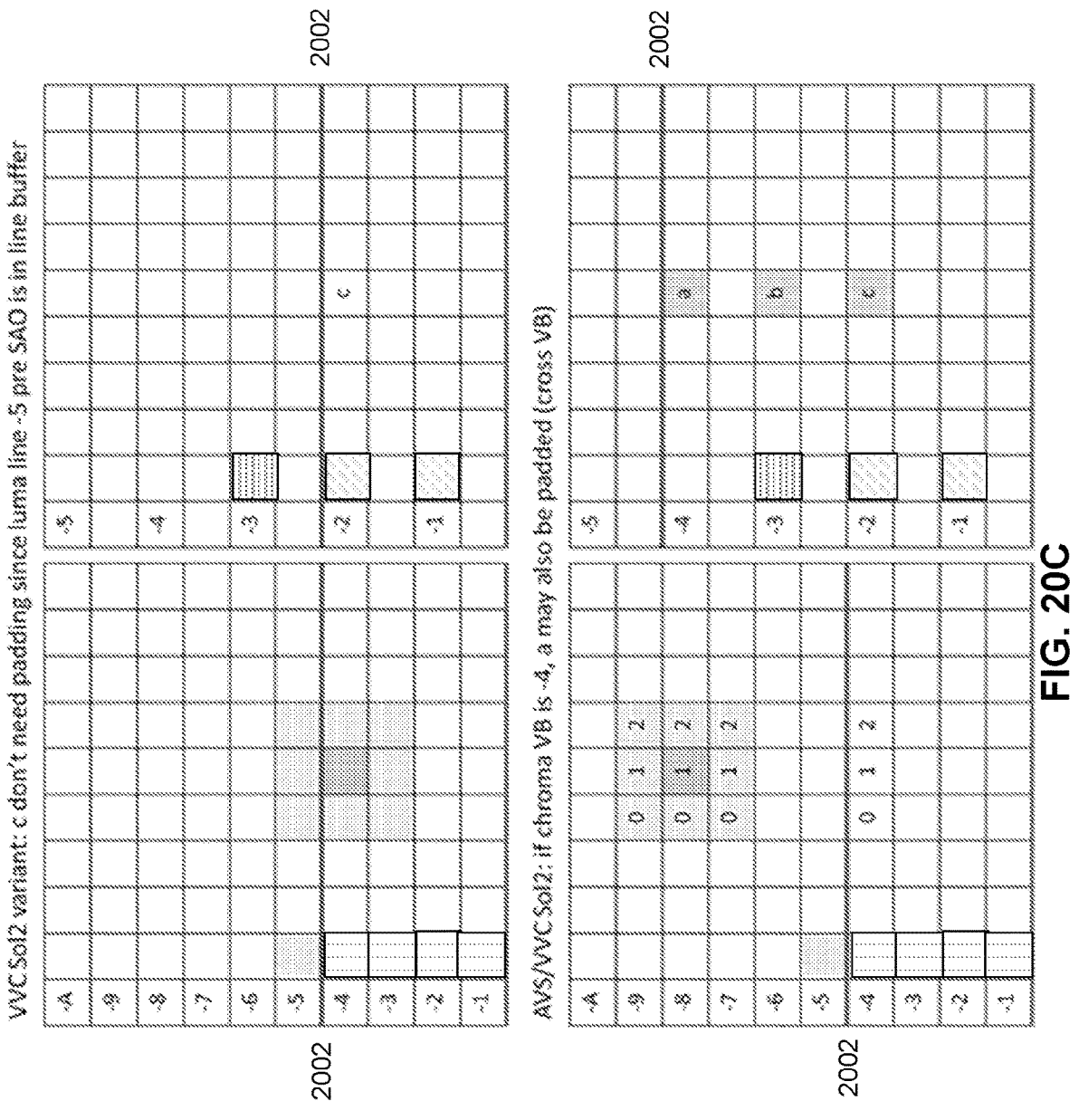

In some embodiments, in a second solution, repetitive padding is used for CCSAO from a luma line close to and on the other side of the VB, for example, the luma line −4, for "cross VB" luma candidates. In some embodiments, repetitive padding from luma nearest neighbor below VB is implemented for "cross VB" chroma candidates. FIGS. 20A-20C show in AVS and VVC, CCSAO is enabled using repetitive padding for a chroma sample if any of the chroma sample's luma candidates is across VB 2002 (outside the current chroma sample VB) in accordance with some implementations of the present disclosure. FIG. 14C (a) also shows some examples of this implementation.

Figure 21A:
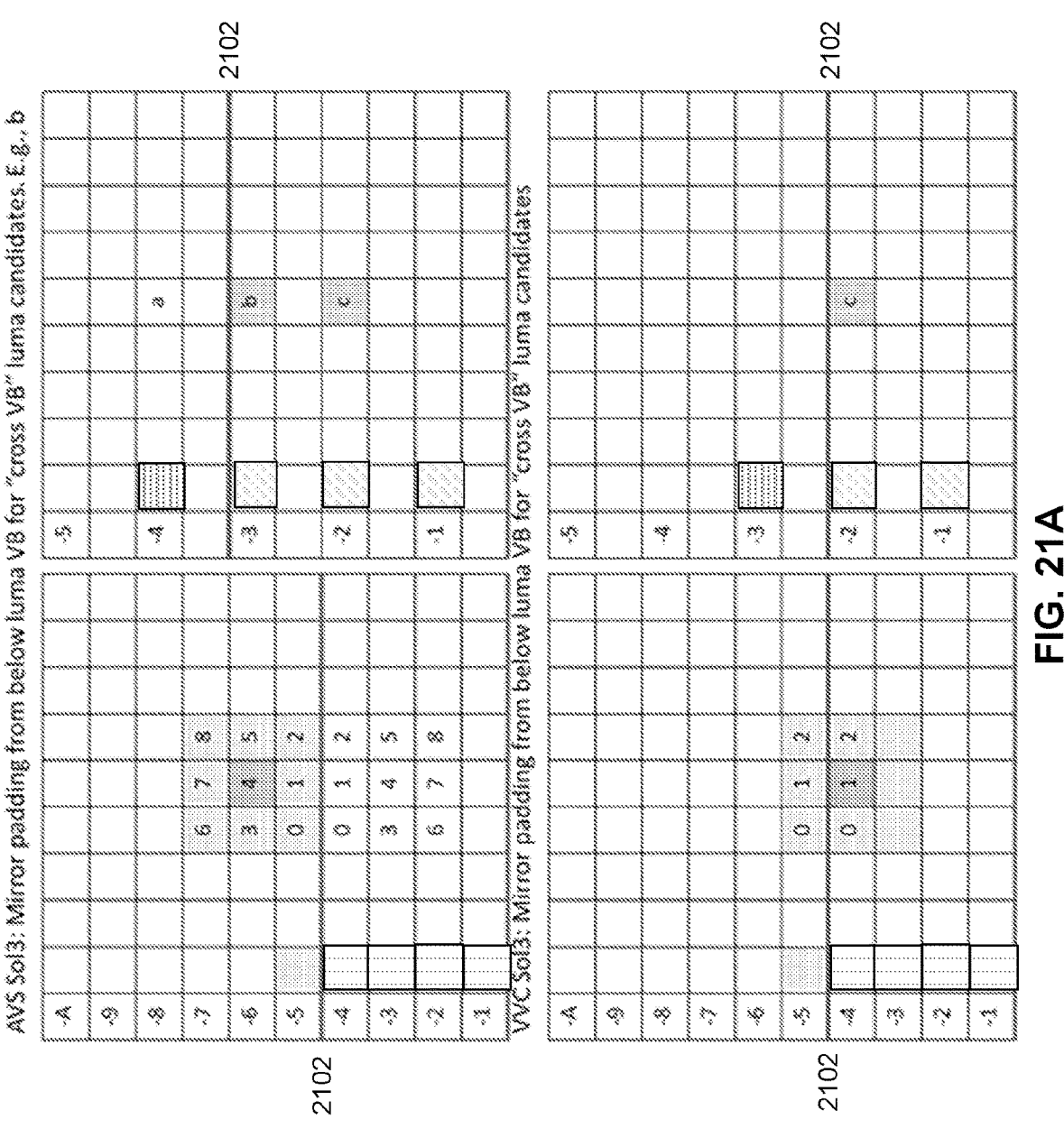
FIGS. 21A-21C show in AVS and VVC, CCSAO is enabled using mirror padding for a chroma sample if any of the chroma sample's luma candidates is across VB (outside the current chroma sample VB) in accordance with some implementations of the present disclosure.
Figure 21B:
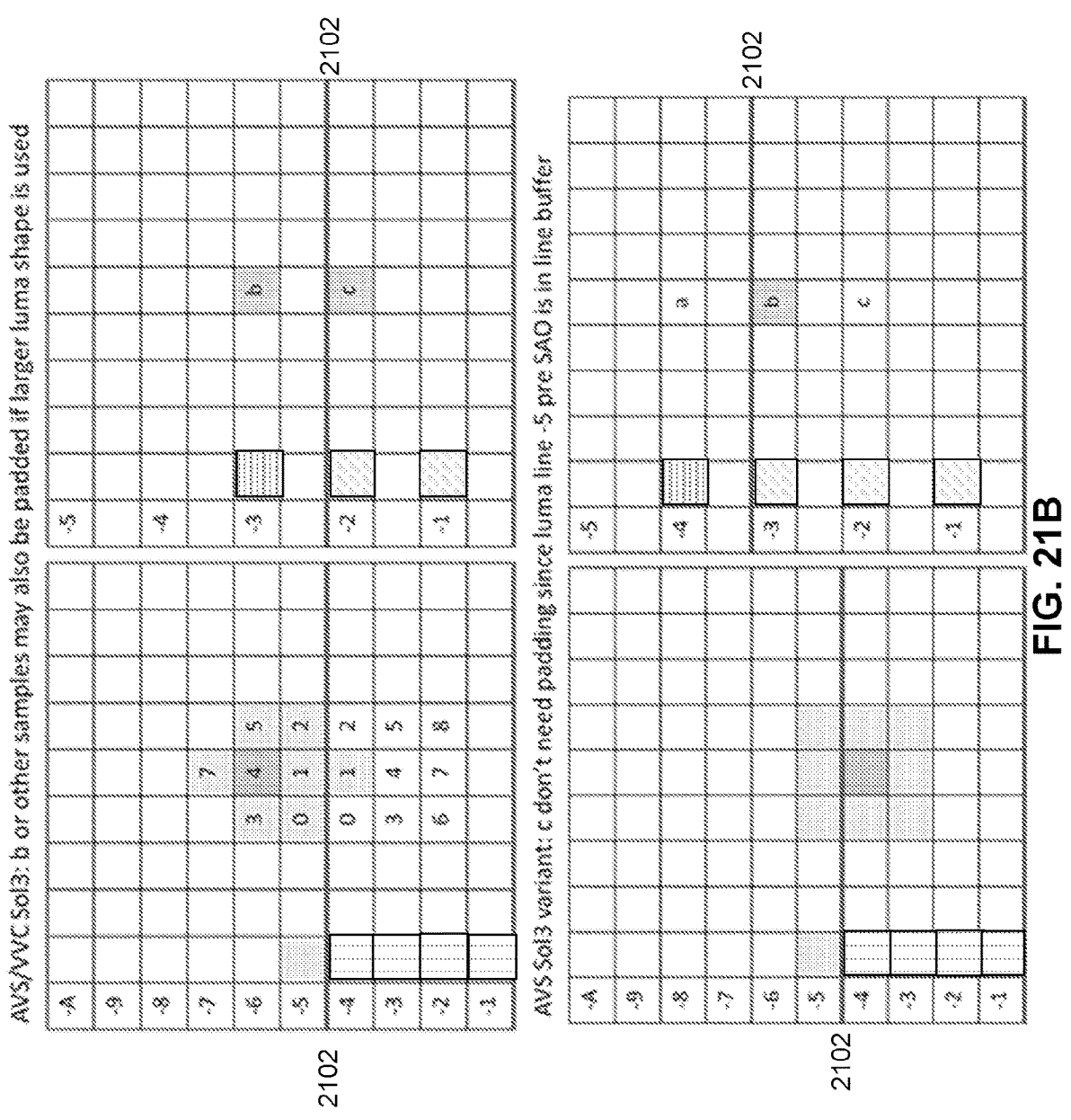
Figure 21C:
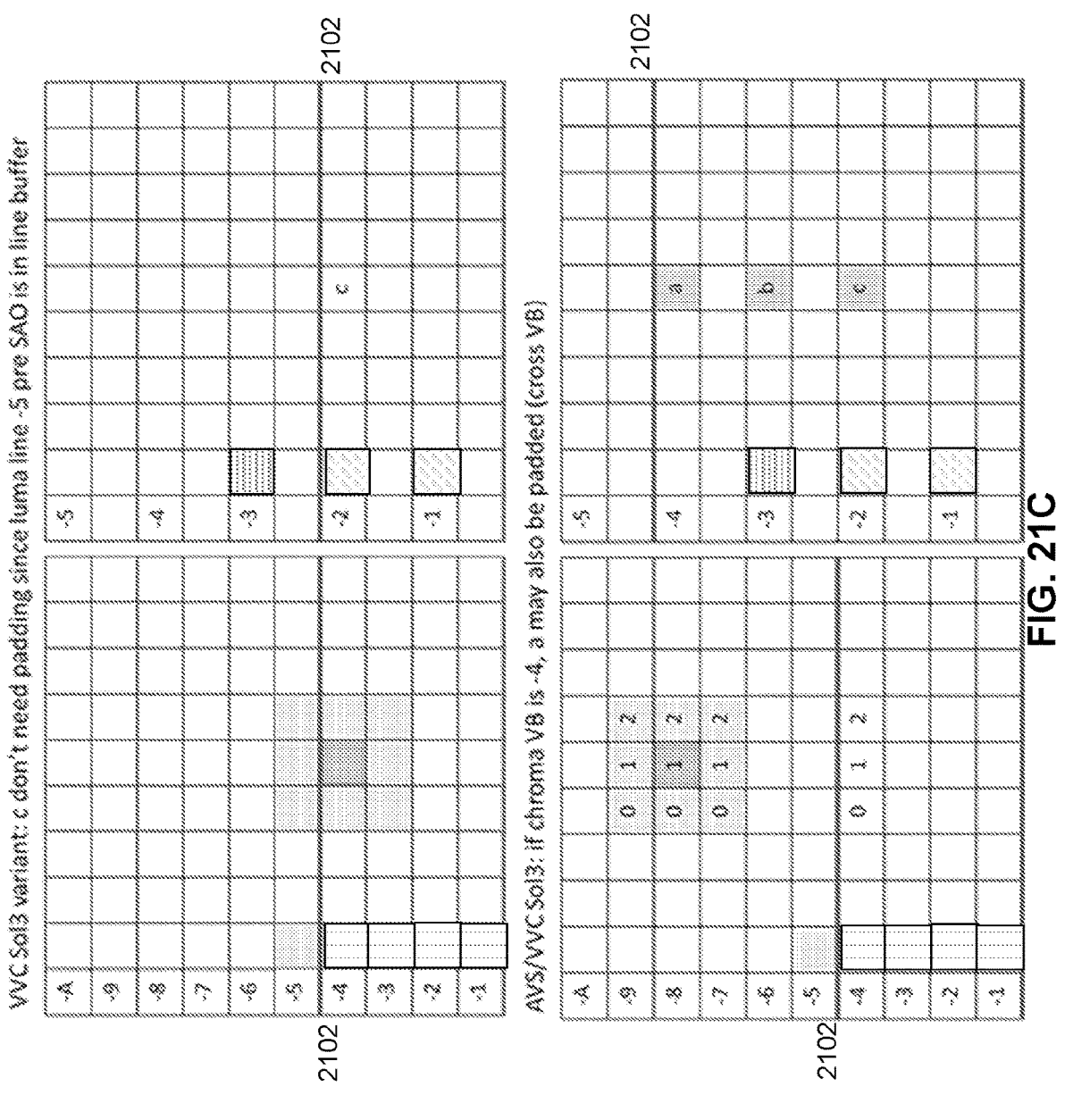
Figure 22A:
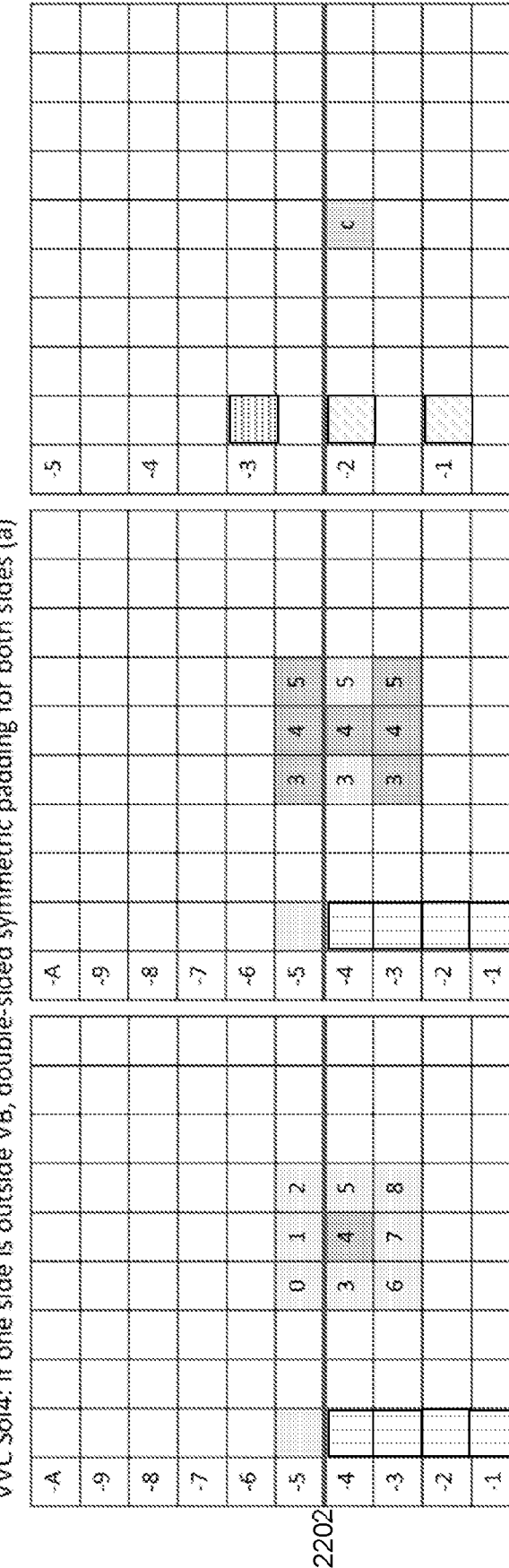
FIGS. 22A-22B show that CCSAO is enabled using double sided symmetric padding for different CCSAO sample shapes in accordance with some implementations of the present disclosure.
Figure 22B:
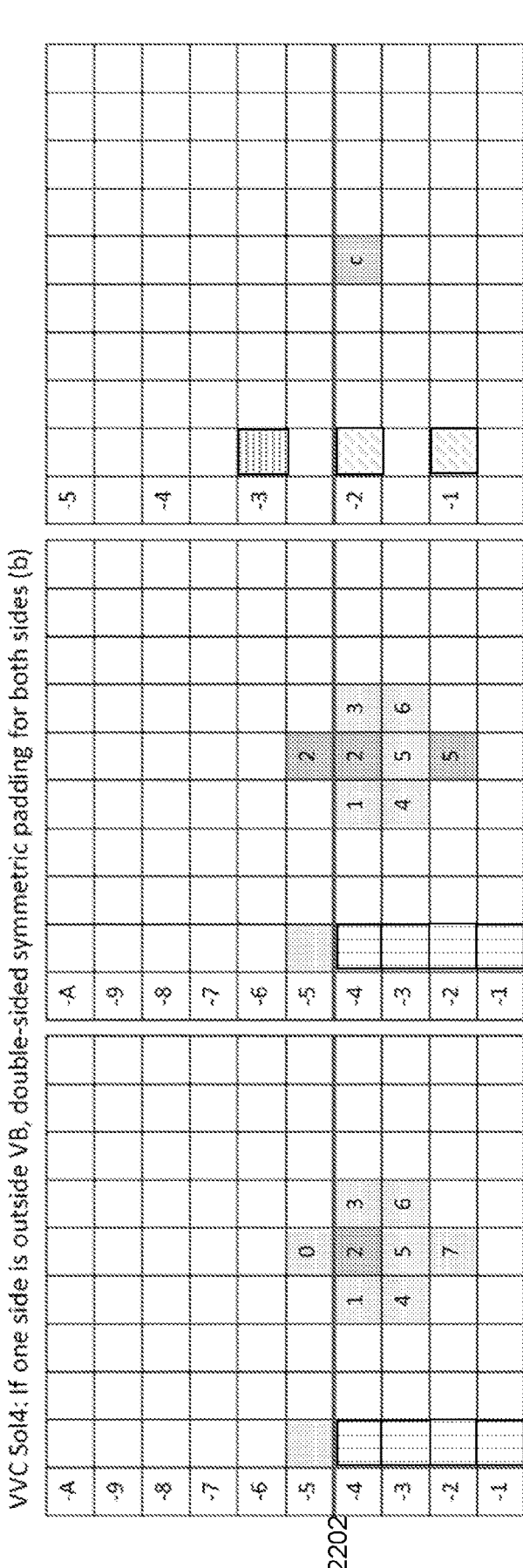

In some embodiments, in a third solution, mirror padding is used for CCSAO from below luma VB for "cross VB" luma candidates. FIGS. 21A-21C show in AVS and VVC, CCSAO is enabled using mirror padding for a chroma sample if any of the chroma sample's luma candidates is across VB 2102 (outside the current chroma sample VB) in accordance with some implementations of the present disclosure. FIGS. 14C (b) and 14B (b) also show some examples of this implementation. In some embodiments, in a fourth solution, "double sided symmetric padding" is used for applying CCSAO. FIGS. 22A-22B show that CCSAO is enabled using double sided symmetric padding for some examples of different CCSAO shapes (for example, 9 luma candidates (FIG. 22A) and 8 luma candidates (FIG. 22B)) in accordance with some implementations of the present disclosure. For a luma sample set with a collocated centered luma sample of a chroma sample, if one side of the luma sample set is outside the VB 2202, double-sided symmetric padding is applied for both sides of the luma sample set. For example, in FIG. 22A, luma samples Y0, Y1, and Y2 are outside of the VB 2202, so both Y0, Y1, Y2 and Y6, Y7, Y8 are padded using Y3, Y4, Y5. For example, in FIG. 22B, luma sample Y0 is outside of the VB 2202, so Y0 is padded using Y2, and Y7 is padded using Y5.

FIG. 18B shows an illustration when the collocated or neighboring chroma samples are used to classify the current luma samples, the selected chroma candidate may be across VB and need additional chroma line buffer in accordance with some implementations of the present disclosure. Similar solutions 1 to 4 as described above can be applied to handle the issue.

Solution 1 is to disable CCSAO for a luma sample when any of its chroma candidates may across VB.

Solution 2 is to use repetitive padding from chroma nearest neighbor below VB for "cross VB" chroma candidates.

Solution 3 is to use mirror padding from below chroma VB for "cross VB" chroma candidates.

Solution 4 is to use "double sided symmetric padding". For a candidate set centered at CCSAO collocated chroma sample, if one side of the candidate set is outside VB, double-sided symmetric padding is applied for both sides.

The padding methods give more luma or chroma samples possibility to apply CCSAO so more coding gain can be achieved.

In some embodiments, at the bottom picture (or slice, tile, brick) boundary CTU row, the samples below VB are processed at the current CTU row, so the above special handling (Solution 1, 2, 3, 4) is not applied at the bottom picture (or slice, tile, brick) boundary CTU row. For example, a frame of 1920×1080 is divided by CTUs of 128×128. A frame contains 15×9 CTUs (round up). The bottom CTU row is the 15th CTU row. The decoding process is CTU row by CTU row, and CTU by CTU for each CTU row. Deblocking needs to be applied along horizontal CTU boundaries between the current and next CTU row. CTB VB is applied for each CTU row since inside one CTU, at the bottom 4/2 luma/chroma line, DBF samples (VVC case) are processed at the next CTU row and are not available for CCSAO at the current CTU row. However, at the bottom CTU row of the picture frame, the bottom 4/2 luma/chroma line DBF samples are available at the current CTU row since there is no next CTU row left and they are DBF processed at the current CTU row.

In some embodiments, the VB displayed in FIGS. 13 to 22 can be replaced by a boundary of subpicture/slice/tile/patch/CTU/360 virtual boundary. In some embodiments, the positions of the chroma and luma samples in FIGS. 13 to 22 can be switched. In some embodiments, the positions of the chroma and luma samples in FIGS. 13 to 22 can be replaced by positions of a first chroma sample and a second chroma sample. In some embodiments, an ALF VB inside CTU may be commonly horizontal. In some embodiments, a boundary of subpicture/slice/tile/patch/CTU/360 virtual boundary may be horizontal or vertical.

In some embodiments, a restriction can be applied to reduce the CCSAO required line buffer, and to simplify boundary processing condition check as explained in FIG. 16. FIG. 23 shows the restrictions of using a limited number of luma candidates for classification in accordance with some implementations of the present disclosure. FIG. 23 (a) shows the restriction of using only 6 luma candidates for classification. FIG. 23 (b) shows the restriction of using only 4 luma candidates for classification.

In some embodiments, applied region is implemented. The CCSAO applied region unit can be CTB based. That is, the on/off control, CCSAO parameters (offsets, luma candidate positions, band_num, bitmask . . . etc. used for classification, offset set index) are the same in one CTB.

Figure 24:
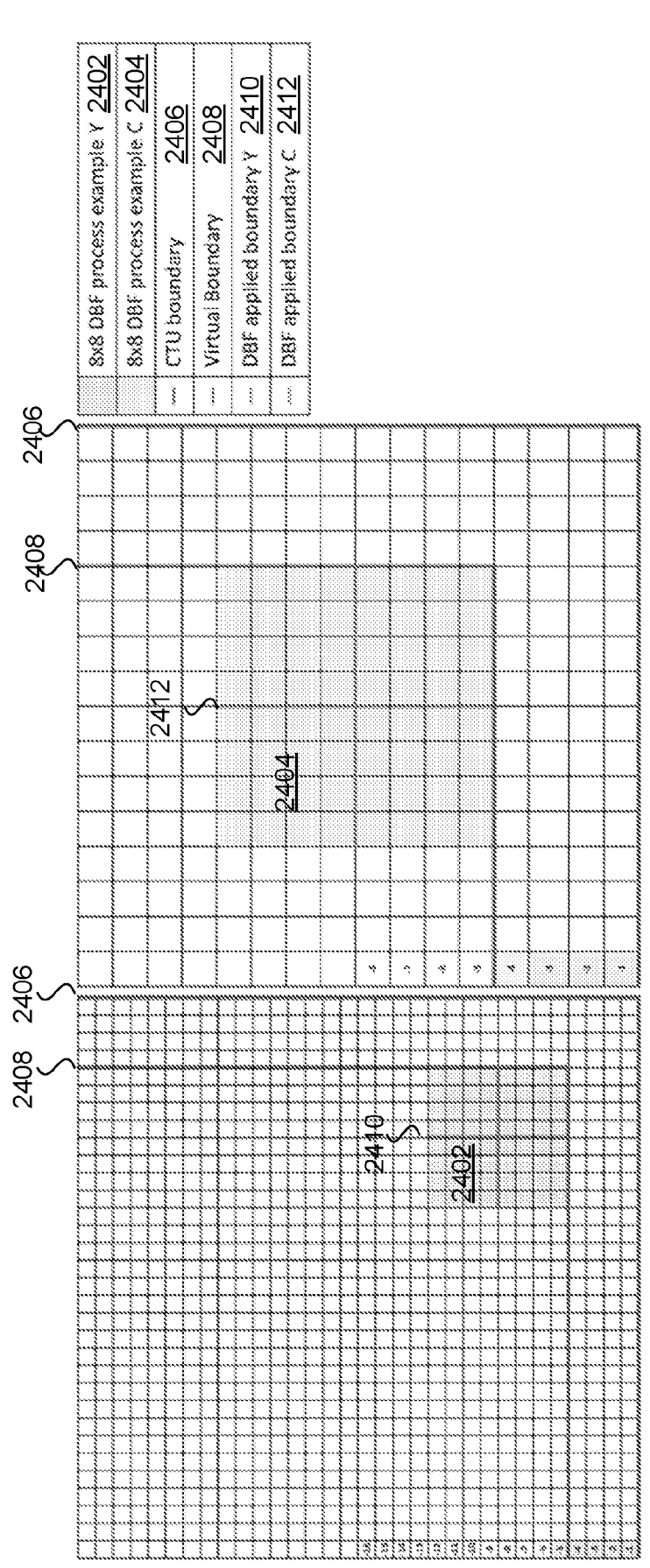
FIG. 24 shows the CCSAO applied region is not aligned to the coding tree block (CTB)/coding tree unit (CTU) boundary in accordance with some implementations of the present disclosure.

In some embodiments, the applied region can be not aligned to the CTB boundary. For example, the applied region is not aligned to chroma CTB boundary but shifted. The syntaxes (on/off control, CCSAO parameters) are still signaled for each CTB, but the truly applied region is not aligned to the CTB boundary. FIG. 24 shows the CCSAO applied region is not aligned to the CTB/CTU boundary 2406 in accordance with some implementations of the present disclosure. For example, the applied region is not aligned to chroma CTB/CTU boundary 2406 but top-left shifted (4, 4) samples to VB 2408. This not-aligned CTB boundary design benefits the deblocking process since the same deblocking parameters are used for each 8×8 deblocking process region.

In some embodiments, the CCSAO applied region unit (mask size) can be variant (larger or smaller than CTB size) as shown in Table 24. The mask size can be different for different components. The mask size can be switched in SPS/APS/PPS/PH/SH/Region/CTU/CU/Subblock/Sample levels. For example, in PH, a series of mask on/off flags and offset set indices are signaled to indicate each CCSAO region information.

TABLE 24

| CCSAO applied region unit (mask size) can be variant | | | |
| --- | --- | --- | --- |
| POC | Component | CTB size | Mask size |
| 0 | Cb | 64 × 64 | 128 × 128 |
| 0 | Cr | 64 × 64 | 32 × 32 |
| 1 | Cb | 64 × 64 | 16 × 16 |
| 1 | Cr | 64 × 64 | 256 × 256 |

Figure 25:
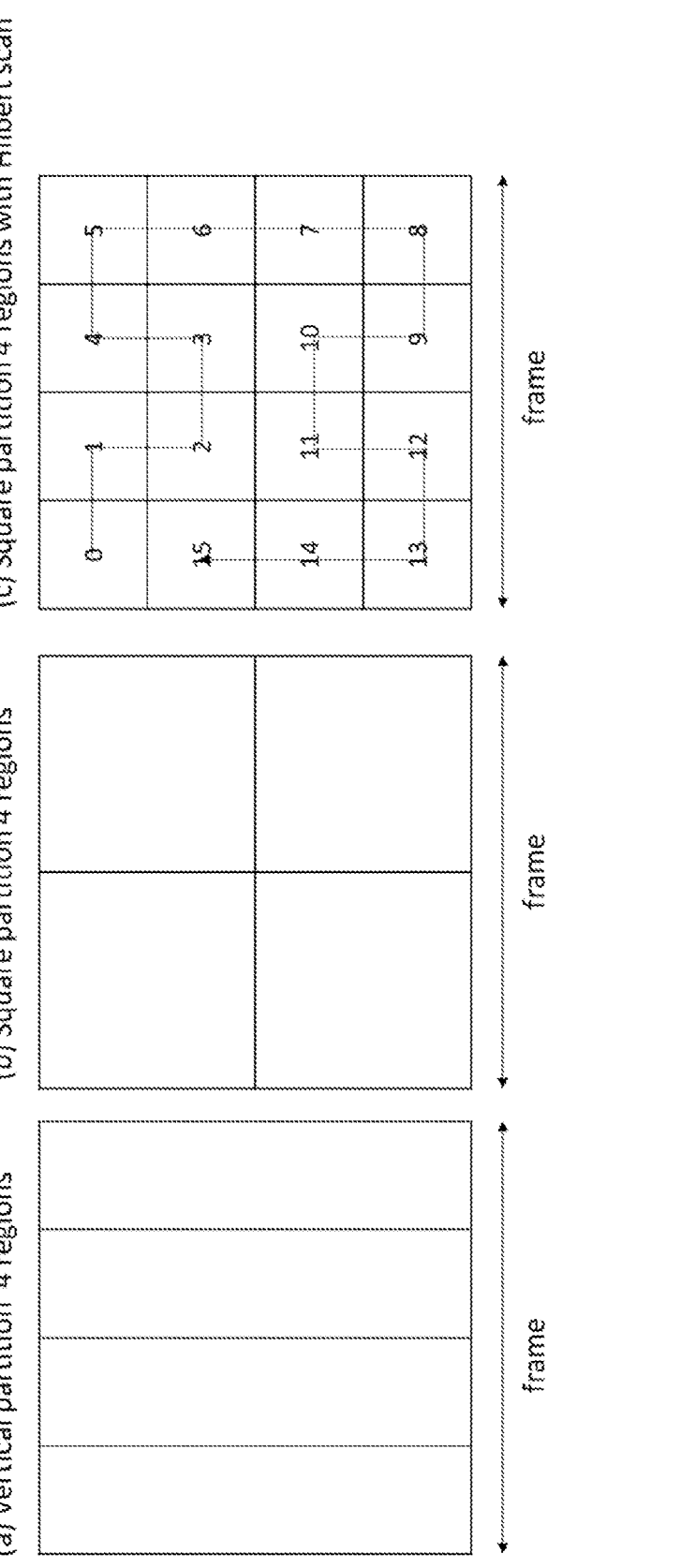
FIG. 25 shows that the CCSAO applied region frame partition can be fixed with CCSAO parameters in accordance with some implementations of the present disclosure.

In some embodiments, the CCSAO applied region frame partition can be fixed. For example, partition the frame into N regions. FIG. 25 shows that the CCSAO applied region frame partition can be fixed with CCSAO parameters in accordance with some implementations of the present disclosure.

In some embodiments, each region can have its own region on/off control flag and CCSAO parameters. Also, if the region size is larger than CTB size, it can have both CTB on/off control flags and region on/off control flag. FIGS. 25 (a) and (b) show some examples of partitioning the frame into N regions. FIG. 25 (a) shows vertical partitioning of 4 regions. FIG. 25 (b) shows square partitioning of 4 regions. In some embodiments, similar to picture level CTB all on control flag (ph_cc_sao_cb_ctb_control_flag/ ph_cc_sao_cr_ctb_control_flag), if the region on/off control flag is off, CTB on/off flags can be further signaled. Otherwise CCSAO is applied for all CTBs in this region without further signaling CTB flags.

In some embodiments, different CCSAO applied region can share the same region on/off control and CCSAO parameters. For example, in FIG. 25 (c), region 0-2 shares the same parameters and region 3~15 shares the same parameters. FIG. 25 (c) also shows the region on/off control flag and CCSAO parameters can be signaled in a Hilbert scan order.

Figure 26:
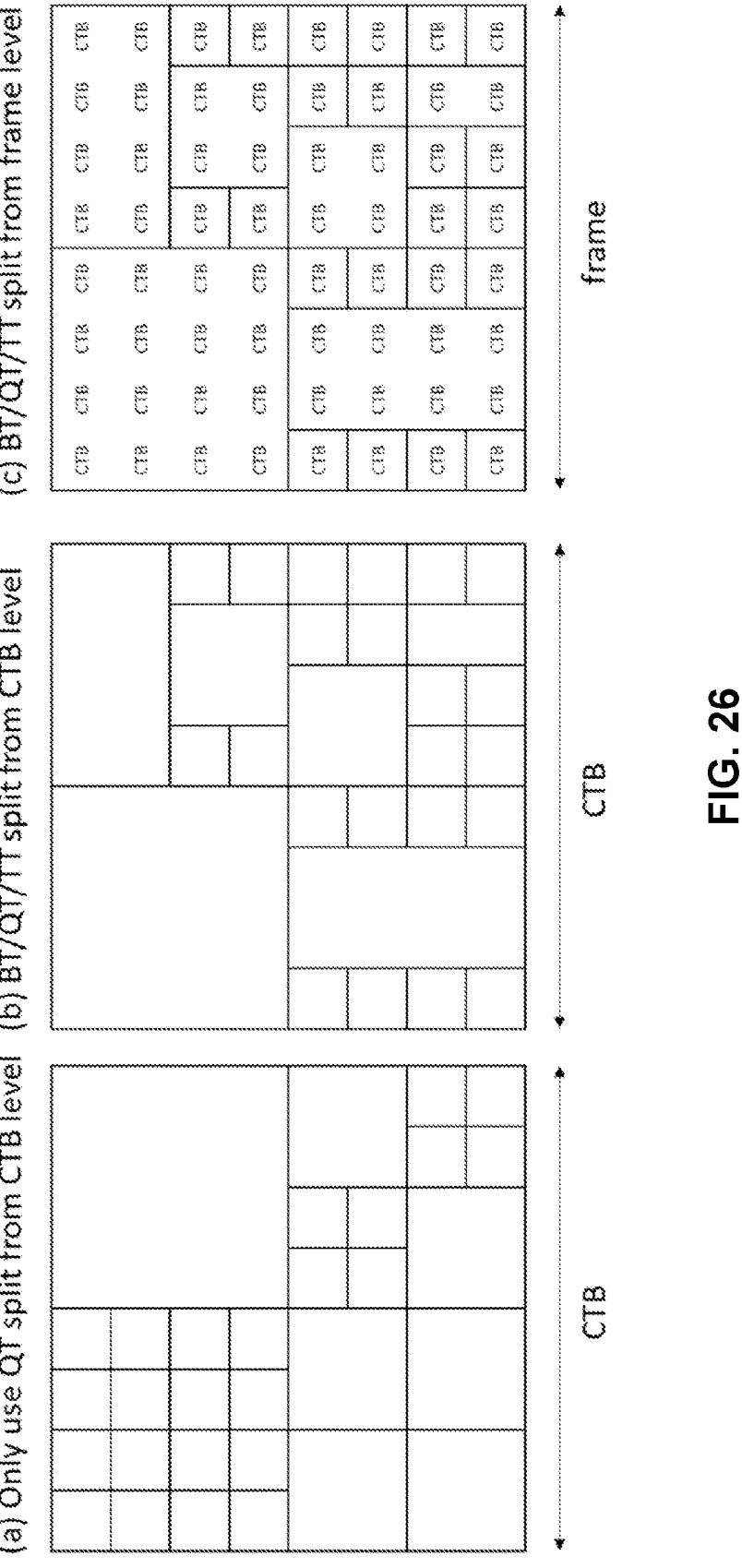
FIG. 26 shows that the CCSAO applied region can be Binary-tree (BT)/Quad-tree (QT)/Ternary-tree (TT) split from frame/slice/CTB level in accordance with some implementations of the present disclosure.

In some embodiments, the CCSAO applied region unit can be quad-tree/binary-tree/ternary-tree split from picture/ slice/CTB level. Similar to the CTB split, a series of split flags are signaled to indicate the CCSAO applied region partition. FIG. 26 shows that the CCSAO applied region can be Binary-tree (BT)/Quad-tree (QT)/Ternary-tree (TT) split from frame/slice/CTB level in accordance with some implementations of the present disclosure.

Figure 27:
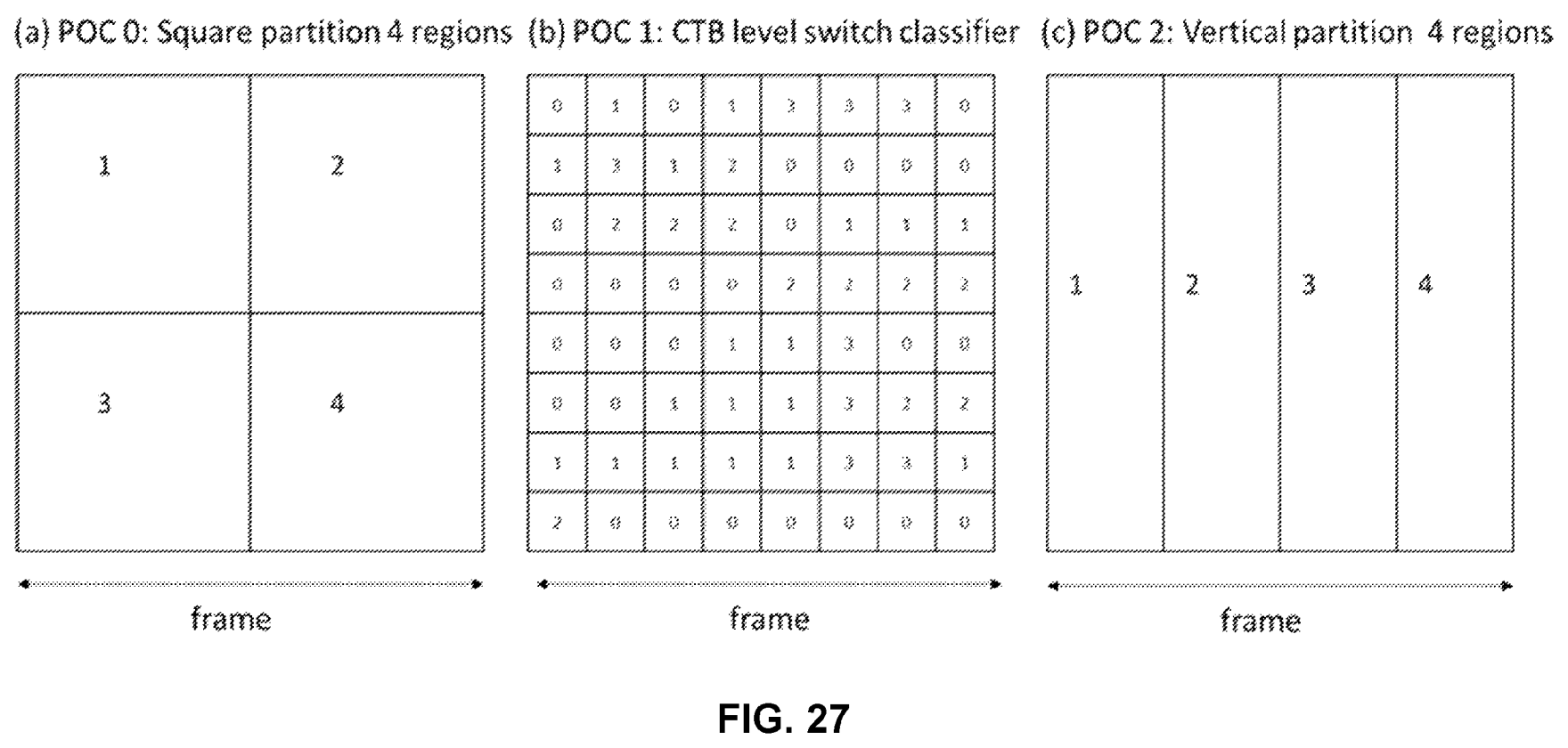

FIG. 27 is a block diagram illustrating a plurality of classifiers used and switched at different levels within a picture frame in accordance with some implementations of the present disclosure. In some embodiments, if plural classifiers are used in one frame, the method of how to apply the classifier set index can be switched in SPS/APS/PPS/ PH/SH/Region/CTU/CU/Subblock/Sample levels. For example, four sets of classifiers are used in a frame, switched in PH as shown in Table 25 below. FIGS. 27 (a) and (c) show default fixed region classifier. FIG. 27 (b) shows classifier set index is signaled in mask/CTB level, where 0 means CCSAO off for this CTB, and 1~4 means set index.

TABLE 25

| Four sets of classifiers are used in a frame, switched in PH | |
| --- | --- |
| POC | |
| 0 | Square partition 4 regions (same as frame QT split to max depth 1) (a) |
| 1 | CTB level switch classifier (b) |

TABLE 25-continued

| Four sets of classifiers are used in a frame, switched in PH | |
| --- | --- |
| POC | |
| 2 | Vertical partition 4 regions (c) |
| 3 | Frame QT split to max depth 2 |

In some embodiments, for default region case, a region level flag can be signaled if CTBs in this region do not use the default set index (for example, the region level flag is 0), but use other classifier set in this frame. For instance, if the default set index is used, the region level flag is 1. For example, in a square partition 4 regions, the following classifier sets are used as shown in Table 26-1 below,

TABLE 26-1

| A region level flag can be signaled to show if CTBs in this region do not use the default set index | | | |
| --- | --- | --- | --- |
| POC | Region | Flag | Use default set index |
| 0 | 1 | 1 | Use default set: 1 |
| | 2 | 1 | Use default set: 2 |
| | 3 | 1 | Use default set: 3 |
| | 4 | 0 | CTB switch set 1 to 4 |

Figure 28:
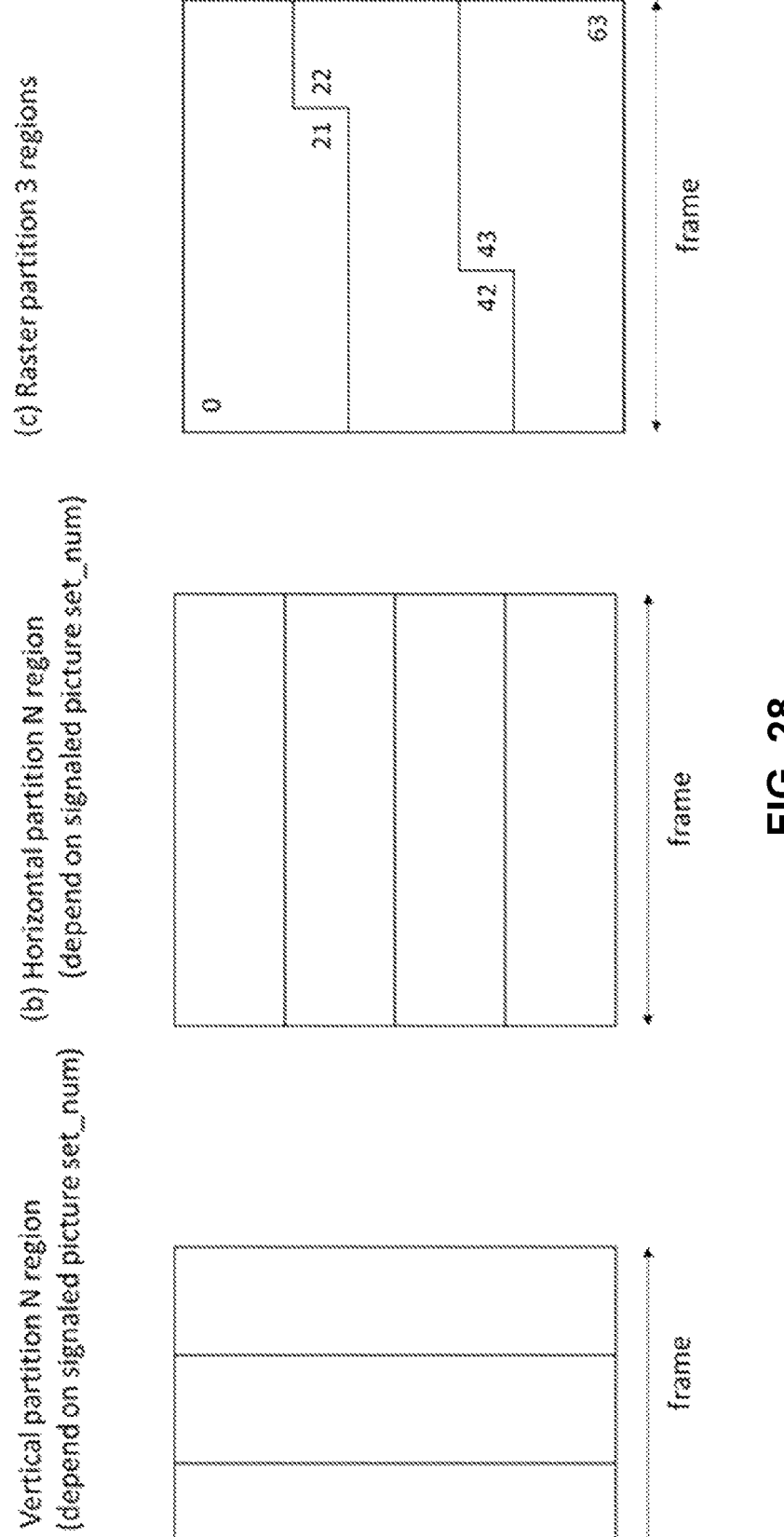
FIG. 28 is a block diagram illustrating that the CCSAO applied region partition can be dynamic and switched in picture level, in accordance with some implementations of the present disclosure.

FIG. 28 is a block diagram illustrating that the CCSAO applied region partition can be dynamic and switched in picture level, in accordance with some implementations of the present disclosure. For example, FIG. 28 (a) shows that 3 CCSAO offset sets are used in this POC (set_num=3), so the picture frame is vertically partitioned into 3 regions. FIG. 28 (b) shows that 4 CCSAO offset sets are used in this POC (set_num=4), so the picture frame is horizontally partitioned into 4 regions. FIG. 28 (c) shows that 3 CCSAO offset sets are used in this POC (set_num=3), so the picture frame is raster partitioned into 3 regions. Each region can have its own region all on flag to save per CTB on/off control bits. The number of regions is dependent on signaled picture set_num.

The CCSAO applied region can be a specific area according to the coding information (sample position, sample coded modes, loop filter parameters, etc.) inside a block. For example, 1) the CCSAO applied region can be applied only when samples are skip mode coded, or 2) the CCSAO applied region only contains N samples along CTU boundaries, or 3) the CCSAO applied region only contains samples on an 8×8 grid in the frame, or 4) the CCSAO applied region only contains DBF-filtered samples, or 5) the CCSAO applied region only contains top M and left N rows in a CU or (6) the CCSAO applied region only contains intra coded samples, or (7) the CCSAO applied region contains only samples in cbf=0 blocks, or (8) the CCSAO applied region is only on blocks with block QP in [N, M], where (N, M) can be predefined or signaled in SPS/APS/PPS/PH/SH/Region/ CTU/CU/Subblock/Sample levels. The cross-component coding information may also be taken into account, (9) the CCSAO applied region is on chroma samples which collocated luma samples are in cbf=0 blocks.

In some embodiments, whether to introduce coding information applied region restriction can be predefined or singling one control flag in SPS/APS/PPS/PH/SH/Region(per alternative set)/CTU/CU/SubblockSample levels to indicate if a specified coding information is included/excluded in CCSAO application. Decoder skips CCSAO processing for those area according to the predefined condition or the control flags. For example, YUV use different predefined/ flag controlled conditions that switched in region (set) level. The CCSAO application judgement can be in CU/TU/PU or sample levels.

TABLE 26-2

| | | | | | | | | on | on | block |
| --- | --- | --- | --- | --- | --- | --- | --- | --- | --- | --- |
| POC | Comp | Set | On cbf = 0 blocks? | on QP > 37 blocks? | on intra samples? | on inter samples? | DBF-ed samples? | BIF-ed samples? | size < 8 × 8? |
| 0 | Y | 0 | No (predefined) | Yes (predefined) | 1 | 0 | 0 | 1 | 0 |
| | | 1 | 1 | 0 | Yes (predefined) | 1 | 1 | 1 | 1 |
| | | | on cbf = 0 blocks? | on chroma samples whose collocated luma samples are in cbf = 0 blocks? | | | | on JCCR coded blocks? | block size > 32 × 32? |
| | U | 0 | No (predefined) | 1 | | | | 1 | 1 |
| | | | on cbf = 0 blocks? | on chroma samples whose collocated luma CUs are bigger than current chroma CU? | | | | on intra direction inherited from luma samples? | |
| | V0 | | 0 | 1 | | | | 1 | |

Another example is reusing all or part of bilateral enabling constraint (predefined).

```
bool isInter = (currCU.predMode == MODE_INTER ) ? true : false;
if (ccSaoParams.ctuOn [ctuRsAddr]
    && ((TU::getCbf (currTU, COMPONENT_Y) || isInter == false ) && (currTU.cu ->qp >
17 ))
    && (128 > std::max(currTU.lumaSize( ).width, currTU.lumaSize( ).height))
    & &  ((isInter  ==  false )  ||  (32  >  std::min(currTU.lumaSize( ).width,
currTU.lumaSize( ).height)
```

In some embodiments, excluding some specific area may benefit CCSAO statistics collection. The offset derivation may be more precise or suitable for those truly need to be corrected area. For example, blocks with cbf=0 usually means a block is perfectly predicted which may not need to be further corrected. Excluding those blocks may benefit other area's offset derivation.

Figure 29:
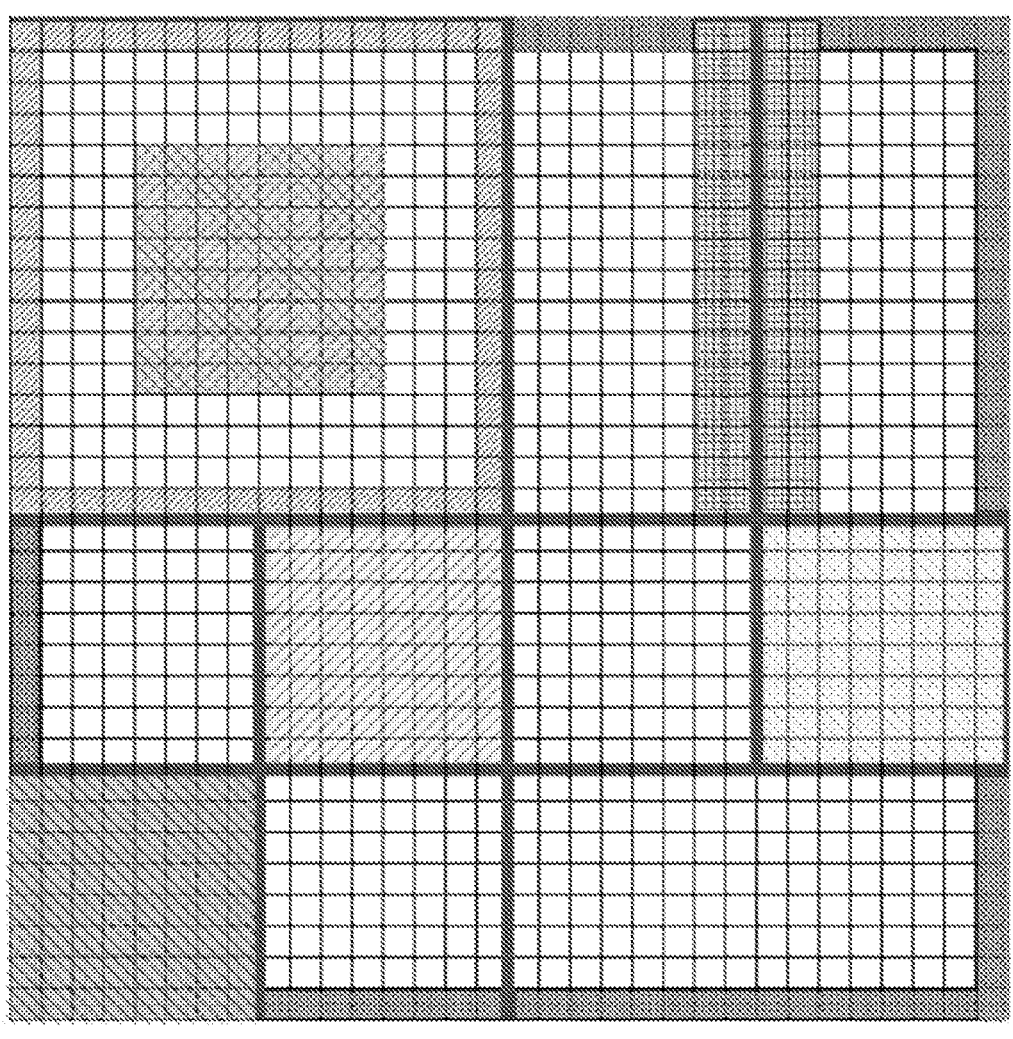
FIG. 29 is a diagram illustrating the CCSAO classifiers can take current or cross component coding information into account, in accordance with some implementations of the present disclosure.

Different applied regions can use different classifiers. For example, in a CTU, the skip mode uses C1, an 8×8 grid uses C2, the skip mode and 8×8 grid uses C3. For example, in a CTU, skip mode coded samples use C1, samples at CU center use C2, samples that are skip mode coded at CU center use C3. FIG. 29 is a diagram illustrating the CCSAO classifiers can take current or cross component coding information into account, in accordance with some implementations of the present disclosure. For example, different coding modes/parameters/sample positions can form different classifiers. Different coding information can be combined to form a joint classifier. Different areas can use different classifiers. FIG. 29 also shows another example of applied region.

In some embodiments, the predefined or flag control "coding information excluding area" mechanism can be used in DBF/Pre-SAO/SAO/BIF/CCSAO/ALF/CCALF/NN loop filter (NNLF), or other loop filters.

In some embodiments, CCSAO syntax implemented is shown in Table 27 below. In some examples, the binarization of each syntax element can be changed. In AVS3, the term patch is similar with slice, and patch header is similar with the slice header. FLC stands for fixed length code. TU stands for truncated unary code. EGk stands for exponential-go-lomb code with order k, where k can be fixed. SVLC stands for signed EG0. UVLC stands for unsigned EG0.

TABLE 27

| Level | Syntax element | Binarization | Meaning |
| --- | --- | --- | --- |
| SPS | cc_sao_enabled_flag | FLC | whether CCSAO is enabled in the sequence, can be inferred as off (disable state) when chromaFormat is CHROMA_400 |
| PH/SH | ph_cc_sao_y_flag ph_cc_sao_cb_flag ph_cc_sao_cr_flag | FLC | whether CCSAO is enabled in this picture/slice for Y/Cb/Cr, can be inferred as off (disable state) when chromaFormat is CHROMA_400 |
| PH/SH | ph_cc_sao_stored_offsets_set_idx | FLC | which previously decoded offsets set is used, Y/U/V offset set can be separate or shared |

TABLE 27-continued

A exemplary CCSAO syntax

| Level | Syntax element | Binarization | Meaning |
|---|---|---|---|
| PH/SH | ph_cc_sao_y_ctb_control_flag<br>ph_cc_sao_cb_ctb_control_flag<br>ph_cc_sao_cr_ctb_control_flag | FLC | whether to enable Y/Cb/Cr<br>on/off control at CTB level |
| PH/SH | ph_cc_sao_y_set_num_minus1<br>ph_cc_sao_cb_set_num_minus1<br>ph_cc_sao_cb_set_num_minus1 | UVLC | the number of alternative<br>sets used in the picture/slice. |
| SPS/APS/<br>PPS/PH/<br>SH/CTU | ph_cc_sao_y_class_y_enabled_flag<br>ph_cc_sao_y_class_u_enabled_flag<br>ph_cc_sao_y_class_v_enabled_flag<br>ph_cc_sao_cb_class_y_enabled_flag<br>ph_cc_sao_cb_class_u_enabled_flag<br>ph_cc_sao_cb_class_v_enabled_flag<br>ph_cc_sao_cr_class_y_enabled_flag<br>ph_cc_sao_cr_class_u_enabled_flag<br>ph_cc_sao_cr_class_v_enabled_flag | FLC | whether current component<br>can use other components<br>for classification<br>e.g., if<br>ph_cc_sao_y_class_u_enabled_flag = 0<br>component Y cannot use Cb<br>sample for classification,<br>and a classification<br>parameter such as<br>bandNumU does not need to<br>be signalled. Otherwise if<br>the flag is 1, Cb can be used<br>to classify the current Y. |
| SPS/APS/<br>PPS/PH/<br>SH/CTU | ph_cc_sao_y_band_num_y_minus1<br>ph_cc_sao_y_band_num_u_minus1<br>ph_cc_sao_y_band_num_v_minus1<br>ph_cc_sao_cb_band_num_y_minus1<br>ph_cc_sao_cb_band_num_u_minus1<br>ph_cc_sao_cb_band_num_v_minus1<br>ph_cc_sao_cr_band_num_y_minus1<br>ph_cc_sao_cr_band_num_u_minus1<br>ph_cc_sao_cr_band_num_v_minus1 | FLC | adaptively changed band<br>numbers for classification.<br>e.g.,<br>ph_cc_sao_cb_band_num_y_minus1<br>ph_cc_sao_cb_band_num_u_minus1<br>ph_cc_sao_cb_band_num_v_minus1<br>indicates for component Cb<br>classification, bandNum of<br>Y/U/V used for 3<br>component joint bandNum<br>classification |
| SPS/APS/<br>PPS/PH/<br>SH/CTU | ph_cc_sao_y_cand_pos_y<br>ph_cc_sao_y_cand_pos_u<br>ph_cc_sao_y_cand_pos_v<br>ph_cc_sao_cb_cand_pos_y<br>ph_cc_sao_cb_cand_pos_u<br>ph_cc_sao_cb_cand_pos_v<br>ph_cc_sao_cr_cand_pos_y<br>ph_cc_sao_cr_cand_pos_u<br>ph_cc_sao_cr_cand_pos_v | FLC | Indicating classifier<br>candidate position. e.g.,<br>ph_cc_sao_y_cand_pos_y<br>ph_cc_sao_y_cand_pos_u<br>ph_cc_sao_y_cand_pos_v<br>indicates for component Y<br>classification, positions of<br>Y/U/V candidate are<br>selected as 3 component<br>joint bandNum<br>classification |
| SPS/APS/<br>PPS/PH/<br>SH/CTU | cc_sao_y_offset_sign_flag<br>cc_sao_y_offset_abs<br>cc_sao_cb_offset_sign_flag<br>cc_sao_cb_offset_abs<br>cc_sao_cr_offset_sign_flag<br>cc_sao_cr_offset_abs | FLC<br>TU or EGk<br>FLC<br>TU or EGk | CCSAO Y, Cb and Cr offset<br>values of each class. The<br>sign flag can be conditioned<br>on abs != 0.<br>if (offset_abs != 0)<br>decode offset_sign_flag |
| CTU | ctb_cc_sao_y_flag<br>ctb_cc_sao_cb_flag<br>ctb_cc_sao_cr_flag | CABAC, 1 or 2<br>(up & left)<br>contexts | whether CCSAO is enabled<br>for the current Y,<br>Cb or Cr CTB |
| CTU | ctb_cc_sao_y_set_idx<br>ctb_cc_sao_cb_set_idx<br>ctb_cc_sao_cr_set_idx | TU or EGk | which CCSAO offset set is<br>used for the current Y,<br>Cb or Cr CTB (if CCSAO<br>is enabled) |
| CTU | cc_sao_y_merge_left_flag<br>cc_sao_y_merge_up_flag<br>cc_sao_cb_merge_left_flag<br>cc_sao_cb_merge_up_flag<br>cc_sao_cr_merge_left_flag<br>cc_sao_cr_merge_up_flag | CABAC | whether CCSAO offset is<br>merged from the left or<br>up CTU |

If a higher-level flag is off, the lower level flags can be inferred from the off state of the flag and do not need to be signaled. For example, if ph_cc_sao_cb_flag is false in this picture, ph_cc_sao_cb_band_num_minus1, ph_ccsao_cb_luma_type, cc_sao_cb_offset_sign_flag, cc_sao_cb_offset_abs, ctb_cc_sao_cb_flag, cc_sao_cb_merge_left_flag, and cc_sao_cb_merge_up_flag are not present and inferred to be false.

In some embodiments, the SPS ccsao_enabled_flag is conditioned on the SPS SAO enabled flag as shown in Table 28 below.

TABLE 28

| the SPS ccsao_enabled_flag is conditioned on the SPS SAO enabled flag | |
|---|---|
| sps_sao_enabled_flag | u(1) |
| if( sps_sao_enabled_flag && ChromaArrayType != 0) | |
| sps_ccsao_enabled_flag | u(1) |
| sps_alf_enabled_flag | u(1) |
| if( sps_alf_enabled_flag && ChromaArrayType != 0) | |
| sps_ccalf_enabled_flag | u(1) |

In some embodiments, ph_cc_sao_cb_ctb_control_flag, ph_cc_sao_cr_ctb_control_flag indicate whether to enable Cb/Cr CTB on/off control granularity. If ph_cc_sao_cb_ctb_control_flag, and ph_cc_sao_cr_ctb_control_flag are enabled, ctb_cc_sao_cb_flag and ctb_cc_sao_cr_flag can be further signaled. Otherwise, whether CCSAO is applied in the current picture depends on ph_cc_sao_cb_flag, ph_cc_sao_cr_flag, without further signaling ctb_cc_sao_cb_flag and ctb_cc_sao_cr_flag at CTB level.

In some embodiments, for ph_cc_sao_cb_type and ph_cc_sao_cr_type, a flag can be further signaled to distinguish if the center collocated luma position is used (Y0 position in FIG. 10) for classification for a chroma sample, to reduce bit overhead. Similarly, if cc_sao_cb_type and cc_sao_cr_type are signaled in CTB level, a flag can be further signaled with the same mechanism. For example, if the number of the C0 luma position candidates is 9, cc_sao_cb_type0_flag is further signaled to distinguish if the center collocated luma position is used as shown in Table 29 below. If the center collocated luma position is not used, cc_sao_cb_type_idc is used to indicate which of the remaining 8 neighboring luma positions is used.

TABLE 29

| cc_sao_cb_type0_flag is signaled to distinguish if the center collocated luma position is used | |
|---|---|
| ctb_cc_sao_cb_flag | u(1) |
| if( ctb_cc_sao_cb_flag ) | |
| cc_sao_cb_type0_flag | u(1), can be context coded |
| if( !cc_sao_cb_type0_flag ) | |
| cc_sao_cb_type_idc | u(3), can be context coded |

The following Table 30 shows an example in AVS that single (set_num=1) or plural (set_num>1) classifiers are used in the frame. Note the syntax notation can be mapped to the notation used above.

TABLE 30

| An example in AVS that single (set_num = 1) or plural (set_num > 1) classifiers are used in the picture frame | |
|---|---|
| ccsao_parameter_picture_header_set( ) { | |
|     for (compIdx=0;compIdx<2;compIdx++) { | |
|         picture_ccsao_enable_flag[compIdx] | u(1) |
|         if (PictureCcSaoEnableFlag[compIdx]) { | |
|           picture_ccsao_lcu_control_flag[compIdx] | u(1) |
|           if (PictureCcSaoLcuControlFlag[compIdx]) { | |
|             picture_ccsao_set_num_minus1[compIdx] | u(2) |
|           } | |
|           for (setIdx=0; setIdx<PictureCcSaoSetNum[compIdx]; setIdx++) { | |
|             picture_ccsao_type[compIdx][setIdx] | u(4) |
|             picture_ccsao_band_num_minus1[compIdx][setIdx] | u(4) |
|           } | |
|         } | |
|     } | |
| } | |
| | |
| ccsao_parameter_set( ) { | |
|     for (compIdx=0;compIdx<2;compIdx++) { | |
|       if (PictureCcSaoEnableFlag[compIdx]) { | |
|         if (PictureCcSaoLcuControlFlag[compIdx]) { | |
|           for (LcuIndex=0; LcuIndex<PictureWidthInLcu*PictureHeightInLcu) { | |
|             ccsao_lcu_enable_flag[compIdx][LcuIndex] | ae(v) |
|             if (CcSaoLcuEnableFlag[compIdx][LcuIndex] && PictureCcSaoSetNum[comp] > 1) { | |
|               ccsao_lcu_set_idx[compIdx][LcuIndex] | ae(v) |
|             } | |
|           } | |
|         } | |
|         for (setIdx=0; setIdx<PictureCcSaoSetNum[comp]; setIdx++) { | |
|           for (i=0; i<PictureCcSaoBandNum[compIdx][setIdx]; i++){ | |
|             ccsao_offset_abs[compIdx][setIdx][i] | ae(v) |
|             if (CcSaoOffsetAbs[compIdx][setIdx][i]) { | |
|               ccsao_offset_sign[compIdx][setIdx][i] | u(1) |
|             } | |

TABLE 30-continued

An example in AVS that single (set_num = 1) or plural
(set_num > 1) classifiers are used in the picture frame

```
                }
            }
        }
    }
}
```

If combined with FIG. 25 or FIG. 27 in which each region has its own set, the syntax example can include region on/off control flag (picture_ccsao_lcu_control_flag[compIdx] [setIdx]) as shown in Table 31 below.

TABLE 31

Each region has its own set and the syntax example can include region
on/off control flag (picture_ccsao_lcu_control_flag[compIdx][setIdx])

```
ccsao_parameter_picture_header_set( ) {
    for (compIdx=0;compIdx<2;compIdx++) {
        picture_ccsao_enable_flag[compIdx]                          u(1)
        if (PictureCcSaoEnableFlag[compIdx]) {
            picture_ccsao_set_num_minus1[compIdx]                   u(2)
            for (setIdx=0; setIdx<PictureCcSaoSetNum[compIdx];
setIdx++) {
            picture_ccsao_lcu_control_flag[compIdx][setIdx]         u(1)
            picture_ccsao_type[compIdx][setIdx]                     u(4)
            picture_ccsao_band_num_minus1[compIdx][setIdx]         u(4)
            }
        }
    }
}
```

In some embodiments, for the high level syntax, pps_ccsao_info_in_ph_flag and gci_no_sao_constraint_flag can be added.

In some embodiments, pps_ccsao_info_in_ph_flag equal to 1 specifies that the CCSAO filter information could be present in the PH syntax structure and not present in the slice headers referring to the PPS that do not contain a PH syntax structure. pps_ccsao_info_in_ph_flag equal to 0 specifies that the CCSAO filter information is not present in the PH syntax structure and could be present in the slice headers referring to the PPS. When not present, the value of pps_ccsao_info_in_ph_flag is inferred to be equal to 0.

In some embodiments, gci_no_ccsao_constraint_flag equal to 1 specifies that sps_ccsao_enabled_flag for all pictures in OlsInScope shall be equal to 0. gci_no_ccsao_constraint_flag equal to 0 does not impose such a constraint. In some embodiments, a bitstream of the video comprises one or more output layer sets (OLSs) according to a rule. In the examples herein, OlsInScope refers to one or more OLSs that are in scope. In some examples, a profile_tier_level( ) syntax structure provides level information and, optionally, profile, tier, sub-profile, and general constraints information to which the OlsInScope conforms.

When a profile_tier_level( ) syntax structure is included in a VPS, OlsInScope is one or more OLSs specified by the VPS. When a profile_tier_level( ) syntax structure is included in an SPS, the OlsInScope is the OLS that includes only the layer that is the lowest layer among the layers that refer to the SPS, and this lowest layer is an independent layer.

In some embodiments, an extension to the intra and inter post prediction SAO filter is illustrated further below. In some embodiments, the SAO classification methods (including cross-component sample/coding info classification) disclosed in the present disclosure can serve as a post prediction filter, and the prediction can be intra, inter, or other prediction tools such as Intra Block Copy. FIG. 30 is a block diagram illustrating that the SAO classification methods disclosed in the present disclosure serve as a post prediction filter in accordance with some implementations of the present disclosure.

In some embodiments, for each Y, U, and V component, a corresponding classifier is chosen. And for each component prediction sample, it is first classified, and a corresponding offset is added. For example, each component can use the current and neighboring samples for classification. Y uses the current Y and neighboring Y samples, and U/V uses the current U/V samples for classification as shown in Table 32 below. FIG. 31 is a block diagram illustrating that for post prediction SAO filter, each component can use the current and neighboring samples for classification in accordance with some implementations of the present disclosure.

TABLE 32

| | | | C0 band__num | Total classes | Offset derived from the current component |
|---|---|---|---|---|---|
| POC | Component | Classifier | | | |
| 0 | Y | combine C0 and C1 | 16 | 16*17 | h__Y[i] |
| 0 | U | C0 using U0 position | 8 | 8 | h__U[i] |
| 0 | V | C0 using V0 position | 32 | 32 | h__V[i] |

A corresponding classifier is chosen for each Y, U, and V component

In some embodiments, the refined prediction samples (Ypred', Upred', Vpred') are updated by adding the corresponding class offset and are used for intra, inter, or other prediction thereafter.

$$Ypred'=clip3(0,(1<<bit\_depth)-1,Ypred+h\_Y[i])$$

$$Upred'=clip3(0,(1<<bit\_depth)-1,Upred+h\_U[i])$$

$$Vpred'=clip3(0,(1<<bit\ depth)-1,Vpred+h\_V[i])$$

In some embodiments, for chroma U and V components, besides the current chroma component, the cross-component (Y) can be used for further offset classification. The additional cross-component offset (h'_U, h'_V) can be added on the current component offset (h_U, h_V), for example, as shown in Table 33 below.

TABLE 33

| | | | C0 band__num | Total classes | Offset derived from the current component |
|---|---|---|---|---|---|
| POC | Component | Classifier | | | |
| 0 | U | C0 using Y4 position | 16 | 16 | h'__U[i] |
| 0 | V | C0 using Y1 position | 7 | 7 | h'__V[i] |

For chroma U and V components, besides the current chroma component, the cross-component (Y) can be used for further offset classification In some embodiments, the refined prediction samples (Upred", Vpred") are updated by adding the corresponding class offset and are used for intra, inter, or other prediction thereafter.

$$Upred''=clip3(0,(1<<bit\_depth)-1,Upred'+h'\_U[i])$$

$$Vpred''=clip3(0,(1<<bit\_depth)-1,Vpred'+h'\_V[i])$$

In some embodiments, the intra and inter prediction can use different SAO filter offsets.

Figure 32:
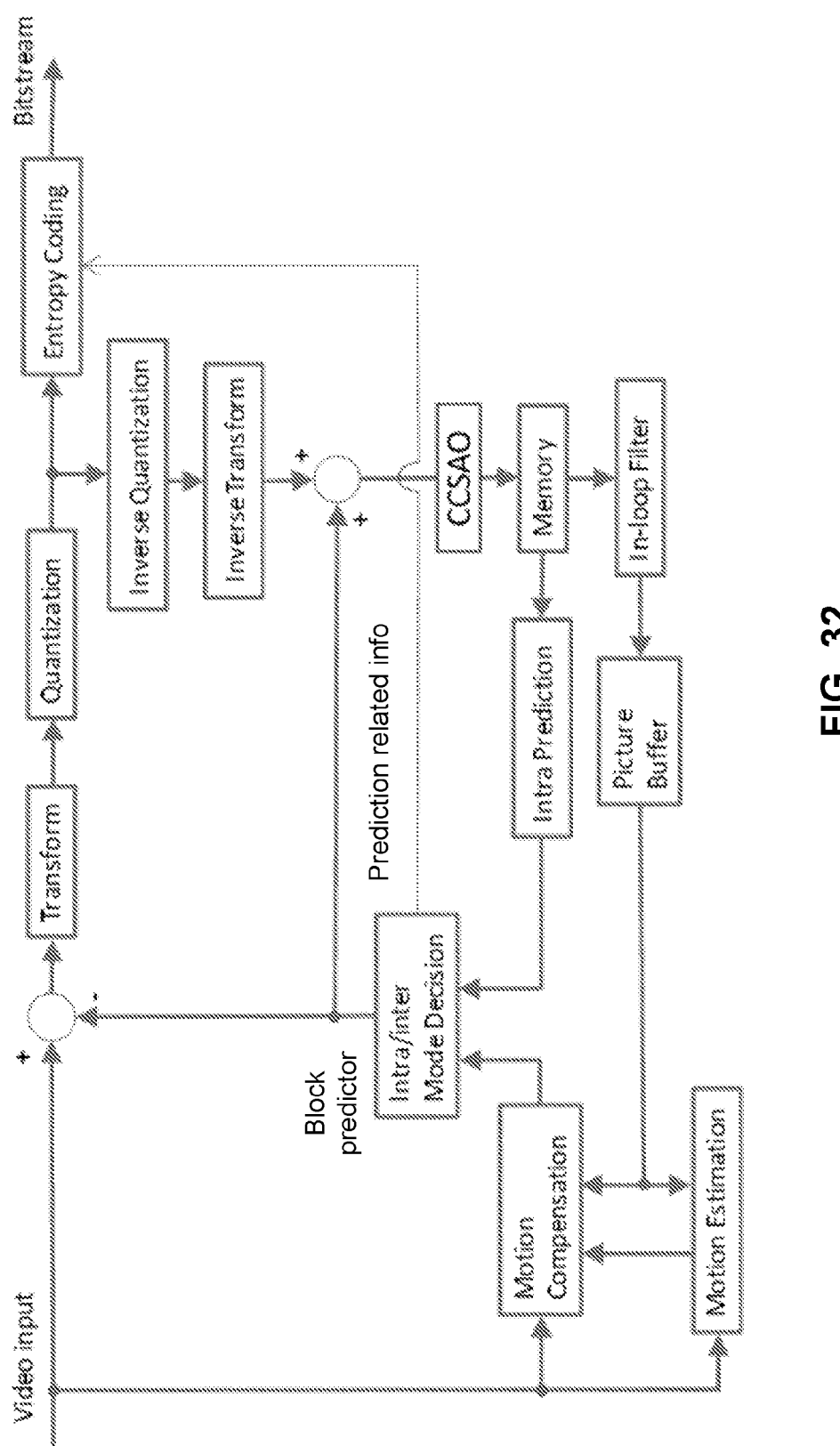
FIG. 32 is a block diagram illustrating that the SAO classification methods disclosed in the present disclosure serve as a post reconstruction filter in accordance with some implementations of the present disclosure.

FIG. 32 is a block diagram illustrating that the SAO classification methods disclosed in the present disclosure serve as a post reconstruction filter in accordance with some implementations of the present disclosure.

In some embodiments, the SAO/CCSAO classification methods disclosed herein (including cross-component sample/coding info classification) can serve as a filter applied on reconstructed samples of a tree unit (TU). As shown in FIG. 32, CCSAO can serve as a post reconstruction filter, i.e., using reconstructed sample (after prediction/ residual sample addition, before deblocking) as input for classification, compensating luma/chroma samples before entering neighboring intra/inter prediction. The CCSAO post reconstruction filter may reduce distortion of the current TU samples, and may give a better prediction for neighboring intra/inter blocks. A better compression efficiency may be expected by a more precise prediction.

FIG. 33 is a flowchart illustrating an exemplary process 3300 of decoding video signal using cross-component correlation in accordance with some implementations of the present disclosure.

The video decoder 30 (as shown in FIG. 3), receives, from the video bitstream, a plurality of frames, each frame including a first component and a second component (3310).

The video decoder 30, determines, for a first frame of the plurality of frames, one or more classifiers for the second component respectively from one or more samples of the first component associated with a respective sample of the second component (3320).

The video decoder 30, receives, from the video bitstream, a first group of sample offsets for the second component of the first frame according to the one or more classifiers (3330).

The video decoder 30, determines whether differential pulse-code modulation (DPCM) is enabled for signaling a first group of differential sample offsets for the second component of a second frame of the plurality of frames according to the one or more classifiers (3340).

In response to the DPCM being enabled for the signaling the first group of differential sample offsets (3350): the video decoder 30, receives, from the video bitstream, the first group of differential sample offsets for the second component of the second frame according to the one or more classifiers (3350-1); and modifies a set of one or more samples of the second component of the second frame based on the first group of differential sample offsets of the second frame and the first group of sample offsets of the first frame (3350-2).

In some embodiments, the determining whether the DPCM is enabled for signaling the first group of differential sample offsets for the second component of the second frame of the plurality of frames according to the one or more classifiers (3340) comprises: receiving, from the video bit-stream, a syntax element, wherein the syntax element indicates whether the DPCM is enabled for signaling the first group of differential sample offsets for the second component of the second frame of the plurality of frames according to the one or more classifiers.

In some embodiments, the modifying the set of one or more samples of the second component of the second frame based on the first group of differential sample offsets of the second frame and the first group of sample offsets of the first frame (3350-2) comprises: determining a second group of sample offsets for the second component of the second frame by adding the first group of differential sample offsets of the second frame to the first group of sample offsets of the first frame; and, modifying the set of one or more samples of the second component of the second frame based on the second group of sample offsets.

In some embodiments, process 3300 of decoding video signal further includes: in response to the DPCM being enabled for the signaling the first group of differential sample offsets, modifying a set of one or more samples of the second component of the first frame based on the first group of sample offsets.

In some embodiments, the first component is a luma component and the second component is a chroma component, or the first component is a chroma component and the second component is a luma component, or the first component is a first chroma component and the second component is a second chroma component.

In some embodiments, the first group of sample offsets for the second component according to the one or more classifiers is stored in adaptation parameter set (APS).

In some embodiments, the first group of differential sample offsets is received from signaling in fixed length code (FLC), truncated unary (TU) code, or, exponential-golomb code with order k (EGk).

In some embodiments, the first group of differential sample offsets for the second component of the second frame is in a quantized format and is dequantized before adding the first group of differential sample offsets to the first group of sample offsets.

In some embodiments, the first group of sample offsets for the second component of the first frame is in a quantized format and is dequantized before modifying the set of one or more samples of the second component of the first frame based on the first group of sample offsets.

In some embodiments, the receiving the first group of differential sample offsets for the second component of the second frame according to the one or more classifiers further (3350-1) comprises: receiving an index for the first group of differential sample offsets that refers to the first group of sample offsets to which the first group of differential sample offsets is applied for updating.

In some embodiments, the receiving, from the video bitstream, the first group of differential sample offsets for the second component of the second frame according to the one or more classifiers (3350-1) further comprises: receiving a flag that indicates whether (1) to update the first group of differential sample offsets only or (2) to update both the first group of differential sample offsets and corresponding classifiers associated with the first group of differential sample offsets.

In some embodiments, adding the first group of differential sample offsets to the first group of sample offsets comprises adding each value of the first group of differential sample offsets of the second frame to each value of the first group of sample offsets of the first frame.

In some embodiments, each frame is a picture frame or a slice in the picture frame.

Figure 34:
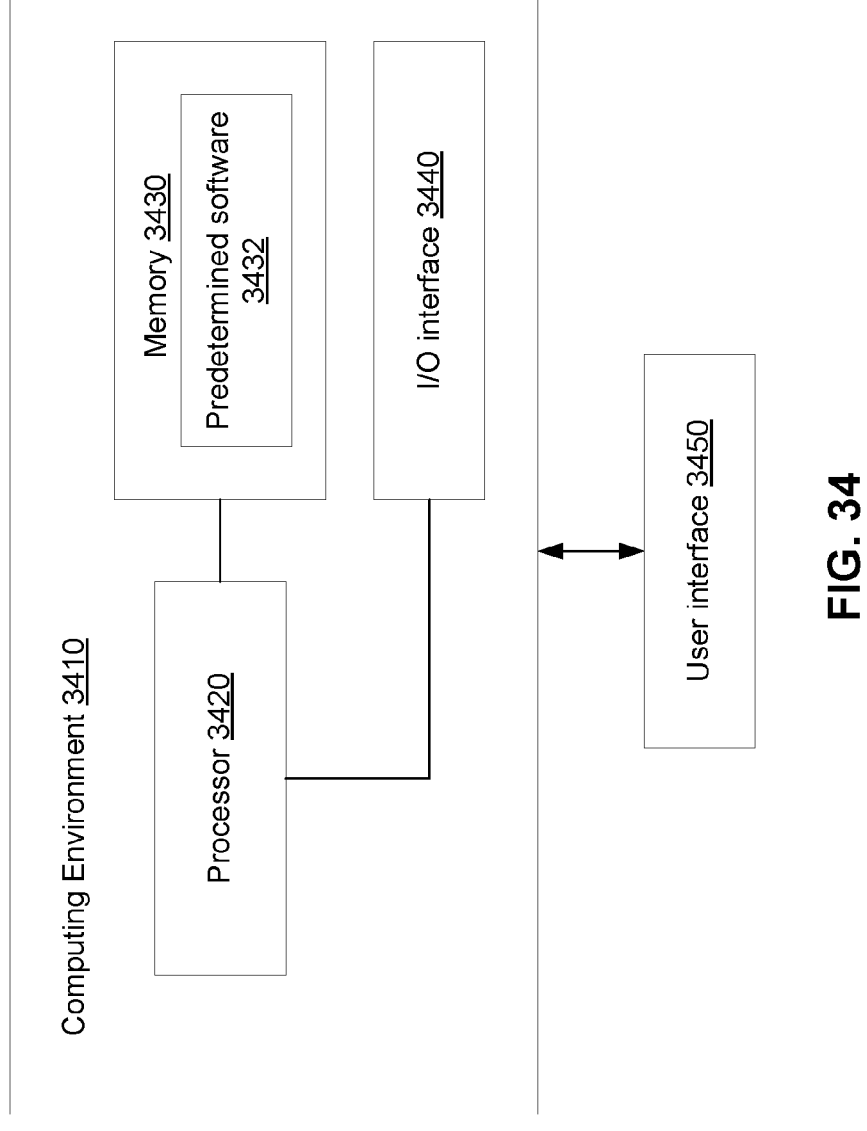
FIG. 34 is a diagram illustrating a computing environment coupled with a user interface in accordance with some implementations of the present disclosure.

FIG. 34 shows a computing environment 3410 coupled with a user interface 3450. The computing environment 3410 can be part of a data processing server. The computing environment 3410 includes a processor 3420, a memory 3430, and an Input/Output (I/O) interface 3440.

The processor 3420 typically controls overall operations of the computing environment 3410, such as the operations associated with display, data acquisition, data communications, and image processing. The processor 3420 may include one or more processors to execute instructions to perform all or some of the steps in the above-described methods. Moreover, the processor 3420 may include one or more modules that facilitate the interaction between the processor 3420 and other components. The processor may be a Central Processing Unit (CPU), a microprocessor, a single chip machine, a Graphical Processing Unit (GPU), or the like.

The memory 3430 is configured to store various types of data to support the operation of the computing environment 3410. The memory 3430 may include predetermined software 3432. Examples of such data includes instructions for any applications or methods operated on the computing environment 3410, video datasets, image data, etc. The memory 3430 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 3440 provides an interface between the processor 3420 and peripheral interface modules, such as a keyboard, a click wheel, buttons, and the like. The buttons may include but are not limited to, a home button, a start scan button, and a stop scan button. The I/O interface 3440 can be coupled with an encoder and decoder.

In an embodiment, there is also provided a non-transitory computer-readable storage medium comprising a plurality of programs, for example, in the memory 3430, executable by the processor 3420 in the computing environment 3410, for performing the above-described methods. Alternatively, the non-transitory computer-readable storage medium may have stored therein a bitstream or a data stream comprising encoded video information (for example, video information comprising one or more syntax elements) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like.

In an embodiment, the is also provided a computing device comprising one or more processors (for example, the processor 3420); and the non-transitory computer-readable storage medium or the memory 3430 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 3430, executable by the processor 3420 in the computing environment 3410, for performing the above-described methods. For example, the computer program product may include the non-transitory computer-readable storage medium.

In an embodiment, the computing environment 3410 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

Further embodiments also include various subsets of the above embodiments combined or otherwise re-arranged in various other embodiments.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method of decoding video bitstream, comprising:
receiving, from the video bitstream, a plurality of frames, each frame including a first component and a second component;
determining, for a first frame of the plurality of frames, one or more classifiers for the second component respectively from one or more samples of the first component associated with a respective sample of the second component;
receiving, from the video bitstream, a first group of sample offsets for the second component of the first frame according to the one or more classifiers;
determining whether differential pulse-code modulation (DPCM) is enabled for signalling a first group of differential sample offsets for the second component of a second frame of the plurality of frames according to the one or more classifiers, wherein the first group of differential sample offsets represent the differences between the first group of sample offsets in the first frame and a second group of sample offsets for the second component of the second frame;
in response to determining the DPCM being enabled:
receiving, from the video bitstream, the first group of differential sample offsets for the second component of the second frame according to the one or more classifiers; and
modifying a set of one or more samples of the second component of the second frame based on the first group of differential sample offsets of the second frame and the first group of sample offsets of the first frame,
wherein the first component is a luma component and the second component is a chroma component, or the first component is a chroma component and the second component is a luma component, or the first component is a first chroma component and the second component is a second chroma component.

2. The method of claim 1, wherein the determining whether the DPCM is enabled comprises:
receiving, from the video bitstream, a syntax element, wherein the syntax element indicates whether the DPCM is enabled.

3. The method of claim 1, wherein the modifying the set of one or more samples of the second component of the second frame based on the first group of differential sample offsets of the second frame and the first group of sample offsets of the first frame comprises:
determining the second group of sample offsets by adding the first group of differential sample offsets of the second frame to the first group of sample offsets of the first frame; and
modifying the set of one or more samples of the second component of the second frame based on the second group of sample offsets.

4. The method of claim 3, further comprising
in response to determining the DPCM being enabled, modifying a set of one or more samples of the second component of the first frame based on the first group of sample offsets.

5. The method of claim 1, wherein the first group of sample offsets for the second component according to the one or more classifiers is stored in adaptation parameter set (APS).

6. The method of claim 1, wherein the first group of differential sample offsets is received from signalling in fixed length code (FLC), truncated unary (TU) code, or exponential-golomb code with order k (EGk).

7. The method of claim 3, wherein the first group of differential sample offsets for the second component of the second frame is in a quantized format and is dequantized before adding the first group of differential sample offsets to the first group of sample offsets.

8. The method of claim 4, wherein the first group of sample offsets for the second component of the first frame is in a quantized format and is dequantized before modifying the set of one or more samples of the second component of the first frame based on the first group of sample offsets.

9. The method of claim 1, wherein the receiving the first group of differential sample offsets for the second component of the second frame according to the one or more classifiers further comprises: receiving an index for the first group of differential sample offsets that refers to the first group of sample offsets to which the first group of differential sample offsets is applied for updating.

10. The method of claim 1, wherein the receiving, from the video bitstream, the first group of differential sample offsets for the second component of the second frame according to the one or more classifiers further comprises:

receiving a flag that indicates whether (1) to update the first group of differential sample offsets only or (2) to update both the first group of differential sample offsets and corresponding classifiers associated with the first group of differential sample offsets.

11. The method of claim 3, wherein the adding the first group of differential sample offsets to the first group of sample offsets comprises adding each value of the first group of differential sample offsets of the second frame to each value of the first group of sample offsets of the first frame.

12. The method of claim 1, wherein the each frame comprises a picture frame or a slice in the picture frame.

13. An electronic apparatus comprising:

one or more processing units;

a memory coupled to the one or more processing units; and a plurality of programs stored in the memory that, when executed by the one or more processing units, cause the electronic apparatus to perform acts comprising:

receiving, from a video bitstream, a plurality of frames, each frame including a first component and a second component;

determining, for a first frame of the plurality of frames, one or more classifiers for the second component respectively from one or more samples of the first component associated with a respective sample of the second component;

receiving, from the video bitstream, a first group of sample offsets for the second component of the first frame according to the one or more classifiers;

determining whether differential pulse-code modulation (DPCM) is enabled for signalling a first group of differential sample offsets for the second component of a second frame of the plurality of frames according to the one or more classifiers, wherein the first group of differential sample offsets represent the differences between the first group of sample offsets in the first frame and a second group of sample offsets for the second component of the second frame;

in response to determining the DPCM being enabled:

receiving, from the video bitstream, the first group of differential sample offsets for the second component of the second frame according to the one or more classifiers; and modifying a set of one or more samples of the second component of the second frame based on the first group of differential sample offsets of the second frame and the first group of sample offsets of the first frame, wherein the first component is a luma component and the second component is a chroma component, or the first component is a chroma component and the second component is a luma component, or the first component is a first chroma component and the second component is a second chroma component.

14. A non-transitory computer readable storage medium having stored therein a bitstream comprising video information to be decoded by acts comprising:

receiving, from the video bitstream, a plurality of frames, each frame including a first component and a second component;

determining, for a first frame of the plurality of frames, one or more classifiers for the second component respectively from one or more samples of the first component associated with a respective sample of the second component;

receiving, from the video bitstream, a first group of sample offsets for the second component of the first frame according to the one or more classifiers;

determining whether differential pulse-code modulation (DPCM) is enabled for signalling a first group of differential sample offsets for the second component of a second frame of the plurality of frames according to the one or more classifiers, wherein the first group of differential sample offsets represent the differences between the first group of sample offsets in the first frame and a second group of sample offsets for the second component of the second frame;

in response to determining the DPCM being enabled:

receiving, from the video bitstream, the first group of differential sample offsets for the second component of the second frame according to the one or more classifiers; and modifying a set of one or more samples of the second component of the second frame based on the first group of differential sample offsets of the second frame and the first group of sample offsets of the first frame, wherein the first component is a luma component and the second component is a chroma component, or the first component is a chroma component and the second component is a luma component, or the first component is a first chroma component and the second component is a second chroma component.

\* \* \* \* \*